(12) United States Patent
Prud'Homme et al.

(10) Patent No.: US 8,110,026 B2
(45) Date of Patent: Feb. 7, 2012

(54) FUNCTIONAL GRAPHENE-POLYMER NANOCOMPOSITES FOR GAS BARRIER APPLICATIONS

(75) Inventors: Robert Prud'Homme, Lawrenceville, NJ (US); Christopher O'Neil, New York, NY (US); Bulent Ozbas, North Bergen, NJ (US); Ilhan Aksay, Princeton, NJ (US); Richard Register, Princeton Jct., NJ (US); Douglas Adamson, Skillman, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 488 days.

(21) Appl. No.: 11/543,871

(22) Filed: Oct. 6, 2006

(65) Prior Publication Data

US 2010/0096595 A1    Apr. 22, 2010

(51) Int. Cl.
*B01D 53/22*    (2006.01)
*B01D 67/00*    (2006.01)
*B01D 71/00*    (2006.01)

(52) U.S. Cl. ............ 96/4; 96/11; 96/12; 96/13; 96/153; 96/154; 95/45; 95/54; 95/56; 95/903; 210/640; 252/511; 423/415.1; 423/448

(58) Field of Classification Search .................. 96/4, 11, 96/12, 13, 14, 153, 154; 95/45, 54, 56, 903; 210/640, 490, 500.21, 500.27, 500.28; 252/511; 977/734, 742, 753, 962; 429/19; 423/415.1, 423/448

See application file for complete search history.

(56) References Cited

U.S. PATENT DOCUMENTS

| | | | |
|---|---|---|---|
| 4,987,175 A | 1/1991 | Bunnell, Sr. | |
| 5,019,446 A | 5/1991 | Bunnell, Sr. | |
| 5,065,948 A | 11/1991 | Bunnell, Sr. | |
| 6,927,250 B2 | 8/2005 | Kaschak et al. | |
| 7,014,681 B2 * | 3/2006 | Noack et al. | 95/54 |
| 7,071,258 B1 * | 7/2006 | Jang et al. | 524/496 |
| 7,094,276 B2 * | 8/2006 | Kojima et al. | 96/153 |
| 7,105,108 B2 | 9/2006 | Kaschak et al. | |
| 7,623,340 B1 * | 11/2009 | Song et al. | 361/502 |
| 7,658,901 B2 * | 2/2010 | Prud'Homme et al. | 423/415.1 |
| 7,659,350 B2 | 2/2010 | Prud'Homme et al. | |
| 7,771,824 B2 | 8/2010 | Herrera-Alonso et al. | |
| 2002/0022122 A1 * | 2/2002 | Hirata et al. | 428/220 |
| 2002/0054995 A1 | 5/2002 | Mazurkiewicz | |
| 2004/0225134 A1 * | 11/2004 | Yaghi et al. | 549/211 |
| 2005/0271574 A1 | 12/2005 | Jang et al. | |
| 2006/0030483 A1 * | 2/2006 | Jang | 502/400 |
| 2006/0069199 A1 * | 3/2006 | Charati et al. | 524/496 |
| 2006/0121279 A1 | 6/2006 | Petrik | |
| 2006/0151382 A1 * | 7/2006 | Petrik | 96/4 |
| 2006/0229404 A1 | 10/2006 | Lechtenboehmer | |

(Continued)

FOREIGN PATENT DOCUMENTS

JP    2006-225473    8/2006

(Continued)

OTHER PUBLICATIONS

U.S. Appl. No. 11/543,872, filed Oct. 6, 2006, Prud'Homme et al.

(Continued)

*Primary Examiner* — Jason M Greene
(74) *Attorney, Agent, or Firm* — Oblon, Spivak, McClelland, Maier & Neustadt, L.L.P.

(57) ABSTRACT

A gas diffusion barrier contains a polymer matrix and a functional graphene which displays no signature of graphite and/or graphite oxide, as determined by X-ray diffraction.

20 Claims, 49 Drawing Sheets

U.S. PATENT DOCUMENTS

| | | | |
|---|---|---|---|
| 2007/0017861 A1* | 1/2007 | Foley et al. | 96/4 |
| 2007/0092432 A1 | 4/2007 | Prud'Homme et al. | |
| 2007/0131915 A1 | 6/2007 | Stankovich et al. | |
| 2007/0142547 A1 | 6/2007 | Vaidya et al. | |
| 2007/0158618 A1* | 7/2007 | Song et al. | 252/500 |
| 2007/0256562 A1* | 11/2007 | Routkevitch et al. | 96/11 |
| 2007/0272606 A1* | 11/2007 | Freese et al. | 96/11 |
| 2008/0290020 A1* | 11/2008 | Marand et al. | 96/12 |
| 2008/0302561 A1 | 12/2008 | Prud'Homme et al. | |
| 2008/0312368 A1 | 12/2008 | Prud'Homme et al. | |
| 2009/0053433 A1 | 2/2009 | Prud'Homme et al. | |
| 2009/0053437 A1 | 2/2009 | Prud'Homme et al. | |
| 2009/0054272 A1 | 2/2009 | Prud'Homme et al. | |
| 2009/0054578 A1 | 2/2009 | Prud'Homme et al. | |
| 2009/0054581 A1 | 2/2009 | Prud'Homme et al. | |
| 2009/0117467 A1* | 5/2009 | Zhamu et al. | 429/231.8 |
| 2009/0123752 A1 | 5/2009 | Prud'Homme et al. | |
| 2009/0123843 A1 | 5/2009 | Aksay et al. | |
| 2009/0127514 A1 | 5/2009 | Korkut et al. | |
| 2009/0169467 A1* | 7/2009 | Zhamu et al. | 423/448 |
| 2009/0233057 A1 | 9/2009 | Aksay et al. | |

FOREIGN PATENT DOCUMENTS

| | | |
|---|---|---|
| WO | WO 2007/047084 A2 | 4/2007 |
| WO | WO 2007/047084 A3 | 4/2007 |

OTHER PUBLICATIONS

U.S. Appl. No. 11/543,872, filed Oct. 6, 2006, Prud'Homme et al.
U.S. Appl. No. 12/791,190, filed Jun. 1, 2010, Prud'Homme, et al.
U.S. Appl. No. 12/866,089, filed Aug. 4, 2010, Crain, et al.
U.S. Appl. No. 12/866,079, filed Aug. 4, 2010, Crain, et al.
U.S. Appl. No. 12/866,306, filed Aug. 5, 2010, Aksay, et al.
Chinese Office Action issued Mar. 30, 2011, in Patent Application No. 200780037081.0 (with English-language translation).
Extended Supplementary European Search Report issued on Feb. 17, 2011 in corresponding European Application No. 07 87 4497.
Sasha Stankovich et al., "Graphene-Based Composite Materials", Nature, Nature Publishing Group, Jul. 20, 2006, vol. 442, XP 002562270, pp. 282-286.
U.S. Appl. No. 12/945,043, filed Nov. 12, 2010, Pan, et al.
U.S. Appl. No. 13/077,070, filed Mar. 31, 2011, Prud'Homme, et al.

* cited by examiner

FIG. 8 a) and b)

FIG. 43 a) and b)

FIG. 44 a) and b)

FIG. 45 a) and b)

FUNCTIONAL GRAPHENE-POLYMER NANOCOMPOSITES FOR GAS BARRIER APPLICATIONS

BACKGROUND OF THE INVENTION

1. Field of the Invention

The present invention relates to a nanocomposite containing functional graphene and a polymer, the method of making and use of the nanocomposite, in particular for barrier membranes such as gas diffusion membranes.

2. Description of the Related Art

Over the past five decades, industrial scale 'composite materials' have been produced by adding numerous minerals and metals to thermosetting, thermoplastic and elastomeric polymers. Donnet, J. B., Nano and microcomposites of polymers elastomers and their reinforcement. *Composites Science and Technology* 2003, 63, (8), 1085-1088. As compared to the bulk polymers, these composites have shown moderate mechanical performance improvements in properties such as Young's modulus, tensile strength, abrasion resistance and storage modulus. However, recent advances in nanoscale particle synthesis have dramatically accelerated the growth of the composite industry. The capacity to synthesize and characterize atomic-level particles has produced a new generation of high-performance fillers. The incorporation of these submicron fillers in polymers, known as 'nanocomposites', has produced unparalleled performance improvements, easily outpacing earlier attempts. Commercial demand for nanocomposite materials has exploded. The possible applications for such materials cover a wide range of industries including food packaging, gasketing, automotive applications, portable electronic devices, etc.

Although this growth has been dominated by thermoplastic research, recently there has been an increased interest in elastomeric nanocomposites. Targeting industrial applications such as tire inner tubes, air springs and cure bladders, efforts have been made to improve the tensile and barrier properties of many commonly used rubbers. As such, work has begun to find cheaper alternatives to common specialty rubbers such as halogenated butyl rubber. In doing so, a number of filler materials have been investigated. Traditional choices include various minerals, carbon black and silicates. However, with advancing synthetic technologies, a number of promising new materials have emerged.

Particular interest is in the area of nanoparticle-filled polymer composites (NCs) in which the nanoparticle has dimensions comparable to those of the polymer chains, has a high aspect ratio of more than 100 and is uniformly dispersed in the polymer matrix. There are several filler materials that have been extensively studied for improvement of mechanical properties, electrical and thermal conductivity of polymer composites, for example, fractal agglomerated nanoparticles (silica and carbon black), carbon nanotubes (CNTs), inorganic clays and alumina silicate nanoplates.

Initial attempts at producing nanoparticle-filled polymer composites often resulted in materials with inadequate nanoparticle dispersion and degraded mechanical properties. Although often impractical for industrial applications, small-scale dispersion methods involving solvent- or monomer based processing have occasionally yielded NCs with multi-functional capabilities and improved mechanical properties. Several problems remain that affect the development of NCs with consistent properties that are viable for use in real world applications: (1) many of the nanoparticles used are expensive (e.g., CNTs); (2) often chemical or mechanical manipulations must be performed to achieve good dispersion that are impractical for large-scale commercial production; and (3) problems of the interfacial energy mismatch of inorganic nanofillers with hydrocarbon polymer matrix phases result in processing and mechanical property difficulties.

A significant amount of work has been done with nanoclays. Nanoclay-reinforced composites have shown enhancements in stiffness, glass transition temperature, barrier resistance, and resistance to flammability in a variety of polymer systems. Nanoclays are also high aspect ratio nanoplates that are, like graphene, derived from inexpensive commodity materials (clays) and thus appropriate for comparison with the projected graphene polymer composites of the present invention. The in-plane modulus of clays should be similar to that of mica, which is ~178 GPa, significantly lower than the 1060 GPa value of graphene (value from graphite in-plane). Recent studies point out that the hydrophilicity of clays makes them incompatible with most polymers, which are hydrophobic. One approach is to render the clays organophilic through a variety of approaches (amino acids, organic ammonium salts, tetra organic phosphonium). Such clays are called "organoclays." These materials have suffered from the cost of the added interfacial modifiers and the instability of these modifiers under processing conditions. In addition, it has been difficult to homogeneously disperse these organoclays in polymer matrices.

Carbon nanotubes (CNT) have also generated significant interest as nanofillers. They have good mechanical properties and large aspect ratios, and their surfaces should be more compatible with hydrocarbon polymers than clay-based nanofillers. As a nanofiller, CNTs have several limitations, one of which is their cost of production. Since they are made in a gas-phase process, the production costs are more expensive than solution-based processes operating at high density. The production of single wall carbon nanotubes (SWCNTs) requires the addition of metal catalysts that must be removed to produce pure SWCNT materials, or results in the presence of heavy metal contaminants in the final materials if not removed.

Graphite is a "semi-metal," and recent efforts have demonstrated that extremely thin (few layers thick) nanoplates obtained from highly oriented pyrolytic graphite (HOPG) are stable, semimetallic, and have exceptional properties for metallic transistor applications.

Even though graphene sheets have the same $sp^2$ carbon honey comb structure as carbon nanotubes (CNTs), until now, it has not been possible to effectively produce the highly dispersed, thin sheets needed to make graphene applications in polymer nanocomposites, in particular for gas barrier applications, possible.

SUMMARY OF THE INVENTION

It is therefore an object of the present invention to provide a nano filler material, functionalized graphene sheets (FGS) that is suitable for polymer nanocomposites.

It is another object of the present invention to provide a nano filler material based on modified graphite that improves the gas barrier properties of polymer materials.

It is another object of the present invention to provide a nano filler material based on modified graphite that improves not only the gas barrier properties of polymer materials but simultaneously improves the mechanical (strength, toughness, modulus) and thermal stability of the polymer composite.

It is another object of the present invention to provide a nano filler material based on modified graphite that improves not only the gas barrier properties of polymer materials but simultaneously improves the electrical conductivity of the polymer composite.

This and other objects have been achieved by the present invention the first embodiment of which includes a gas diffusion barrier, comprising:

a polymer matrix; and a functional graphene which displays no signature of graphite and/or graphite oxide, as determined by X-ray diffraction.

In another embodiment, the present invention relates to a process for manufacturing a gas diffusion barrier, comprising:

adding a functional graphene which displays no signature of graphite and/or graphite oxide, as determined by X-ray diffraction, to a polymer matrix.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENT INVENTION

Figure 1:
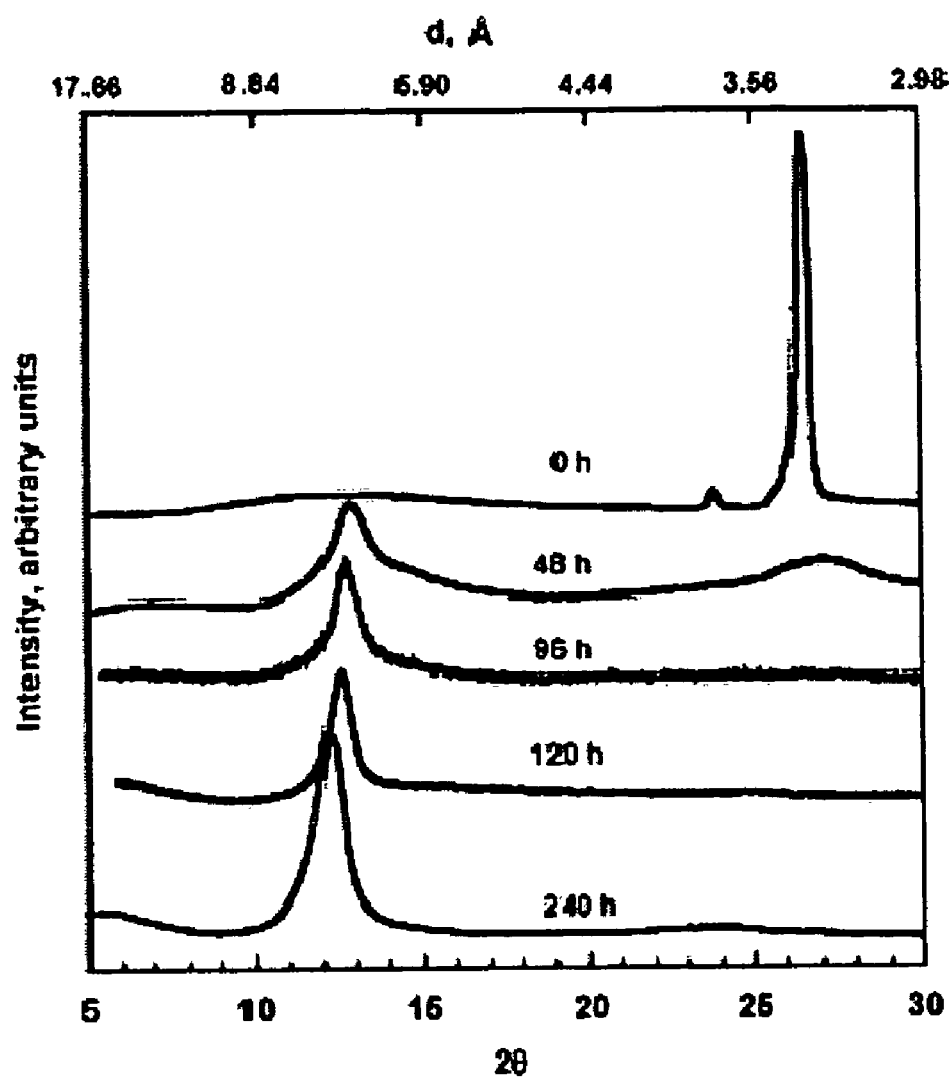
FIG. 1 illustrates XRD patterns of graphite and graphite oxide prepared by oxidation for different durations.

The inventors of the present invention have investigated the mechanical, thermal, electrical, and gas barrier properties of graphene filled polymer nanocomposites. In one embodiment, single graphene sheets with high surface area (>600 m$^2$/g) are obtained from an oxidation process that is followed by rapid exfoliation of graphite. As a result of this process, the graphene sheets are decorated mainly with epoxide, carboxylic acid and hydroxyl groups and, thus, unlike carbon nanotubes no surface functionalization is necessary to improve the dispersion of graphene fillers in the polymer matrix.

Functional Graphene Sheets

Exfoliated graphite offers the mechanical performance of CNTs at the price of clay fillers. Exfoliated graphite has the potential to generate a new class of affordable, high-performance nanocomposites.

Graphite may be exfoliated using chemical or thermal methods. In these methods, the weakly bound graphene sheets break apart. The backbone of each method centers on the acid treatment of graphite through processes like those proposed by Staudenmaier or Hummers (Staudenmaier, L., Verfahren zur darstellung der graphitsäure. *Berichte der Deutschen Chemischen Gesellschaft* 1898, 31, 1481; Hummers, W. S.; Offeman, R. E., Preparation of Graphitic Oxide. *Journal of the American Chemical Society* 1958, 80, (6), 1339-1339).

Exfoliation of GO can be achieved at room temperature, using chemical means. For example, the GO can be intercalated with MoCl$_5$, to which an excess of hydrazine monohydrate (N$_2$H$_4$.H$_2$O) is added.

Another mechanism for exfoliation is to rapidly heat the GO, allowing for the rapid expansion of the graphene sheets to obtain thermally exfoliated GO (FGS).

Through the exfoliation procedure, small molecules can be intercalated in between individual graphene sheets. Given that the sheets are held together by weaker Van der Waals forces, such molecules push the carbon layers apart, easily allowing for the oxidation of the graphite sheets. After washing and the removal of excess intercalants, only graphite oxide (GO) is left behind. This new material can be characterized by x-ray diffraction (XRD) as the interplanar spacing increases from 0.34 nm (native graphite) to 0.71 nm (GO). With this oxidation complete, a few different methods can then be used to exfoliate the resulting GO.

In conventional polymer nanocomposites, carbon black or clay are the major type of fillers that are used industrially. Carbon black has a spherical and aggregated structure and, thus, it does not significantly improve the gas permeation properties. Although clay platelets show some improvements in gas barrier properties, they lack other properties such as mechanical reinforcement and electrical conductivity. In addition, due to its inorganic nature, dispersion of clay platelets in an organic polymer matrix has been a crucial obstacle. However, with the present invention, in addition to gas permeation properties, both mechanical reinforcement and electrical conductivity of polymer composites can be improved at low loadings of graphene fillers (>0.1 wt %) due to its sheet like structure.

The relatively low cost of graphite as compared to CNTs make exfoliated graphite an attractive material. The use of graphite nanoplatelets (GNPs) is advantageous because of the chemistry of the graphene and graphene-like sheets compared to clay nanoplates. The inventors of the present invention have found that exceptionally rich chemistry of carbon can be utilized for interface engineering in composites and also for many other possible application areas, such as the use of graphene plates in nanoelectronics and sensors. Graphene and graphene-like plates are hydrophobic and thus compatible with a broad range of polymers and other organic materials, including proteins, and DNA. Additionally, it is possible to "tune" the wettability of graphene sheets through chemical coupling with functional groups.

Graphite or graphene sheets interact with each other through van der Waals forces to form layered or stacked structures. Theoretically, graphene sheets may have a surface area as high as 2,600 m$^2$/g, since they are composed of atomically thick layers. Graphite has anisotropic mechanical properties and structure. Unlike the strong sp$^2$ covalent bonds within each layer, the graphene layers are held together by relatively weak van der Waals forces. Due to this anisotropy, graphite has different properties in the in-plane and c-axis direction.

The chemical modification of graphite to intercalate and oxidize the graphene sheets has been described in the literature. Intercalation, a process in which guest materials are inserted into the "gallery" of host layered materials, creates a separation of these sheets beyond the 0.34 nm spacing of native graphite. Layered materials that form intercalation compounds include graphite, boron nitride, alkali metal oxides and silicate clays. Among these materials, graphite and boron nitride are the only solid layered materials that are composed of atomically thin sheets of atoms and are unique in their ability to form "stages" in which a monolayer of guest intercalant is separated by n multilayers of host to form "stage-n" compounds. The intercalation process usually involves chemical reaction and charge transfer between the layered host material and reagent, resulting in the insertion of new atomic or molecular intercalant layers. Due to its amphoteric nature, graphite can react with reducing or oxidizing agents, leading to the formation of either donor or acceptor type graphite intercalation compounds (GICs). For donor GICs, the intercalates (anions) donate electrons to the host layers, whereas for acceptor GICs the intercalates (cations) extract electrons from the host layers. The process of the present invention begins with, and is dependant on, the substantially complete intercalation of graphite to form stage n=1 graphite oxide.

The effect of intercalation on the bond lengths of the carbon atoms in bounding layers also depends on whether donors or acceptors are considered. Furthermore, with alkalis there is a small expansion over the pristine value of 1.420 Å that is roughly proportional to the valence and inversely proportional to the stage index and ionic radius of the metal. The intercalation process may result in deformation or rumpling of the carbon layer by the intercalant. A local buckling of the carbon layers may also occur.

The result of partial oxidation of graphite produces graphite oxide (GO). Many models have been proposed to describe the structure of graphite oxide. However, the precise structure of GO is still an area of active research.

A process of making expanded graphite materials with an accordion or "worm-like" structure has been proposed. These materials have many applications, including electromagnetic interference shielding, oil spill remediation, and sorption of biomedical liquids. The majority of these partially exfoliated graphite materials are made by intercalation of graphite with sulfuric acid in the presence of fuming nitric acid to yield expanded graphitic material. These expanded materials are then heated to yield an increase in the c-axis direction. While these materials are sometimes referred to as "expanded graphite" or "exfoliated graphite," they are distinct from the FGS of the present invention. For these "worm-like" expanded graphite oxide materials, the individual graphite or GO sheets have been only partially separated to form the "accordion" structures. Although the heating results in an expansion in the c-axis dimension, the typical surface area of such materials is in the order of 10-60 $m^2/g$. Both the surface area below 200 $m^2/g$ and the presence of the 0002 peak of the pristine graphite corresponding to a d-spacing of 0.34 nm are indicative of the lack of complete separation or exfoliation of the graphene sheets. While the term "graphene" is used to denote the individual layers of a graphite stack, and graphite oxide denotes a highly oxidized form of graphite wherein the individual graphene sheets have been oxidized, graphene will be used to denote the layered sheet structure that may be in a partially oxidized state between that of native graphene and graphite oxide.

The present invention relates to a material based on modified graphite that is appropriate, for example, as a nanofiller for polymer composites, a conductive filler for composites, an electrode material for batteries and ultracapacitors, as a filler to improve diffusion barrier properties of polymers, and as a hydrogen storage material. The graphite nanoplatelet (GNP) material is distinct from previous graphitic materials, which lack one or more of the attributes required for a successful nanofiller. Also, the present invention relates to a material based on modified graphite that is electrically conductive and can confer electrical conductivity when formulated with a polymer matrix. The present invention further relates to a material based on modified graphite that has a high aspect ratio so that it can perform as a barrier to diffusion when incorporated in a polymer composite.

Figure 4B:
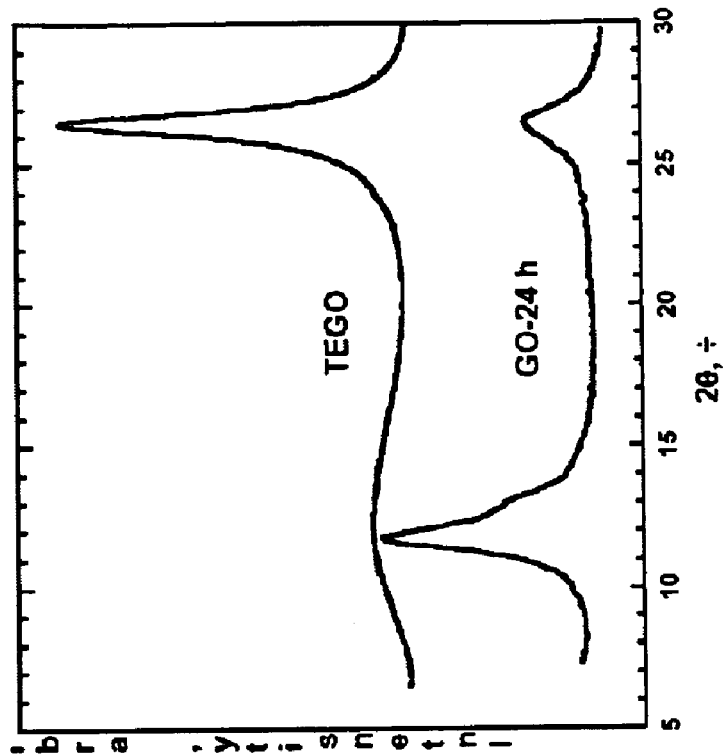
FIGS. 4a and 4b illustrate XRD patterns of FGS and GO samples prepared by oxidation for 96 and 24 hours and rapidly expanded at 1050° C. The incompletely oxidized GO in FIG. 4b produces a more pronounced peak at 2θ≈26.5° after heat treatment.

More specifically, the present invention relates to a novel material based on exfoliation of oxidized graphite by a novel process. The initial step of the process is the intercalation and oxidation of natural graphite to form oxidized graphite, or graphite oxide (GO). The initial step causes the spacing between graphene layers to expand with loss of the native 0.34 nm spacing. During the expansion process, a peak associated with the 0.34 nm spacing as seen in XRD patterns will disappear and simultaneously a peak associated with a 0.71 nm spacing will appear. The best measure for substantially complete intercalation and oxidation of graphite is the disappearance of the 0.34 nm diffraction peak and its replacement with only the 0.71 peak. So far the literature has not reported such complete intercalation and oxidation of graphite. Substantially complete intercalation is represented, for example, in FIGS. 4 and 5. The resulting functional groups on GO, such as hydroxyl, epoxy, and carboxylic groups, alone or in combination, facilitate the retention of water molecules in the galleries between the GO layers. Rapidly heating the GO (after the 0.34 nm XRD peak is completely replaced by the 0.71 nm peak) results in superheating and volatilization of the intercalants, imbibed solvent, such as water and mixture of water with water-soluble solvents, and evolution of gas, such as $CO_2$, from chemical decomposition of oxygen-containing species in the graphite oxide. These processes, individually and collectively, generate pressures that separate or exfoliate the GO sheets. In the context of the present invention, the term "exfoliate" indicates the process of going from a layered or stacked structure to one that is substantially de-laminated, disordered, and no longer stacked. This procedure yields disordered GO sheets which appear as a fluffy, extremely low density material with a high surface area. Disordered GO shows no peak corresponding to 0.71 nm in the X-ray diffraction pattern. During rapid heating in an inert atmosphere, the GO is partially reduced and becomes electrically conductive. The rate of heating can be at least about 2000° C./min, preferably higher than 2000° C./min. The inert atmosphere is not particularly limited as long the gas or gas mixture is inert. Preferably, nitrogen, argon or mixtures thereof are used. In addition, reducing atmospheres may be used, such as carbon monoxide, methane or mixtures thereof. The FGS can be readily dispersed in polar solvents and polymers, and can be used, for example, in composites as nanofillers, in ultracapacitors, as dispersants, and as hydrogen storage materials.

The water enters through interactions with the polar oxygen functionality and the ionic intercalants. But water is not an intercalant.

The water retention in the galleries between the water molecules may be 1 to 500%, preferably 1 to 300%, and most preferably 1 to 100% by weight based on the total weight of the GO. The water retention includes all values and subvalues there between, especially including 5, 10, 20, 40, 60, 80, 100, 150, 200, 250, 300, 350, 400, 450% by weight based on the total weight of the GO. The water used is preferably deionized water, preferably water having a resistivity between 100 and 0.2 MΩ/cm, more preferably between 50 to 0.2 MΩ/cm, most preferably between 18 to 0.2 MΩ/cm. The resistivity includes all values and subvalues there between, especially including 0.5, 1, 2, 3, 4, 5, 6, 7, 8, 9, 10, 11, 12, 13, 14, 15, 16 and 17 MΩ/cm.

The solvent for conducting the oxidation of graphite to produce graphite oxide is not particularly limited. While the preferred medium is water, co-solvents or additives can be used to enhance wetting of the hydrophobic graphite flakes. Solvents and/or additives may be used alone or in combination. Preferred additives include alcohols such as methanol, ethanol, butanol, propanol, glycols, water soluble esters and ethers, surfactants such as non-ionic ethylene oxide, propylene oxide and copolymers thereof, alkyl surfactants such as the Tergitol family surfactants, or the Triton family of surfactants, or surfactants with ethylene oxide and propylene oxide or butylene oxide units. Examples of these include the Pluronic or Tetronic series of surfactants. Cosolvents and surfactants can be used at levels from 0.0001 to 10 wt. % of the solution phase. The amount of cosolvents and surfactants includes all values and subvalues there between, especially including 0.0005, 0.001, 0.005, 0.01, 0.05, 0.1, 0.5, 1, 1.5, 2, 2.5, 3, 3.5, 4, 4.5, 5, 5.5, 6, 6.5, 7, 7.5, 8, 8.5, 9 and 9.5% by weight based on the solution phase.

The polar functional groups on FGS, are preferably hydroxyl, epoxy groups and carboxylic acid groups or their derivatives. These polar groups can be functionalized using molecules that are reactive toward these polar functional groups. More than one type of functional groups may be included. For example, alkyl amines and dialkyl amines can be used to add hydrophobicity to the surface by reaction to epoxides, and can be used to covalently crosslink the FGS surfaces. Acid chlorides can react with hydroxyls to add alkyl groups. Reactions of amines or hydroxyls with carboxylic acids can be used to attach groups to make the surface more hydrophobic by adding alkyl groups. The surfaces can be made more hydrophilic by adding ethylene oxide, primary and secondary amines and acid functionality using, for example the chemistries listed above. An important class of modification includes the grafting of species on the surface to increase the cohesive interactions between the filler surface and polymer matrices. These grafting agents can include low molecular weight analogs of the polymer matrix phase, or polymers with the same composition as the matrix phase that have reactive functionality. These might include polyethylene or polypropylene copolymers of vinyl acetate or maleic anhydride or their mixtures to induce compatibility between FGS and olefin polymers.

Intercalants include but are not limited to inorganic acids or their salts, alone or in mixtures, preferably $HNO_3$, $H_2SO_4$, $HClO_4$, $KClO_4$.

Gases evolved during heating include water vapor from bound water between the GO layers, oxides of sulfur. $SO_x$ and $H_2S$ from intercalated sulfates not removed by washing, oxides of nitrogen $NO_x$ if nitrates are used as intercalants, $CO_2$, $CO$, and $C_nH_mO_o$ species from partial reduction and elimination of oxygenated species from the GO precursor. X, m, n, o are numbers, preferably integers. More than one kind of gas may evolve during the heating. In one embodiment, IR-spectra of the decomposition products in the vapor phase during exfoliation show the presence of $SO_2$, $CO_2$ and water in the unwashed GO sample and only $CO_2$ and water in the washed sample. The $SO_2$ arises from decomposition of the intercalated sulfate ions, and the $CO_2$ comes from decomposition of oxygenated species on GO. Minor amounts of higher carbon number evolved gaseous products may be produced. And if nitrate intercalants are used there may be NOx species released.

The rapid heating in an inert gas atmosphere occurs as follows. Rapid heating of the GO precursor is required to successfully produce FGS. If the temperature increase is too slow then evolved gases can escape through the lateral channels between GO sheets without building pressures great enough to exfoliate the GO. Inadequate heating rates can occur because the temperature gradient between the sample and the oven is too low, the temperature gradient is applied too slowly, or too large of a sample is processed at one time so that heat transfer resistances inside the GO bed result in slow heating of the interior of the sample bed. Temperature gradients on the order of 2000° C./min produce FGS materials of surface areas as high as 1500 m²/g. This corresponds to 30 second heating times in a 1050° C. tube furnace. Heating rates of 120° C./min produced FGS samples with only 500 m²/g. Gradients even higher will produce even greater exfoliation, with the limit being the theoretical maximum value of 2600 m²/g. In order to attain the maximum surface area, it may necessary to colloidally disperse FGS in polar solvent and measure the surface area by adsorption methods in solution. This will ensure that all the surface area is available as a result of colloidal dispersion. In addition to the rate of increase of heating, the final temperature must be great enough to nucleate boiling of the water and decomposition of the GO oxides and intercalated ions. Thermal gravimetric studies indicate that temperatures of greater than 250° C. are required for complex vaporization of volatile components. If the GO is exposed to temperatures greater than 3000° C. excessive degradation of the GO structure may occur. However, that is the temperature experienced by the GO. GO samples exfoliated in flame burners may involve flame temperatures in excess of 3000° C., but short residence times in the flames or the cooling effects of vaporization of solvents or evolved gases may keep the temperature experienced by the particle less than 3000° C., even though the flame temperature is greater.

Polar solvents into which FGS can be dispersed include water, n-methylpyrolidone (NMP), dimethyformamide (DMF), tetrahydrofuran (THF), alcohols, glycols such as ethylene glycol, propylene glycol and butylene glycol, aliphatic and aromatic esters, phthalates such as dibutyl phthalate, chlorinated solvents such as methylene chloride, acetic esters, aldehydes, glycol ethers, propionic esters. Representative solvents of the desired classes can be found at the Dow Chemical web site (http://www.dow.com/oxysolvents/prod/index.htm). The polar solvent may be used alone or in combination. Mixtures with non-polar solvents are possible.

The hydroxyl groups on the FGS surface can be initiation sites from which polymer chains can be grown using controlled free radical polymerization (RAFT, ATR, NMP, or MADIX polymerization) schemes. Any monomer having a polymerizable can be used. Preferred monomers are aromatic monomers such as styrene, methacrylates, acrylates, butadienes and their derivatives. The monomers may be used alone or in mixtures.

The present invention relates to a functional graphene (FGS) produced by a process which comprises: (a) oxidizing and/or intercalating a graphite sample, resulting in a graphite oxide with expanded interlayers; and (b) heating the graphite oxide to cause superheating and gas evolution from the intercalated water and/or solvent, the intercalant, and the decomposition of the graphite oxide. The rapid increase in pressure substantially exfoliates or disorders the GO layer stacking.

Figure 4A:
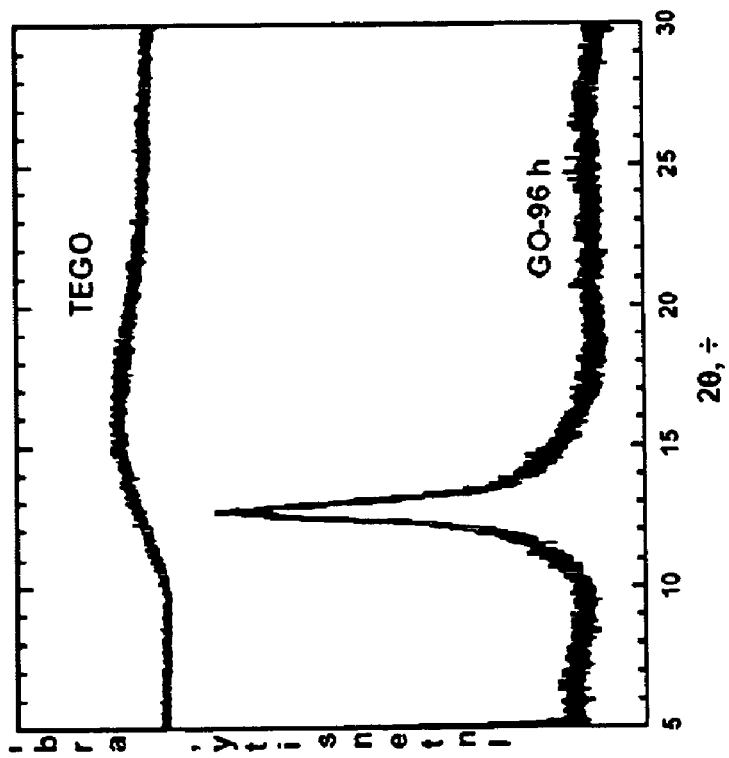
Figure 5:
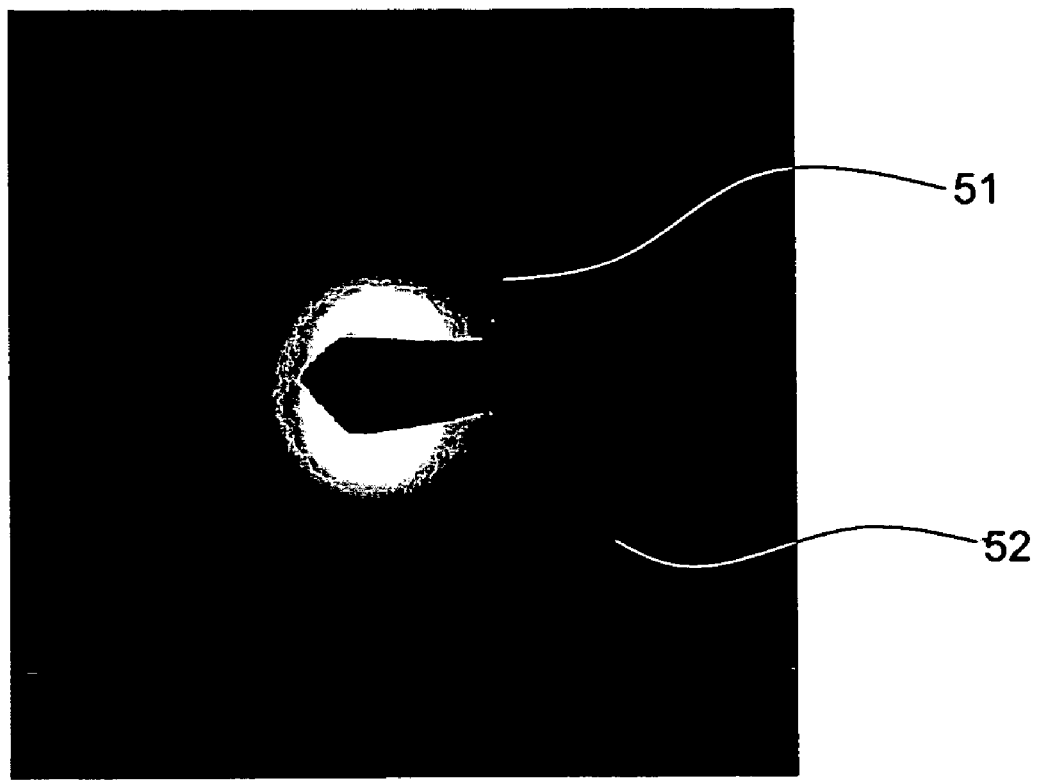
FIG. 5 shows a Selected Area Electron Diffraction (SAED) pattern of FGS produced from fully oxidized GO (96 hours) with no structure in the diffraction rings. The structure of FGS is found to be totally disordered commensurate with the XRD information in FIGS. 4a and b.

Substantial exfoliation of FGS is defined by the absence of a X-ray diffraction peak from the original graphite peak at 2θ~26.5° (0.34 nm separation distance between the graphene sheets), as shown by comparing the XRD pattern in FIG. 4a for FGS and the original XRD pattern for pure graphite in FIG. 1. There is less than 1% peak area in the range of 2θ between 24 and 29° relative to the area of the broad FGS peak between 2θ of 10-20°. Improper or incomplete exfoliation can result in materials shown in FIG. 4b which show the presence of the graphite peak and the broad FGS peak. This material is not the material we refer to in this patent as FGS. For the FGS material described in the present invention, the area under the diffraction peak between 2θ=12.5 and 14.5°, which is from the original GO sheet (see FIG. 4a), is less than is less than 15% of the total area under the FGS peak between 2θ=9 and 21°.

The present invention further relates to a method for manufacturing FGS which comprises the steps noted above. The heating in step b) may take place in a furnace at a temperature of from 300 to 2000° C., preferably, 800 to 1200° C. and most preferably at about 1000° C. The temperature includes all values and subvalues there between, especially including 400, 500, 600, 700, 800, 900, 1000, 1100, 1200, 1300, 1400, 1500, 1600, 1700, 1800, and 1900° C. The higher the temperature, the shorter the heating time. The heating time also depends on the volume of the sample and on any limitations heat conduction may pose. A sample having a larger volume may require a longer heating time. The heating time is preferably between 1 sec and 5 min. The heating time includes all values and subvalues there between, especially including 5, 10, 20, 30, 40, 50, seconds, 1 min, 1.5, 2, 2.5, 3, 3.5, 4, 4.5 minutes.

In another embodiment, step b) may take place by spraying through a flame at a temperature of about 2500° C. The transit time in this case is in the order of a fraction of a second to about 1 second. The superheating in step b) refers to the local hating of the water between the sheet to a temperature of more than 100° C.

In a preferred embodiment, the process further comprises the steps of removing acids and salts from the graphene interlayers prior to heating the graphite oxide, as well as drying the graphite oxide to remove excess water and solvent, while leaving intercalated species, adequate water and solvent for exfoliation, prior to heating the graphite oxide. The salts being removed are the ionic species involved in the initial oxidation and intercalation. They include $H^+$, $K^+$, chlorate ions, nitrate ions, sulfate ions, and organic acids that may arise from decomposition of the graphite structure.

In the context of the present invention, the phrase adequate water refers to the following. During heating to produce exfoliated FGS the superficial water that is water on the surfaces of the oxidized GO sheets must be removed. This can be done in a "predrying" step to reduce the water content to between 500 wt % to 0.5 wt % (weight of water to weight of dry GO). The preferred water content for processes that involve heating GO granular powders is between 75% and 2% water, and the most preferred range is 20% to 5%. These powders are subsequently heated to induce exfoliation in a furnace, flame, fluidized bed, or microwave heating device. Heating may also occur in a larger tube or by a flame process one could spray in an aqueous slurry of the GO. In the flame process the excess (superficial) water would vaporize without causing exfoliation. During the evaporation of superficial water, the vaporization keeps the temperature around the boiling point of the solvent (i.e. ca 100° C.). Once the superficial water is evaporated, then the partially dried GO experiences the very high temperature and exfoliates.

Other processes for heating GO to rapidly expand it to FGS may involve injecting slurries of GO in bulk aqueous solution into the heating device. These slurries may contain GO concentrations from 1-85 wt % GO based on the total weight of the slurry. The amount of GO includes all values and subvalues there between, especially including 5, 10, 15, 20, 25, 30, 35, 40, 45, 50, 55, 60, 65, 70, 75, and 80 wt. %. The slurries may be directly injected into a furnace which may be a tube furnace, a fluidized bed heater, a flame burner with a reducing zone, or a microwave chamber. The superficial water or solvent is initially evaporated and subsequently the GO with intercalated aqueous solvent is superheated and the GO is exfoliated.

The FGS produced in accordance with the present invention preferably has a surface area of from about 300 $m^2/g$ to 2600 $m^2/g$, preferably 300 $m^2/g$ to 2400 $m^2/g$, more preferably 300 to 1100 $m^2/g$, a bulk density of from about 40 $kg/m^3$ to 0.1 $kg/m^3$ and a C/O oxygen ratio, after high temperature expansion, in the range of from about 60/40 to 95/5, with a range of about 65/35 to 85/15 particularly preferred. The maximum calculated surface area will be 2600 $m^2/g$. based on the surface area of a single graphite sheet. The surface area includes all values and subvalues there between, especially including 400, 500, 600, 700, 800, 900, 100, 110, 1200, 1300, 1400, 1500, 1600, 1700, 1800, 1900, 2000, 2100, 2200, 2300, 2400, and 2500 $m^2/g$. The bulk density includes all values and subvalues there between, especially including 0.5, 1, 5, 10, 15, 20, 25, 30, 35 $kg/m^3$. The C/O oxygen ratio includes all values and subvalues there between, especially including 65/35, 70/30, 75/25, 80/20, 85/15 and 90/10. High temperature expansion occurs in the temperature range of 250° C. or more, preferably at temperatures of from 250 to 3000° C.

The FGS of the present invention displays essentially no signature of the original graphite and/or graphite oxide as determined by XRD, and is produced by a process that involves oxidation of layered graphite to produce graphite oxide, using a material selected from e.g., sulfuric acid, nitric acid, hydrogen peroxide, perchlorate, or hydrochloric acid as oxidizers. The oxidant is not particularly limited. Preferred oxidants include $KClO_4$, $HNO_3+KClO_3$, $KMNO_4+NaNO_3$, $K_2S_2O_8+P_2O_5+KMNO_4$, $KMNO_4+HNO_3$, $HNO_3$. Another preferred method is polarization at a graphite electrode by electrochemical oxidation. Mixtures or combinations of these oxidants may be used. The resulting functional graphene functions as a nanofiller. The FGS material displays essentially no signature of the original GO stacking as determined by XRD. The height of the X-ray peak between $2\theta=10\text{-}15°$ is less than 20% of the height of the peak between $2\theta=22\text{-}30°$ in the original GO material when X-ray measurements are calibrated for absolute scattering intensities. For improvement of mechanical properties, electrical and thermal conductivity of polymer composites, the aspect ratio of the nanofiller should be greater than 100, the filler should be of a size such that its minor dimension is comparable to the dimensions of the polymer chains, and the filler should be uniformly dispersed in the polymer network.

The functional graphene (FGS) of the present invention shows no visible sign of the 002 peak (either at 0.34 nm or 0.71 nm interplane separation distance) that characterizes graphitic materials neither in the XRD nor in the SAED patterns. In a preferred embodiment of the present invention, there are several steps involved in the preparation of FGS: First is the complete intercalation and oxidation of graphite. This is needed so as to permit disruption of the London-van der Waals forces and to allow the incorporation of water or other volatile solvent molecules into the stack structure. The acids and salts are then removed from the graphene interlayers. The GO is then appropriately dried to remove excess water or solvent, while leaving adequate solvents and intercalants to effect exfoliation. The drying method is not particularly limited. Drying may take place at room temperature, at a temperature of from room temperature to 100° C., or in a vacuum oven. The GO is dried until the water or other solvent content is between 1 and 500% by weight, preferably, 1 to 300% by weight and most preferably 1 to 20% by weight, based on the total weight of the GO. The amount of water or other solvent includes all values and subvalues there between, especially including 1, 2, 3, 4, 5, 6, 7, 8, 9, 10, 11, 12, 13, 14, 15, 16, 17, 18 19, 20, 30, 40, 50, 60, 70, 80, 90, 100, 150, 200, 250, 300, 350, 400, and 450% by weight. Finally, the GO is rapidly heated to cause superheating of the intercalated water and the decomposition of the intercalants. This causes the intercalated water and the intercalants to vaporize or decompose faster than they can diffuse out of the interlayer spaces, generating large local pressures that force the graphite oxide layers apart. The result is the highly expanded FGS structure with unique properties as a nanofiller.

The polarity of the FGS surface can be modified to adjust the dispersion of the FGS in liquid or polymeric matrices. This modification can be accomplished during processing by controlled the extent of reduction during exfoliation. This is accomplished by controlling the time and temperature history of the sample. After the initial exfoliation leaving the sample at an elevated temperature will result in less polar functionality. Exfoliation in an atmosphere with gas compositions favoring reduction will enhance reduction (such as CO or $CH_4$), and gas compositions with higher oxidative power will enhance polar functionality (such as mixed inert and oxygen gases). It is possible to alter the polarity of the FGS surface after production by chemical reaction through the OH, epoxide, and carboxylate groups on the FGS surface.

Additional information regarding the characterization of FGS by methods such as AFM is provided in Schniepp et al., Journal of Physical Chemistry B, Letters, 2006, 110, 8535-8539, Apr. 11, 2006 The article is incorporated in its entirety by reference.

In spite of nearly 150 years of extensive research on graphite intercalation and expansion, complete exfoliation of graphite down to individual graphene sheets has not been achieved. Thus far, thermal or chemical expansion and exfoliation of graphite have only produced materials with surface areas <600 $m^2/g$, well below the theoretical value of ~2,600 $m^2/g$ predicted for completely delaminated graphene sheets.

The rapid thermal expansion of GO of the present invention offers a unique opportunity for very thin nanoplates to be used as a nanoscale reinforcer in polymer matrices. Due to the presence of polar oxygen functional groups on the surface of what the present invention refers to as FGS, a polymer with polar or potentially reactive side groups reinforced with FGS has superior properties in comparison to similarly processed nanocomposites containing single-wall carbon nanotubes (SWCNTs) and traditional EG.

FGS may be used in polymer composites, particularly in conductive polymer composites, as additive in elastomeric materials, in elastomer diffusion barriers, as hydrogen storage medium, as material for supercapacitors, in flexible electrodes, as adsorbent material, as dispersant, as lubricant, in coatings, particularly in coatings that require UV stability. Further FGS can be used in glass or ceramic composites, in thermoelectric composite materials, as pigments in inks, or as UV protective filler in composites. FGS can also be used for electromagnetic shielding, and oil spill remediation.

Polymer Matrix

The polymer matrix of the nanocomposite of the present invention preferably contains thermoplastic polymers and elastomeric polymers and mixtures thereof.

Polymers in which FGS can be dispersed include, but are not limited to: polyethylene, polypropylene and copolymers thereof, polyesters, nylons, polystyrenes, polycarbonates, polycaprolactones, polycaprolactams, fluorinated ethylenes, polyvinyl acetate and its copolymers, polyvinyl chloride, polymethylmethacrylate and acrylate copolymers, high impact polystyrene, styrenic sheet molding compounds, polycaprolactones, polycaprolactams, fluorinated ethylenes, styrene acrylonitriles, polyimides, epoxys, polyethylene terephthalate (PET) and polyurethanes. Elastomers that can be compounded with FGS include, but are not limited to, poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/di(propylene glycol)/polycaprolactone, poly[4,4'-methylenebis(phenyl isocyanate)-alt-1,4-butanediol/polytetrahydrofuran, amine terminated polybutadiene such as HYCAR ATB2000X173, carboxyl terminated polybutadiene such as HYCAR CTB2000X162, polybutadiene, dicarboxy terminated butyl rubber, styrene/butadiene copolymers, polyisoprene, poly (styrene-co-butadiene), polydimethysiloxane, and natural latex rubber. The polymers may be use alone or in combination.

It is possible to compound FGS into the monomeric precursors of these polymers and to effect the polymerization in the presence of the FGS nanofiller. The polymers and/or their precursors may be use alone or in combination.

Suitable thermoplastic polymers include but are not limited to polyimide, polyurethane, (meth)acrylates such as polymethyl methacrylate, epoxies, polyolefins such as polypropylene, polystyrene and poly($\in$-caprolactone).

Suitable elastomeric polymers include but are not limited to acrylonitrile-butadiene copolymer, elastomers having triblock copolymer architecture, poly(styrene-b-butadiene) copolymers, BR and styrene-butadiene copolymer (SBR) vulcanizates, natural and synthetic rubber, butadiene and acrylonitrile copolymer (NBR), polybutadiene, polyesteramide, chloroprene rubbers (CR) and mixtures thereof.

In one embodiment, amorphous and crystalline plastics such as PMMA and PE are used as polymer matrix.

In a preferred embodiment, vulcanized natural (NR) and styrene-butadiene (SBR) rubbers, polystyrene-polyisoprene-polystyrene (PS-PI-PS) and polysiloxanes such as PDMS are used as a polymer matrix.

Nanocomposites

The functional graphene-polymer nanocomposite of the present invention contains a polymer matrix as defined above and functionalized graphene sheets as fillers.

Commonly used additives rubbers can be added. Additives such as proteins in NR are useful in dispersing FGS in the matrix. Further, the interfacial properties of FGS can be controlled with surfactants that will improve the dispersion in the matrix and interfacial strength. These surfactants also modify the barrier characteristics. The surfactants include but are not limited to anionic, cationic and nonionic surfactants and mixtures thereof.

The functional graphene-polymer nanocomposite can be employed in all the areas where polymers (plastics, rubber, elastomers, etc.) are used for gas barrier applications including tires and packaging. The functional graphene-polymer nanocomposite can be used in many areas where both traditional and nano-composites are used including tires, bladder, packaging material, and in other areas where good gas permeation, mechanical and electrical properties are required. The material is relatively easy to manufacture compared to other nano-sized filler that are used in the composites and it is naturally available (graphite). Unlike other available fillers in the industry (carbon nanotubes, clay, carbon black), properties such as electrical conductivity, low gas permeation, high strength and high modulus can be all accessed in the same material due to graphene's plate like structure.

The FGS increases the conductivity of polymeric matrices by factors of $10^{11}$ to $10^{18}$ over the range of filler loadings between 0.1 to 20 wt %, preferably 1.5 and 5 wt %, based on the weight of the polymer composite or ink formulation. The amount of filler includes all values and subvalues there between, especially including 0.5, 1, 1.5, 2, 2.5, 3, 3.5, 4 and 4.5 wt %. This corresponds to conductivity increases from $10^{-19}$ S/m to $10^{-8}$-$10^{-1}$ S/m for a 1.5 to 5 wt % loading of FGS in PMMA. Higher conductivities above 0.01 to 1000 S/m can be attainable in more highly filled composite or ink formulations. The basic conductivity of the individual FGS sheet is on the order of ½ to 1/10 of the conductivity of graphite based on the percentage of oxygen that disrupt the pure $sp^2$ graphitic structure. Commonly reported values for the in-plane conductivity of pure graphite sheets are 2 to $5 \times 10^5$ S/m.

Preferably, the functional graphene-polymer nanocomposite is made by either solution or melt processing of polymer matrix and functionalized graphene sheets.

Preferably mixing is done in at a temperature of from −20 to about 500° C., preferably from room temperature to 300° C., more preferably from 80 to 150° C. Preferably, an extruder is used. The processing can last from 1 sec to a day, preferably 1 min. to 12 hours, more preferably 5 min. to 1 hour. Preferably, the composite materials are processed for less than 1 hr with 100 or 200 revolutions per minute speeds (rpm). For solution processing all steps are preferably done at room temperature. The mixing is preferably performed using a magnetic stir bar.

Any apparatus that allows mixing and melting of the components for the nano composite can be used. An extruder such as a twin screw extruder is preferred. Melt processing can also be performed using a 3 roll mill. The temperature of the compounding is preferably between the softening and the melting point of the polymer material. Compounding is preferably done at 80° C.

For melt processing of these materials twin-screw extruder or roll-mill are preferably used. In the case of solution processing, the solvent is removed either by evaporation or precipitation. Any solvent that dissolves the polymer may be used including polar and non-polar solvents, preferred is THF. After these dispersion steps the compounded materials are melt pressed and/or vulcanized at high temperatures. The vulcanization and melt pressing is done at room temperature to 300° C., preferably 150° C. for 20 minutes for natural rubber samples.

The shape of the composite is not limited. The composite can be in the shape of a film or sheet. The thickness can be from 1 μm to 5 cm, preferably 5 μm to 1 cm, more preferably 100 μm to 1 mm. Thin sheets with a thickness of 0.5 mm are preferred. However, there is no particular limitation on the thickness of the sheets.

When adding FGS nanofillers to polymer matrices to prepare polymer composites, the large aspect ratio of the nanosheets and the very high surface area interfacing with the polymer matrix will produce composites with enhanced mechanical properties. Preferred are aspect ratios greater than 100 which increase the tensile modulus at loading levels as low as 3%. Work on surface-modified clay nanosheets has shown enhancement in mechanical properties. However, the dielectric mismatch between the organic carbon matrix and the clay sheet has created problems in dispersion of clays in composites. Further, the elastic modulus of graphene sheets vs. clays provides an added advantage in tuning the elastic properties of the composites to higher stiffness values. The organic composition of FGS and its surface functionality allows its incorporation into composites without extensive surface functionalization and with facile dispersion. Polymers that can be compounded with FGS nanofillers are those stated above including, but not limited to: polyethylene, polypropylene and copolymers thereof, polyesters, nylons, polystyrenes, polycarbonates, polycaprolactones, polycaprolactams, fluorinated ethylenes, polyvinyl acetate and its copolymers, polyvinyl chloride, polymethylmethacrylate and acrylate copolymers, high impact polystyrene, styrenic sheet molding compounds, polycaprolactones, polycaprolactams, fluorinated ethylenes, styrene acrylonitriles, polyimides, epoxys, and polyurethanes. Elastomers that can be compounded with FGS include, but are not limited to, poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/di(propylene glycol)/polycaprolactone, poly[4,4'-methylenebis(phenyl isocyanate)-alt-1,4-butanediol/polytetrahydrofuran, amine terminated polybutadiene such as HYCAR ATB2000X173, carboxyl terminated polybutadiene such as HYCAR CTB2000X162, polybutadiene, dicarboxy terminated butyl rubber, styrene/butadiene copolymers, polyisoprene, poly(styrene-co-butadiene), polydimethysiloxane, and natural latex rubber. FGS-polymer composites can be applied as building material reinforcements, wire coatings, automotive components (including body panels) etc.

The conductivity imparted by the conductive FGS filler at low loading levels enables the preparation of conductive composites. The advantage of conductivity at low loadings is that the mechanical, and especially the fracture, properties of the composite are not compromised. The amount of FGS in the polymer composite is 0.1 to 90%, preferably 1 to 80%, more preferably 5-50% by weight based on the total weight of the composite. Another preferred range is 0.1 to 5%, preferably 0.5 to 2% by weight based on the total weight of the composite. The conductive polymer composites find great utility in the area of electrostatic spray painting of polymer parts. The low levels of conductivity imparted by the FGS allow dissipation of the charge from the charged aerosol drops. Electrostatic spraying eliminates "overspray" (i.e. spray that misses the target) and minimizes environmental hazards associated with aerosol sprays and solvents. The conductivity of FGS also enables applications of electrical shielding, such as for computer housings. It can be used for making thermal overload protective devises wherein heat or excess current flow through the conductive composites causes an expansion of the matrix and a drop in conductivity as the FGS sheets no longer percolate. The level of conductivity and decrease in conductivity upon heating can be tailored to make either current-limiting devices or thermal switches. Very conductive FGS-polymer composites can be used as conductive inks and for making conductive circuitry. The lines or conductive features can be patterned by application of a polymer-FGS-solvent fluid with subsequent drying. Polymers which can be employed in the production of conductive composites are those stated above including, but not limited to: polyethylene, polypropylene and copolymers thereof, polyesters, nylons, polystyrenes, polyvinyl acetates and its copolymers, polycarbonates, polyvinyl chloride, polymethylmethacrylate and acrylate copolymers, polycaprolactones, polycaprolactams, fluorinated ethylenes, high impact polystyrene, styrenic sheet molding compounds, styrene acrylonitriles, polyimides, epoxys, and polyurethanes. Elastomers that can be compounded with FGS include, but are not limited to, poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/di(propylene glycol)/polycaprolactone, poly[4,4'-methylenebis(phenyl isocyanate)-alt-1,4-butanediol/polytetrahydrofuran, amine terminated polybutadiene such as HYCAR ATB2000X173, carboxyl terminated polybutadiene such as HYCAR CTB2000X162, polybutadiene, butyl rubber, dicarboxy terminated styrene/butadiene copolymers, polyisoprene, poly(styrene-co-butadiene), polydimethysiloxane, and natural latex rubber.

Currently, carbon blacks are added to elastomers to impart desirable mechanical properties. Most importantly the carbon black creates a modulus that increases with strain. This nonlinearity protects rubber from damage during large deformations. The FGS filler will provide similar enhanced non-linear strain hardening to elastomers. The interface is similar to that of carbon black, but the flexibility of the FGS nano-sheet enables deformation at low strains and hardening at higher deformations. The FGS is superior to other clay nanoplatelets that have been considered for these applications for two reasons: (1) the carbon structure of FGS has better interfacial compatibility with elastomeric matrices than do inorganic clay sheets, and (2) the greater flexibility of the FGS sheet, compared to clays, decreases interfacial fatigue and debonding. Polymers that can be compounded to produce elastomers with enhanced modulus and toughness are those stated above including, but not limited to: poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/di(propylene glycol)/polycaprolactone, poly[4,4'-methylenebis(phenyl isocyanate)-alt-1,4-butanediol/polytetrahydrofuran, amine terminated polybutadiene such as HYCAR ATB2000X173, carboxyl terminated polybutadiene such as HYCAR CTB2000X162, butyl rubber, polybutadiene, dicarboxy terminated styrene/butadiene copolymers, polyisoprene, poly(styrene-co-butadiene), polydimethysiloxane, and natural latex rubber.

Butyl rubber has excellent gas diffusion barrier properties and is, therefore, used as the lining for tubeless tires and for inner tubes. However it is significantly more expensive than other elastomers. Rubbers and elastomers that are used in tire applications do not have sufficient gas diffusion barrier properties to function in tire applications without the butyl rubber lining layer. FGS nano platelets with aspect ratios between 1000 and 10,000 can provide excellent barrier properties when added to conventional rubbers and elastomers and oriented perpendicular to the direction of gas diffusion. Barrier properties of up to 1000 times greater than that of the unfilled rubber are possible. Elastomers that can be compounded to produce materials with enhanced barrier properties are those stated above including, but not limited to: poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly[4,4'-methylenebis(phenyl isocyanate)-alt-1,4-butanediol/di(propylene glycol)/polycaprolactone, poly[4,4'-methylenebis(phenyl isocyanate)-alt-1,4-butanediol/polytetrahydrofuran, amine terminated polybutadiene such as HYCAR ATB2000X173, carboxyl terminated polybutadiene such as HYCAR CTB2000X162, butyl rubber, polybutadiene, dicarboxy terminated styrene/butadiene copolymers, polyisoprene, poly(styrene-co-butadiene), polydimethysiloxane, and natural latex rubber.

FGS added to polymer films, packaging materials, flexible tubing for medical applications, suits for chemical and biological warfare, gloves for chemical protection and other applications required enhanced barrier properties are also achievable. Also, the metal liners used as gas diffusion barriers in glass or carbon fiber wrapped high-pressure gas storage cylinders add extra weight and reduce the cycle-life of the cylinders. FGS filled gas diffusion barrier composites can be used to in place of the metal liners to improve the performance of high-pressure gas storage cylinders.

There is significant interest in materials for hydrogen storage. FGS has three unique characteristics that make it attractive as a hydrogen storage medium that will operate at more moderate pressures and temperatures than conventional materials or carbon nano tubes. (1) The ability to covalently "stitch" FGS or graphite oxide layers using divalent chains allows the preparation of FGS or graphite oxide sheets with interlayer spacings of approximately 1-1.4 nm. This is the predicted spacing that maximizes hydrogen storage between graphite sheets. Stitching can be accomplished, for example, with alkyl diamines reacting with the surface epoxides on the FGS surfaces. The interlayer spacing is determined by the alkyl chain length. (2) The Stone-Wales defects introduced to the graphene sheet by oxidation provide enhanced hydrogen binding relative to binding to pure graphite sheets. (3) The polar functionality on FGS can be used to localize metal clusters on the surface that act to dissociate diatomic hydrogen into molecular hydrogen and increase the rate of saturating and emptying the FGS nano-sheet. This phenomenon is called "spillover" in the hydrogen storage literature. Only FGS and graphite oxide have these multiple characteristics that make them effective hydrogen storage materials.

Supercapacitors are playing a significantly important role in hybrid energy sources. The material of choice in all commercial supercapacitors is high surface area carbon either as carbon aerogel or expanded graphite. FGS provides an advantage over both materials in due to its higher surface area and planar structures.

The ability to make conductive FGS dispersions and pastes, as well as conductive polymer composites opens the door for applications as electrodes for batteries, sensors, and electronic devices. The relative inertness of the FGS graphitic sheet, coupled with its deformability makes it an attractive candidate for electrode applications. The planar structure of FGS makes it an attractive material to make very thin electrodes for flat surface applications.

The high surface area of FGS and the layered structure that is possible to achieve make it an attractive adsorbent material to compete with activated carbon. The gallery size between layers can be tailored by "stitching" (described above) to produce samples with interlayer spacings between 7.1 nm and 15 nm. Therefore, the adsorption can be tailored to optimize the binding of species with specific sizes. This size selectivity, polar sites on the FGS surface, the ability to functionalize the FGS surface, enable the production of adsorbents with unique size selectivity and chemical specificity. The size specificity is shown between molecules over a range of 1 to 50 nm, preferably 1-20 nm. The size includes all values and subvalues there between, especially including 5, 10, 15, 20, 25, 30, 35, 40 and 45 nm. It is especially useful in the separations of proteins.

Current absorbents and absorptive media for protein and DNA fragment separations are often based on silica or cellulose particulates in the size range of 10-1000 microns. The substrates provide mechanical support and reactive groups that can be used to couple ligands and functional groups to the particle surfaces. A disadvantage of the silica-based media is the relative instability of the particles and surface linkages at pH's above 8. The disadvantage of the cellulose-based supports is the relative difficulty in conjugating ligands and functionality to the hydroxyls on the cellulose surfaces.

The FGS material combines the advantages of high surface area and readily functionalizable epoxide and carboxyl groups on the FGS surfaces. In this invention the surface of the FGS is made anionic by reaction of carboxylic acid and/or sulfonic acid containing reactants with amine functionality. The facile reaction with the FGS epoxides under mild conditions of reflux conditions in ethanol enable surface modification. To provide anionic surfaces. Reaction with diamines provides amine surface functionality that can be further quaternized to create permanent cationic charge. Functionalization using reactions commonly employed to functionalize cellulose media can be used to functionalize through the FGS surface hydroxides. Once the surface is functionalized with the ion exchange moiety or an affinity tag ligand, the surface can be further functionalized with PEG or dextran functional reagents to passivate the surface to make it resistant to protein adsorption or denaturation. The FGS, thus functionalized can be used as a bulk filling for chromatography columns or can be compressed or agglomerated to make a macro-particulate media in the size range 10-5000 microns that can be used as a chromatography packing.

The native and functionalized FGS can also be used as an adsorptive media for gas phase separations. The functionalized FGS described above can be directly used as packings for gas chromatography applications.

The unique blend of hydrophilicity and hydrophobicity that arise from the polar and non-polar groups on the FGS surface and its large platelet size make it an effective dispersant for oil in water and water in oil emulsions. Oils include alkanes, aromatic hydrocarbons, chlorinated hydrocarbons, heterocyclics, petroleum distillates ranging from light hydrocarbons (C4-C8), to heavy vacuum residuals (C18-C40+), natural oils such as corn, safflower, linseed, olive, grape seed, silicone fluids and oils, fatty acids and fatty acid esters. The polarity of the FGS can be tuned by the exfoliation conditions. The degree of reduction during the high temperature treatment determines the balance of oxidized surface groups (polar) to reduced graphitic sites (nonpolar). Further, post reaction through the surface epoxides, amines, and hydroxyls can be used to further tune or modify polarity. The materials are especially effective at dispersing crude oil in water emulsions that are being used as drilling fluids in oil and gas operations, and as mobility control agents in the recovery of oil from tar sands (Canadian patent Exxon Chemical 2067177). They are especially preferred for emulsification of tars and asphaltenes in applications such as paving compounds and sealing compounds.

Graphite is an excellent lubricant especially in high temperature applications due easy sliding of graphene sheets over each other. We expect FGS to display superior lubricating properties since the interactions between the graphene sheets are significantly weakened in comparison to graphite.

The UV light absorption capabilities of FGS make it an attractive additive to coatings that must maintain stability exposed to sunlight. Coatings include preferably black coatings. FGS can be used as an additive for roofing sealers, caulks, elastomeric roofing membranes, and adhesives.

FGS absorbs UV radiation and can therefore be used to impart UV protection and to improve the lifetime of plastic components in outdoor use, such as hoses, wire coatings, plastic pipe and tubing etc.

FGS can be added to a ceramic matrix to improve the electrical conductivity and the fracture toughness of the material. The partially oxidized surface of FGS offers stronger interaction with the ceramic matrix, especially with metal oxides and silicon oxides in particular. For example, FGS can be mixed with a silicon alkoxide material and then the silicon alkoxide can be condensed to form an amorphous material silicon oxide material containing well-dispersed FGS nano-platelets. The hydroxyl and epoxide groups on the FGS surface can condense with the silicon alkoxide to form strong covalent bonds between the matrix and the FGS filler. Low loadings of FGS in such materials impart improved fracture strength and conductivity. FGS-glass and FGS-ceramic composites can also be applied as thermoelectric materials. Similar techniques can also be used to create tinted and UV-protective grades of glass. FGS can also be used to reinforce cement and in other building material applications.

Due to the very low loadings of FGS required to impart electrical conductivity to a non-conductive matrix, FGS can form composite materials with greatly enhanced electrical conductivities but with thermal conductivities approximately the same as those of the matrix materials. This combination leads to FGS-composites with improved thermoelectric figures of merit. The matrix material for this application can be either organic or inorganic, with excellent thermoelectric properties expected from the FGS-silica composites, as noted above. The electrical conductivity of and nature of the carrier (i.e. electrons versus holes) in the material can be tailored by altering the surface chemistry of the FGS filler or by modifications to the matrix material.

Carbon black and other carbon materials are frequently used as a pigment in inks. The very small size of the FGS nano-platelets can lead to an ink with an exceptionally high gloss (i.e. low surface roughness of the dried ink). The surface chemistry of FGS can also be easily modified to produce different colors, tones and tints.

The conductive properties of FGS enable its use in electromagnetic shielding. Applications such as the enclosures for computer housings, computer screens, electronic devices such as medical diagnostics, and consumer electronics often require screening so that electromagnetic signals are either contained in the device and do not escape to provide interference for other devices, or to prevent external fields from interfering with the electronic components inside the enclosure. Currently conductive carbon black fillers are often used in these applications or conductive expanded graphite fillers. The FGS conductive fillers can be used in these applications at lower loading levels and with less deleterious impact on the mechanical properties of the polymer matrices. In addition to the FGS being added to the structural polymer used in these applications, the FGS can be incorporated into a solvent phased system with binder to make a conductive paint that can be applied to the interior of the housing to provide electromagnetic shielding.

Currently expanded graphite is used as an absorbent for oil spill remediation and for the cleanup of other hazardous organic liquid spills. The hydrophobic surfaces are wetted by oil and thereby bind and hold oil. Other compounds used for spill remediation are clays, but these must be surface treated to may them hydrophobic enough to bind organic liquids. The high surface area of FGS and its hydrocarbon surfaces make it an excellent absorbent material for oil and organic liquids. The FGS can be contained in large porous sacks made from polypropylene or polyethylene fabric or porous film. The low bulk density of FGS make it attractive in that the amount of liquid that can be imbibed on a weight basis can be high. Liquid loadings between 100 to 10,000 wt:wt oil to FGS can be achieved. In another embodiment the FGS is co-processed with a polymeric binder in the form of a foam sheet. These open cell structure of the foam allow contact between the oil and the FGS surfaces. The advantage of this system is that the absorbent system can be rolled for storage.

While the present invention shows a high surface area value for the exfoliated graphene by $N_2$ adsorption, this may not be the most relevant measure of the ability to disperse the graphene sheets, in, for example, a polymeric matrix. While adsorption measurements reflect porosity and surface area of three dimensional structures and powders, graphene comprises two-dimensional, flexible sheets. In the solid dry state the graphene sheets must be in contact, and the contact areas will occlude nitrogen intrusion in the adsorption measurement. A more appropriate analogy for graphene may be to consider it as a two-dimensional polymer. An important question for applications involving graphene in polymer matrices is the degree of dispersion, or the effective surface area, in the dispersed state. The present invention FGS materials disperse readily in polar organic solvents such as THF to form a uniform dispersion.

Preferred Embodiments

Figure 8:
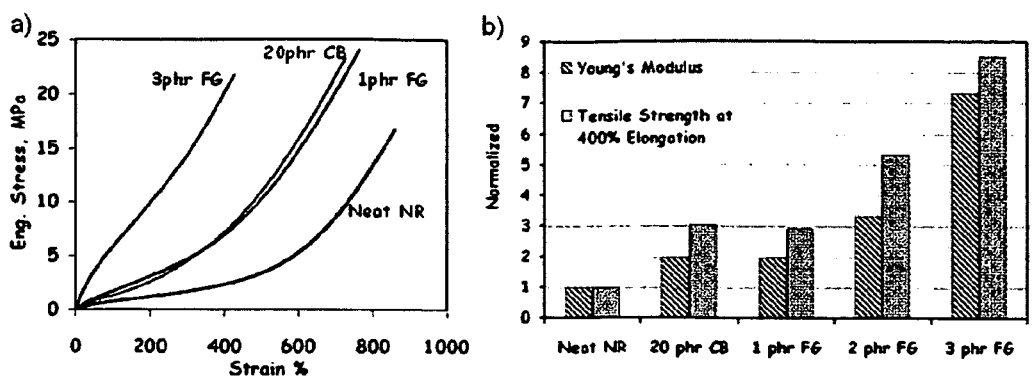
FIG. 8 shows a) Stress-strain curves for and b) Normalized Young's modulus and tensile strength at 400% elongation for Neat and filled with 1 phr FG, 3 phr FG, 20 phr CB NR.

The mechanical properties of NR-FG nanocomposites were characterized by tensile measurements. The FIG. 8 shows stress-strain curves for neat and filled NR composites with FG and carbon black (CB) at different loadings. It can be seen that compared to neat and 20 phr (parts in hundred) CB, FG filled NR shows more improved mechanical properties. At 3 phr FG loadings both Young's modulus and stress at 400% elongation increases more than 7 times compared to neat NR. At 20 phr CB loading Young's modulus increases only twice; this is accessible with only 1 phr FG loading. This level of reinforcement is exceptional compared to clay and SWCNT filled elastomers. In one embodiment, the high surface area of FG and the presence of functional groups on the surface are improving the mechanical performance of the nanocomposites.

In a preferred embodiment, SBR and PS-PI-PS also exhibit improved mechanical properties. For example, compared to 20 phr CB filled SBR, at 2 phr FG loadings the modulus of vulcanized SBR increases almost 200%. The availability of functional groups on the filler surface also alters the curing kinetics of NR. The isothermal DSC measurements show that the vulcanization kinetics of NR becomes faster with the presence of FG. This behavior suggests that natural rubber chains are attached to the filler surface not only by physical adsorption but also via chemical crosslinking.

In addition to improved mechanical properties, the nanocomposites become electrically conductive at low FG concentrations due to high conductivity and high aspect ratio of graphene sheets that leads to low percolation concentrations. With 4 phr FG the conductivity of NR nanocomposites becomes around 0.01 S/cm. It has been shown that SWCNT-PMMA nanocomposites have conductivity values in the order of $10^{-4}$ S/cm at similar filler loadings. However, one needs to go to even higher concentrations (>10 wt %) to reach this level of conductivity in conductive-CB filled rubber composites.

The stress-induced crystallization of neat and filled NR was studied on a x-ray synchrotron line with a 2D CCD camera. This technique allowed to capture the change and orientation of crystallinity of the samples during stretching in real-time. The preliminary analyses indicate that the crystallization of natural rubber starts to occur at lower strains in FG filled samples compared to neat NR. The significant increase in modulus and this altered crystallization behavior show that the chains experience higher strain compared to the bulk due to increased crosslinked density and very high in-plane modulus of FG.

To study the dispersion of FG in polymer matrices and the consequent effect on final materials properties nanocomposites were also prepared by melt processing using a mini twin-screw extruder. This extruder allowed to compound samples at small quantities at a desired temperature. In a preferred embodiment, the dispersion of FG in the polymer matrix and thus the improvement in the mechanical properties of the nanocomposites are directly related to the mixing rate and time in the extruder. In the case of NR, with a relatively high viscosity in the uncured state, the solution processing leads better mechanical properties compared to melt processing. In addition, SEM images show that solution processing leads to less coagulation of FG within the matrix. However, control experiments on uncrosslinked PDMS, with a relatively low viscosity even at room temperature, indicate that the rheological properties of the nanocomposites are not significantly affected by the processing method. This shows that modification of processing conditions in the melt state (mixing temperature, polymer MW) to decrease the viscosity of the matrix leads to improved filler dispersion and elimination of the use of solvents in composite preparation.

The gas barrier properties of FG-polymer nanocomposites were measured using a diffusion cell. The permeability of NR, PDMS and PS-PI-PS films are reduced substantially compared to the results published in the literature for other types of fillers. For example, in PDMS/FG nanocomposites the air permeability is reduced around 50 and 80% with 1 and 5 wt % FG, respectively. It should be noted that these samples were prepared using either solution casting or melt pressing and, therefore, the FG sheets are not aligned within the matrix. In a preferred embodiment, the FG sheets are aligned parallel to the polymer film surface to decrease the permeability of the polymer films even further.

The above results for the gas barrier properties are compared to those that are published in the literature. The following Table shows the comparison of gas barrier properties of various polymer nanocomposites that are filled with either functional graphene sheets (according to the present invention) or clay nanoplatelets. In each case, FGS outperforms its counterpart.

TABLE 1

| Composite | | Relative Permeation: $P/P_0$ | |
|---|---|---|---|
| Polymer | wt % filler | Clay | FGS |
| PDMS | 1.5 | 0.94[1] | 0.48 |
| Vector | 2.25 | 0.77[2] | 0.48 |
| NR | 5.0 | 0.75[3] | 0.24 |

[1]Chemistry of Materials 2001, 13, (10), 3760-3765.
[2]Polymer 2005, 46, (3), 719-724.
[3]Polymer International 2003, 52, (8), 1359-1364.

In addition to elastomers, amorphous and crystalline plastics were used as matrices for FG nanocomposites. Fibers of FG-filled PMMA and PE are drawn from melt using twin-screw extruder. The preliminary polarized Raman scattering results show that FG can be aligned within the fiber along the drawing direction. Both, the mechanical and electrical conductivity properties change significantly as a function of degree of alignment that can be varied by drawing ratio.

The nanoparticle filler of the present invention, functional graphene sheets (FGS), was introduced into three commercial rubbers: poly(dimethylsiloxane) (PDMS), Vector V4111 (styrene-isoprene triblock copolymer) and natural rubber (NR) via solution and shear mixing. Scanning electron microscopy (SEM) and conductivity analysis suggested the FGS sheets were well dispersed within each composite. The barrier properties of these materials are impacted by variations in platelet aspect ratio and filler dispersion, with superior performance coming from high aspect ratio and well mixed composites. The tensile strength and Young's modulus were markedly improved in PDMS and NR/FGS composites. The Young's modulus for NR and PDMS/FGS composites increased in 6 and 12 fold, respectively, with less than 5 wt % FGS loading. Tensile strength under constant strain was also improved as 6 fold increases were seen for both rubbers.

These performance improvements distinguish FGS from all other nanofillers reviewed in the literature.

Nanoparticle functional graphene sheets are excellent for use as a novel filler for elastomers, specifically for barrier membrane applications.

Platelet orientation can be improved with methods such as shear and strain alignment. Particularly preferred is the spreading of shear forces radially, thus stretching the rubber sample in two dimensions. In this way, platelet orientation can shift such that it is parallel to the surface of the membrane.

Preferably, shear alignment is achieved through spin coating while adjusting solution viscosity, spin rate and cure conditions as appropriate.

The FGS-polymer nanocomposites of the present invention preferably have a Young's modulus in the order of 1-20 MPa, a tensile strength in the order of 1-100 MPa, a permeability in the order of $10^{-10}$-$10^{-12}$ m$^2$/s atm, a diffusivity in the order of $10^{-9}$-$10^{-11}$ m$^2$/s, a solubility in the order of $10^{-1}$-$10^{-3}$ atm$^{-1}$, a conductivity in the order of $10^{-13}$-$10^{1}$ S/m, and an aspect ratio in the order of 100-10000.

The Young's modulus includes all values and subvalues therebetween, especially including 2, 4, 6, 8, 10, 12, 14, 16, 18 MPa. The tensile strength includes all values and subvalues therebetween, especially including 10, 20, 30, 40, 50, 60, 70, 80 and 90 MPa. The permeability includes all values and subvalues therebetween, especially including 5–$10^{-10}$, 1×$10^{-11}$, 5×$10^{-11}$ m$^2$/s atm. The diffusivity includes all values and subvalues therebetween, especially including $10^{-9}$, 5×$10^{-9}$, $10^{-10}$, 5×$10^{-10}$ and $10^{-11}$ m$^2$/s. The solubility includes all values and subvalues therebetween, especially including $10^{-1}$, 5×$10^{-1}$, $10^{-2}$, 5×$10^{-2}$ and $10^{-3}$ atm$^{-1}$. The conductivity includes all values and subvalues therebetween, especially including $10^{-13}$, 5×$10^{-12}$, $10^{-12}$, 5×$10^{-11}$, $10^{-11}$, 5×$10^{-10}$, $10^{-10}$, 5×$10^{-9}$, $10^{-9}$, 5×$10^{-8}$, $10^{-8}$, 5×$10^{-7}$, $10^{-7}$, 5×$10^{-6}$, $10^{-6}$, 5×$10^{-5}$, $10^{-5}$, 5×$10^{-4}$, $10^{-4}$, 5×$10^{-3}$, $10^{-3}$, $10^{-2}$, 5×$10^{-1}$, $10^{-1}$, 1, 5, 10 S/m, and an aspect ratio includes all values and subvalues therebetween, especially including 250, 300, 350, 400, 450, 500, 550, 600, 650, 700, 750, 800, 850, 900, 950, and 10000.

Having generally described this invention, a further understanding can be obtained by reference to certain specific examples which are provided herein for purposes of illustration only, and are not intended to be limiting unless otherwise specified.

EXAMPLES

Part I: Preparation and Characterization of FGS
Materials and Methods:

SWCNTs (BuckyPearls, lot no. CTU3-2005B-2) from Carbon Nanotechnologies, Inc. (Texas, USA); PMMA ($M_w$=350000, PDI=2.7) from Polysciences (Warrington, Pa., USA); and organic solvents, all HPLC grade, from Fisher Scientifics (Hanover Park, Ill., USA) were used as received. Flake 1 Graphite was from Asbury Carbon Co. (Asbury, N.J., USA).

Preparation of Graphite Oxide (GO):

Graphite oxide was prepared from Flake 1 graphite according to the method of Staudenmaier (L. Staudenmaier, *Ber. Dtsh. Chem. Ges*, 31, 1481, (1898)). Graphite (1 g) was added to a 500-ml round-bottom flask containing a stirred and cooled (0° C.) mixture of concentrated sulfuric and nitric acid (2:1 v/v, 27 ml). Potassium chlorate (11 g) was then added gradually in small portions to ensure that the temperature of the reaction mixture did not rise above 30° C. After the addition of potassium chlorate, the mixture was allowed to reach room temperature and stirring was continued for 96 h. Next, the mixture was poured into deionized water (1 l) and filtered over a 60-ml fritted funnel (coarse). The product was washed on the funnel with 5% aqueous HCl until sulfates were no longer detected (when 5-ml of the aqueous filtrate does not turn cloudy in the presence of one drop of saturated aqueous BaCl$_2$) and then with deionized water (2×50 ml). The resulting graphite oxide was dried in an oven at 100° C. for 24 h. Elemental analysis (Atlantic Microlab, Norcross, Ga.): C, 53.37%; O, 39.45%; H, 1.62%; N, 0.14%.

Preparation of FGS:

Graphite oxide (0.2 g) was placed in an alumina boat and inserted into a 25-mm ID, 1.3-m long quartz tube that was sealed at one end. The other end of the quartz tube was closed using rubber stopper. An argon (Ar) inlet and thermocouple were then inserted through the rubber stopper. The sample was flushed with Ar for 10 min, then the quartz tube was quickly inserted into a Lindberg tube furnace preheated to 1050° C. and held in the furnace for 30 s. Elemental analysis of a sample oxidized for 96 h indicates a C/H/O ratio of 54/25/21 (by mol) while the elemental analysis of FGS shows an increase in C/O ratio from 6/4 in GO to 8/2.

Dispersion of FGS in Organic Solvents:

The dispersions of FGS were made at 0.25 mg/ml concentration by sonicating FGS (prepared by method B, 5 mg) in a given solvent (20 ml) for 5 h in a Fisher Scientific FS6 ultrasonic bath cleaner (40 watt power). The dispersions were then left standing under ambient conditions.

The following was observed: FGS dispersions in methylene chloride, dioxane, DMSO and propylene carbonate precipitated within 8 h after sonication. The dispersion in nitrobenzene was more stable, but after 24 h the precipitation of FGS was complete. In THF, a moderately stable dispersion was observed accompanied by fairly substantial precipitation after 24 h. However, the THF dispersion still remained blackish after a week. More stable dispersions can be obtained in DMF, NMP, 1,2-dichlorobenzene, and nitromethane: they were still quite black after one week albeit with a small amount of sedimentation.

Experimental Procedure for the AFM Imaging:

The AFM images were taken on an AutoProbe CP/MT Scanning Probe Microscope (MultiTask), Veeco Instruments. FGS was dispersed in 1,2-dichlorobenzene by sonication (vide supra) and the dispersion deposited on a freshly cleaved mica surface. Imaging was done in non-contact mode using a V-shape "Ultralever" probe B (Park Scientific Instruments, B-doped Si with frequency $f_c$=78.6 kHz, spring constants k=2.0-3.8 N/m, and nominal tip radius r=10 nm). All images were collected under ambient conditions at 50% relative humidity and 23° C. with and a scanning raster rate of 1 Hz. The AFM image in FIG. 8 shows stacks of FGS nanostack with thickness of 2 nm.

X-Ray Diffraction (XRD) Measurement

XRD patterns of graphite, GO, and FGS are recorded in a Rigaku MiniFlex diffractometer with Cu Kα radiation. Initial, final and step angles were 5, 30 and 0.02° respectively.

Example 1

Graphite oxide was prepared from graphite by a process of oxidation and intercalation, referred to as the Staudenmaier method. The method uses a combination of oxidizers and intercalants: sulfuric acid, nitric acid and potassium chlorate under controlled temperature conditions. Ratios of graphite to potassium chlorate in the range of 1:8 to 1:20 (wt/wt) are preferred. Ratios of sulfuric to nitric acid from 5:1 to 1:1 are preferred. The Staudenmaier method is the preferred oxidation procedure.

In this example, 5 g graphite flake with a 400 μm average flake size (Asbury Carbon, Asbury, N.J.) was added to an ice-cooled solution containing 85 ml sulfuric acid and 45 ml nitric acid. This was followed by the addition of 55 g potassium chlorate over 20 minutes such that the temperature did not exceed 20° C. After this oxidation/intercalation process proceeded for 96 hours, the reaction mixture was poured into 7 l of deionized water and filtered using an aspirator. The oxidized graphite was then washed with 5% HCl until no sulfate ions were detected in the filtrate, using the barium chloride test. The oxidized graphite was then washed with DI water until the filtrate had a pH of 5 or greater. The sample was examined by XRD to demonstrate complete oxidation by the elimination of the original sharp diffraction peak of graphite.

Example 2

In preparing thermally exfoliated graphite oxide (FGS), graphite oxide (0.2 g) was placed in a ceramic boat and inserted into a 25 mm ID, 1.3 m long quartz tube that was sealed at one end. The other end of the quartz tube was closed using a rubber stopper. An argon (Ar) inlet and thermocouple were then inserted through the rubber stopper. The sample was flushed with Ar for 10 minutes; the quartz tube was then quickly inserted into a preheated Lindberg tube furnace and heated for 30 seconds.

Example 3

XRD patterns of graphite, GO, and FGS were recorded in a Rigaku MiniFlex diffractometer with Cu Kα radiation. Initial, final and step angles were 5, 30 and 0.02, respectively. The surface area of FGS was measured by nitrogen adsorption at 77K using a Micromeritics FlowSorb apparatus with a mixture of $N_2$ and He 30/70 by volume as the carrier gas. High-resolution XPS spectra were obtained using an Omicron ESCA Probe (Germany). Samples were de-gassed overnight within the XPS chamber (10-3 mbar) prior to analysis of the sample. Data were collected using 15 kV and 20 mA power at 10-9 mbar vacuum. The raw XPS data were analyzed to determine peak locations and areas in relation to specific binding energies that best fit the experimental data. The main C—C peak ($C_{1s}$) at 284.6 eV was observed. An additional photoemission present at higher binding energy peaks at 286.1 eV represented —C—O— or C—O—C bonding.

Example 4

The solid-state magic angle spinning (MAS) 13C NMR spectrum of the graphite oxide was obtained using a Chemagnetics CMX-II 200 spectrometer with a carbon frequency of 50 MHz, a proton frequency of 200 MHz, and a zirconia rotor of 7.5 mm diameter spinning at 4000 Hz. To enable separation of the carbon peaks of the solid GO sample a so called, "Block pulse sequence" was used. This employs a decay pulse sequence with a 45° pulse angle of 2.25 ms, high-power proton decoupling (~50 kHz), and a 20 s delay between pulses. The spectrum was run at room temperature and 5120 scans were acquired with 4 K data points each. The chemical shifts were given in ppm from external reference of the hexamethylbenzene methyl peak at 17.4 ppm.

Example 5

FIG. 1 shows the XRD diffraction patterns of the graphite flakes after oxidation for 48, 96, 120 and 240 hours. Note that as oxidation proceeds, a new peak characteristic of GO appears at a d-spacing of about 0.7 nm (2θ=12.2°), and the intensity of the native graphite 002 peak (2θ=26.7°) decreases significantly. Note also that after oxidation for 96 hours or longer, the graphite 002 peak essentially disappears. At this point, intercalation is achieved, as the graphene layers are no longer about 0.34 nm apart (as they were initially), but are now about 0.71 nm apart. The graphite oxide samples having d spacings of about 0.71 nm correspond to about 12% adsorbed water.

Example 6

Figure 2:
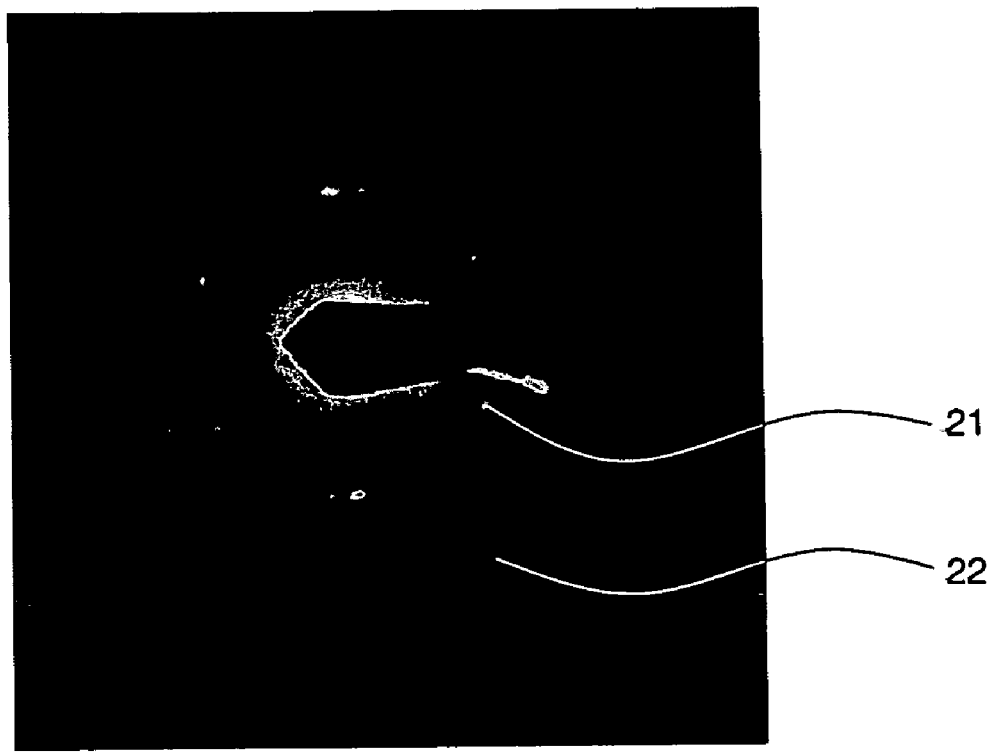
FIG. 2 shows selected area electron diffraction (SAED) patterns of GO oxidized for 96 hours, and the structure in the diffraction rings from stack spacing in GO.

The selected area electron diffraction (SAED) pattern of the oxidized, but not exfoliated, sample is shown in FIG. 2. SAED patterns are observed by focusing beam at a selected area to obtain electron diffraction information on the structure of matter. The SAED was taken over a large area; therefore, it contains the information from many GO grains. A typical sharp, polycrystalline ring pattern is obtained. The first ring 21 originates from the (1100) plane, with the second ring 22 arising from the (1120) plane. In addition, strong diffraction spots were observed on the ring. The bright spots corresponding to the (1100) reflections within the ring retain the hexagonal symmetry of the [0001] diffraction pattern. It is therefore postulated that the GO sheets, before thermal treatment, are not randomly oriented with respect to one another, and the interlayered coherence is not destroyed at this stage.

Example 7

Figure 3:
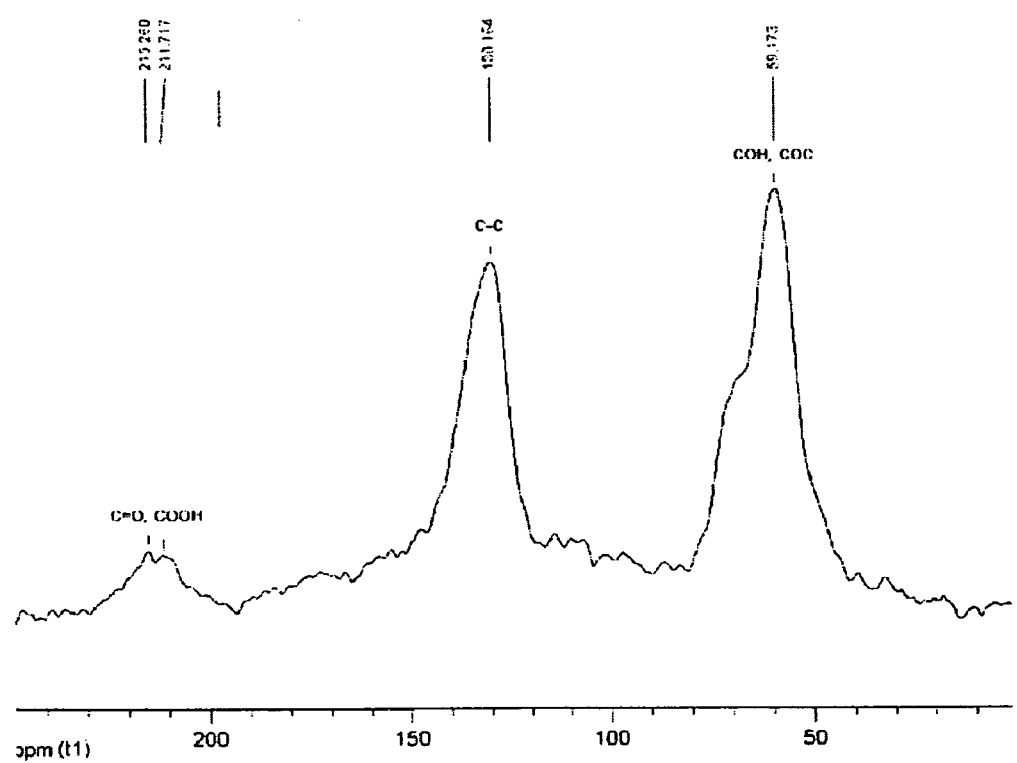
FIG. 3 illustrates a solid-state 13C-NMR spectra of GO, with the sample oxidized for 96 hours.

It is further postulated that GO contains aromatic regions composed entirely of $sp^2$ carbon bonds and aliphatic $sp^3$ regions that contain hydroxyl, epoxy, and carboxylic groups. Elemental analysis of a sample oxidized for 96 hours indicates a C/H/O ratio of 54/25/21 (by mol). The $^{13}$C-NMR spectrum for a sample oxidized for 96 hours is shown in FIG. 3. The spectrum contains three distinguishable peaks, at chemical shifts (δ) of about 60-70, 133, and 210-220 ppm. The peak between 60 and 70 ppm is anticipated to be composed of two peaks, which can be assigned to hydroxyl and epoxy groups. The peak at 133 ppm corresponds to aromatic carbons, while the third peak at 210-220 ppm may be assigned to carbon attached to carbonyl oxygen.

Example 8

In an exemplary embodiment, in order to form FGS, a graphite oxide sample that has been oxidized for 96 hours is heated under argon for 30 seconds at different temperatures. It was found that heating the expanded GO at 200° C. is sufficient for partial exfoliation. However, the extent of exfoliation increases as the temperature increases. The exfoliation results in a large apparent volume expansion (about 200-400 times the original volume). The FGS prepared from completely oxidized samples has a fluffy "black ice-like" structure. FIGS. 4a and 4b show the XRD spectrum of graphite, GO oxidized for 96 hours, and a FGS sample prepared by rapid heating of the GO sample. FGS samples show no sign of the 002 peak for either the graphite oxide (2θ≈12.2°) or for the pristine graphite (2θ≈26.5°). In contrast, heating a partially oxidized sample yields an XRD diffraction pattern that contains the 002 peak of the pristine graphite, as shown in FIG. 4b.

Example 9

Large area SAED patterns (FIG. 5) demonstrate enhanced exfoliation of the layers. The diffusion rings (51 and 52) are very weak and diffuse. These weak and diffuse diffraction rings, typically observed with disordered or amorphous materials, suggest that the alignment between the sheets and the long-range coherence along the c direction is essentially lost in the thermal exfoliation.

Due to the elimination of water and some oxygen functional groups during the rapid heating step, the structure of FGS has a higher C/O ratio than the parent GO. Elemental analysis shows an increase in the C/O ratio of from 6/4 in GO to 8/2 in FGS.

Figure 6:
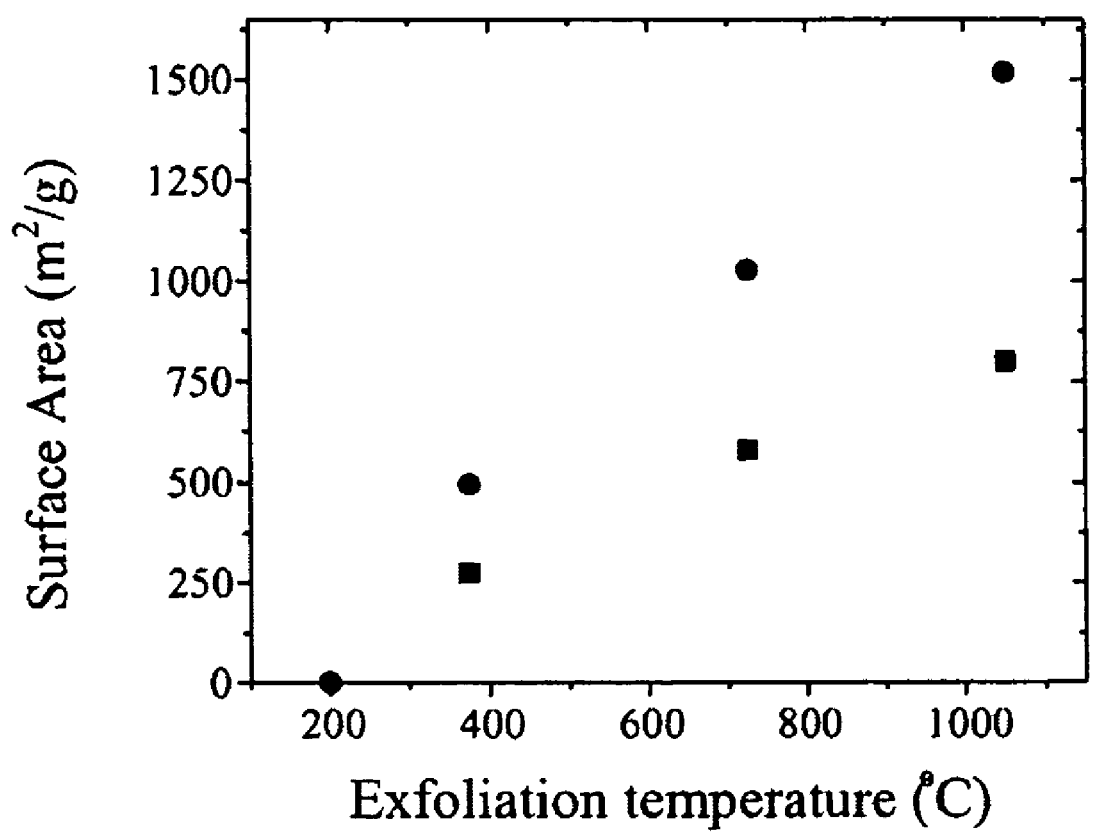
FIG. 6 shows BET surface area of FGS samples prepared by heating GO samples at different temperatures for 30 seconds.
Figure 7:
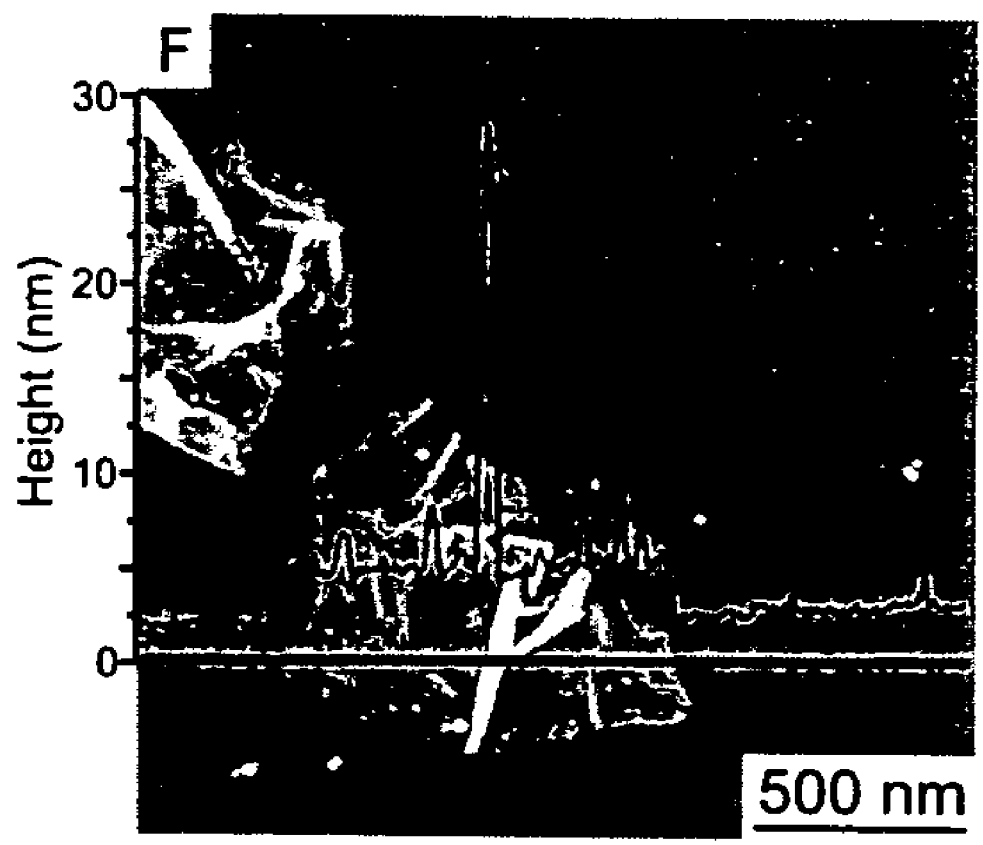
FIG. 7 shows an atomic force microscope (AFM) image illustrating the thin, wrinkled platelet structure. Superimposed on the image is the height profile taken along the indicated line scan. The average height is ~2.8 nm.

The surface area of FGS samples prepared from a GO sample that was oxidized for 120 hours and heated for 30 seconds at different temperatures is shown in FIG. 6 ("•" denotes samples dried in vacuum oven for 12 hours at 60° C., and "■" represents samples equilibrated at ambient temperature and relative humidity prior to exfoliation).

Note that there is an increase in the surface area as the heating temperature increases. Surface areas of 1500 $m^2/g$ are achieved by heating the sample at 1030° C. This value is lower than a theoretical upper surface area of atomically thick graphene sheets, typically 2,600 $m^2/g$. Since the adsorption experiment takes place on a bulk FGS sample, part of the graphene sheets overlap, thus denying access to $N_2$ molecules, resulting in a lower surface area value. An important aspect for applications involving graphene in polymer matrices is the degree of dispersion, or the effective surface area, in the dispersed state. The FGS materials disperse readily in polar organic solvents such as THF to form a uniform dispersion. Heating temperatures of from about 250-2500° C. may be employed, with a temperature range of from about 500-1500° C. preferred.

The bulk density of a FGS sample with a surface area of 800 $m^2/g$ was measured gravimetrically to be 4.1 $kg/m^3$. Another sample with a measured surface area of 1164 $m^2/g$ had a bulk density of 1.83 $kg/m^3$.

Part II: Preparation and Characterization of FGS and FGS-Polymer Nanocomposites

Experimental Methods

Calculating the Permeability Coefficient

Figure 9:
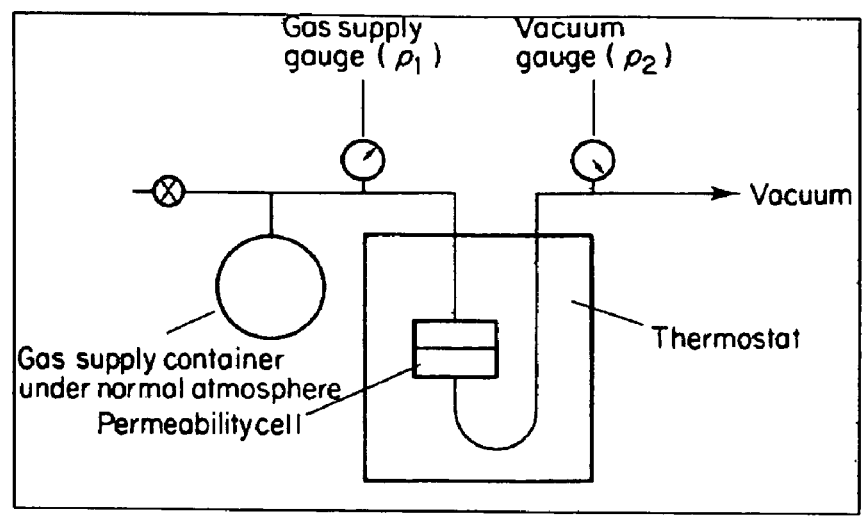
FIG. 9 provides an illustration of a conventional diffusion cell.

In order to determine the permeability coefficient experimentally, one can construct a permeability cell schematically shown in FIG. 9 provided by Rabek, 1980 (Rabek, J. F., *Experimental methods in polymer chemistry: physical principles and applications*. Wiley: Chichester [Eng.]; New York, 1980; p xxv, 861 p.)

Figure 10:
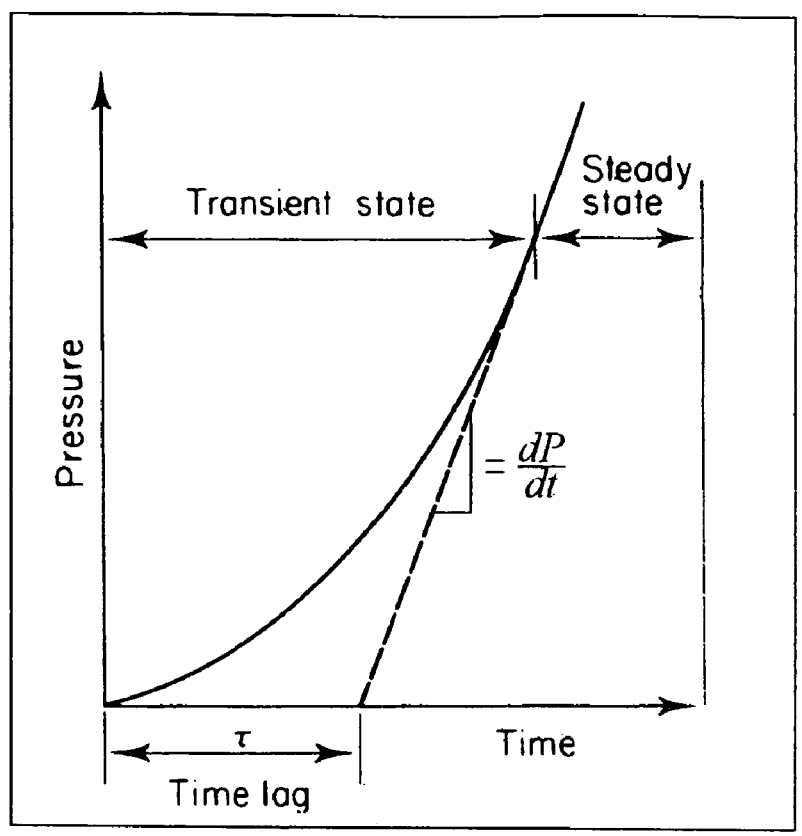
FIG. 10 represents a typical time-pressure graph for diffusion through a polymeric membrane.

Although this diagram is relatively crude, its essential features are important. A polymer is held in a permeability cell and subjected to a pressure gradient ($\Delta P = p_1 - p_2$). Over time, gas diffuses through the membrane. This increase is measured and recorded by the vacuum gauge as a function of time. With this apparatus, one can measure the increase in pressure on the downstream side ($p_2$) as a function of time. Plotting this information, one can determine the steady state value for $$\frac{\Delta p}{\Delta t}$$

as shown FIG. 10. Using the slope, one can calculate the coefficient of permeability for a film of thickness 'l' and area 'A' from the following formula, $$P = \frac{dp}{dt}\left[\frac{V \times l \times 273}{p_1(A \times T)}\right] \times \left[\frac{1}{760}\right] \quad (2.5)$$

where 'V' is the downstream volume, T is the temperature in K and $p_1$ is the high pressure (measured in torr).

$$\frac{dp}{dt}$$

will thus have units of $torr \cdot s^{-1}$. In this equation, one assumes that the quantity $(p_1 - p_2) \approx p_1$.

Calculating the Diffusion Coefficient

In calculating the diffusion coefficient, one can return to the plot illustrated in FIG. 10. Rabek, proposes the use of a time lag constant 'τ', determined from the extrapolation of the steady state region of the pressure-time graph. From this value one finds the diffusion coefficient to be, $$D = \frac{l^2}{6\tau} \quad (2.6)$$

"l" is the thickness of the membrane. Accordingly, when the diffusion coefficient is large, steady state will be reached quickly and τ will be small. In the other extreme, Rabek notes that diffusion constants are only accurate to within 10% when τ is greater than 20 minutes. With these equations, one should be able to calculate the values of P, D and S which fully characterize diffusion of any gas through a polymeric membrane.

Sample Preparation

In order to produce FGS nanocomposites, three different polymers were used. These first of these was natural rubber (NR), poly(cis-1,4 isoprene). The second polymer used was Vector 4111, a polystyrene-polyisoprene tri-block copolymer (PS-PI-PS) commercially available from Dexco Polymers Co. (Houston, Tex.) with a $M_w$ of 128,000 $gmol^{-1}$. Mykhaylyk, T. A.; Collins, S.; Hamley, I. W.; Evans, S. D.; Henderson, J. R., Ordered structures and phase transitions in thin films of polystyrene/polyisoprene block copolymer and blends with the corresponding homopolymers. *Journal of Materials Science* 2004, 39, (6), 2249-2252. The third polymer used was polydimethylsiloxane RTV 615 (PDMS) supplied by General Electric Silicones. In each case, they were first mixed with FGS and then cast or pressed into thin sheets for mechanical testing. The following sections illustrate each of these processes.

FGS Synthesis

As previously described, the conversion of natural graphite to FGS begins with an oxidation process. Graphite flakes with average size of 40 μm (provided by Asbury Carbon Company, Asbury, N.J.) were oxidized for a minimum of 96 h using sulfuric acid, nitric acid and potassium chlorate as per the Staudenmaier method. Prud'homme, R. K.; Brinson, L. C.; Ramanathan, T.; Abdala, A.; Stankovich, S.; Dikin, D.; Herrera-Alonso, M.; Piner, R.; Adamson, D. H.; Liu, J.; Ruoff, R. S.; Nguyen, S. T.; Aksay, I., Beyond Carbon Nanotubes: FGS Nanoplates for Polymer Nanocomposites. In Princeton University: 2006; p 23, Staudenmaier, L., Verfahren zur darstellung der graphitsäure. *Berichte der Deutschen Chemischen Gesellschaft* 1898, 31, 1481. Next, the product is washed extensively with HCl and water to remove excess intercalants, leaving only graphite oxide. The resulting GO is then dried in a vacuum oven to remove any excess water present in the system. This is important as residual water has a deleterious effect on the exfoliation process. Once dried, a small quantity (~150 mg) of GO is placed in a quartz tube and purged with argon. The tube is then inserted in a furnace at 1050° C. for 30 seconds as it undergoes exfoliation through rapid heating. After cooling the samples, the FGS can be removed and characterized through BET, AFM and transmission electron microscopy (TEM).

Polymer/FGS Mixing

In order to disperse the FGS within the polymer matrices, three different mixing methods were used: (a) solution, (b) extrusion and (c) shear mixing.

a) Solution Mixing

This technique was used with the both NR and Vector/FGS composites. In the case of NR, the rubber was first dissolved in tetrahydrofuran (THF) (Aldrich Chemical Company, 99%+ purity) in a ratio of 1 g 50 mL THF. FGS was then suspended by sonication in another 10 mL of THF. The two solutions were then combined and allowed to mix overnight. The mixture was then opened to the atmosphere, thus removing the excess THF solvent. In the case of the Vector, the polymer was dissolved in toluene (Aldrich Chemical Company) in a ratio of 1 g/30 mL. FGS was then suspended in NMP at 20 mg/10 mL using tip sonication. Niyogi, S.; Hamon, M. A.; Perea, D. E.; Kang, C. B.; Zhao, B.; Pal, S. K.; Wyant, A. E.; Itkis, M. E.; Haddon, R. C., Ultrasonic dispersions of single-walled carbon nanotubes. *Journal of Physical Chemistry B* 2003, 107, (34), 8799-8804. While stirring, the suspension was then added dropwise to the Vector solution, stirring for 24 h. The resulting solution was then slowly added to cold methanol (Aldrich Chemical Company), thereby precipitating the Vector/FGS mixture as neither is soluble in this solvent.

Figure 11:
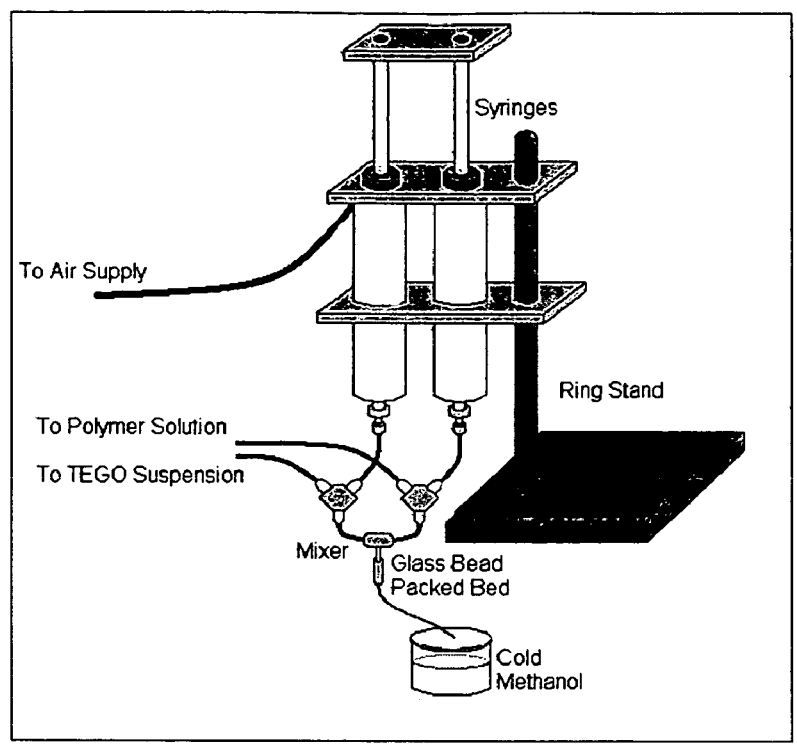
FIG. 11 illustrates a mixing apparatus designed to disperse FGS within the Vector copolymer. Mixing is aided by a glass bead packed bed.

In order to improve the mixing and dispersion of FGS within the elastomers, a simple mixing apparatus was designed as shown in FIG. 11. In this system, both the rubber solution and FGS suspension could be injected into a mixer via two coupled Bimba® air-pressure actuated syringes. The mixer was followed by a glass bead packed bed, which would further increase dispersion of the FGS within the polymer. In this way, we hoped to achieve a uniform nanocomposite, with little FGS agglomerates.

However, due to difficulties with the O-rings in Bimba® pistons, we were unable to use this device to generate product. The original O-rings no longer held vacuum within the cylinder and thus had to be replaced. As these cylinders were once custom made, new O-Rings were ordered but will be delivered after the conclusion of this project. As such, a secondary method was utilized to mix the polymer and filler: extrusion.

b) Extrusion

Figure 12:
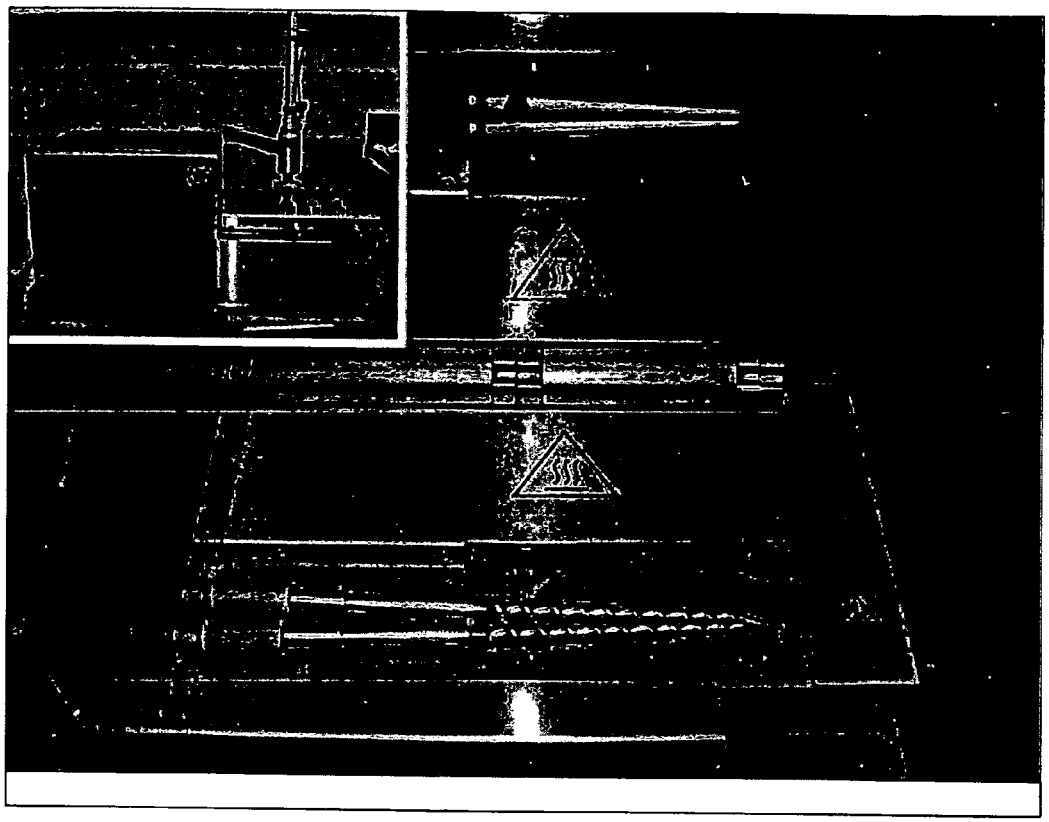
FIG. 12 is a photo that was taken of the co-rotating screw used in producing elastomeric nanocomposites in the Haake Minilab extruder. The entire apparatus is depicted.

Vector/FGS composites were prepared using a Haake Minilab Twin Screw Compounder/Extruder (Thermo Electron Corporation, Waltham, Mass.) pictured in FIG. 12. The Vector/FGS composite was processed at 170° C., mixing for 20 minutes at a speed of 100 rpm using conical co-rotating screws. Subsequently, nanocomposites were also made using NR and FGS. For this thermosetting material, compounding was done at 90° C., well below the vulcanization temperature of 150° C., mixing for 20 minutes at 100 rpm.

c) Solution Shear Mixing

The final method used to disperse FGS was applied while making PDMS composites. The GE RTV 615 rubber used is a two-component system comprised of a silicone liquid base and a curing agent, mixed in a 10:1 ratio. Due to the highly viscous nature of the silicone liquid, both extrusion and solution casting were quite difficult. Accordingly, a drill with standard twist drill bit was used to mix PDMS and FGS via shear forces. At low filler concentrations (<1 wt %), mixing for 30 minutes was sufficient ensure adequate dispersion of the FGS within PDMS. For higher concentrations, however, the FGS/PDMS composites were too viscous for mixing by the drill alone. For these mixtures, a putty knife was used to manually spread and disperse the filler for an addition 15 minutes. Once the FGS was disbursed, the curing agent was mixed in for an additional 5 minutes.

Nanocomposite Films

Figure 13:
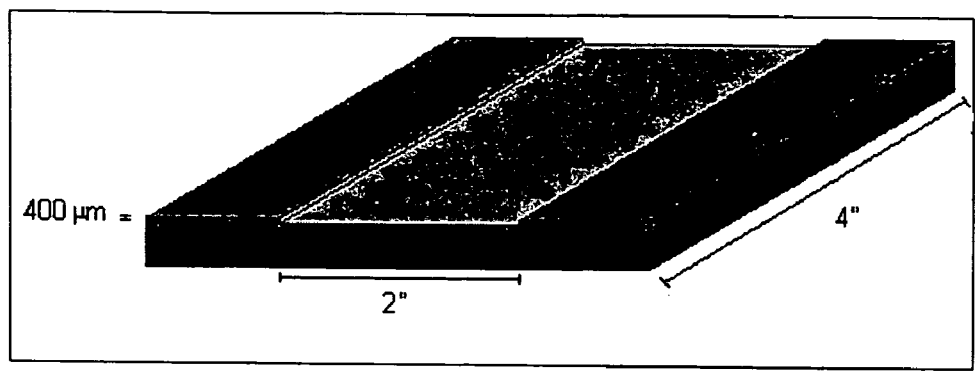
FIG. 13 This sketch depicts the steel mold used to cast and cure thin PDMS nanocomposite samples.

With mixing completed, thin films approximately 200-400 μm in thickness were produced in order to begin mechanical testing. To accomplish this, three methods were used: i) melt pressing, ii) mold casting and iii) spin casting. Vector and NR films were made using a hot melt press at 170° C. and 150° C. respectively. ~3 g of each sample were pressed at 3000-4000 psi for 20 minutes. Mylar spacers were used to control the thickness of the resulting samples. PDMS films, on the other hand, were generated using a customized steel mold pictured in FIG. 13. After spreading the 1.4 mL of the PDMS/FGS mixture into the mold, the sample was degassed for 2 h under vacuum and then cured by heating to 100° C. for an additional 2 h. This allowed for the in-situ polymerization of the PDMS/FGS composite.

Although each of first two methods produced uniform films, they did not help orient the FGS platelets within the sample. Accordingly, one could suppose that the filler was arranged randomly within each film made through the hot press or solution cast methods. In an effort to impose some degree of platelet alignment within each sample, a spin casting approach was employed. Although this method could have been used to produce samples with any of the elastomers used, NR composites were cast in our trials. Accordingly, NR and FGS were first mixed with solution mixing as described above. The resulting solution was then spun layer-by-layer onto silicone wafers at speeds ranging from 500-5000 rpm. After each application, the wafer was heated to 170° C. to help vulcanize the composite. This step was important in order to prevent the THF from dissolving previously applied layers. In total, 10-12 layers were applied, generating films ~200 μm in thickness.

Measuring Mechanical Properties

In order to quantify the effect of nanofillers on each of the polymers used, different mechanical tests were performed. First, tests were performed on each composite to evaluate any changes in Young's modulus as well tensile strength. These measurements were done using an Instron 1122 at a constant strain rate of 2" $min^{-1}$. In order to evaluate the barrier properties of the materials, a diffusion cell was constructed.

Diffusion Cell Design

Figure 14:
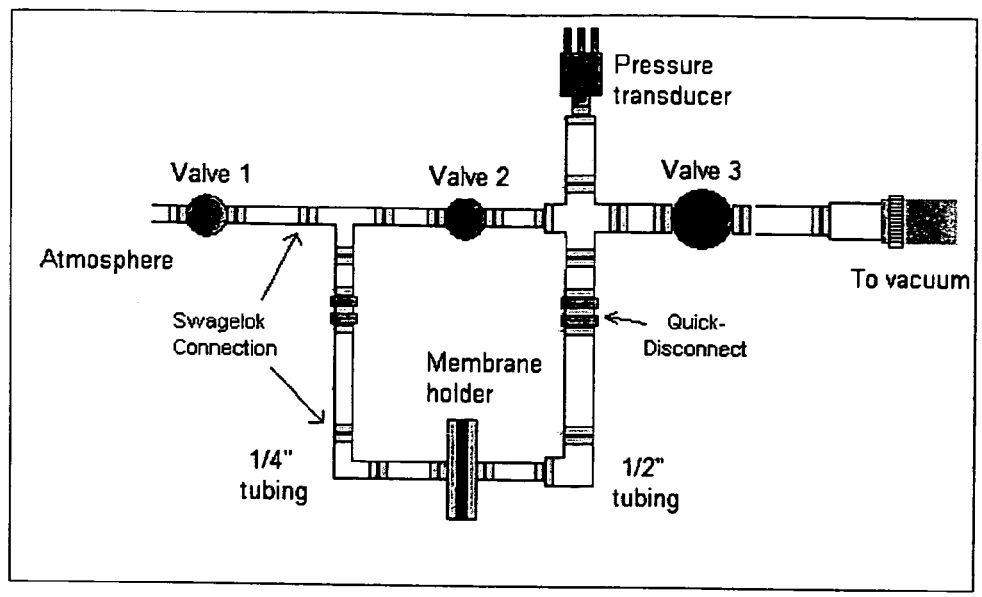
FIG. 14 depicts the diffusion cell constructed to perform permeability measurements.

A sketch of the cell constructed in the lab of the inventors is provided in FIG. 14 shown above. A few of the design features include the following: (i) a 47 mm Millipore® membrane holder was used to secure and house the composite film. To improve measurement accuracy, the standard silicone O-rings were replaced with less permeable Viton® fluoropolymer seals. (ii) Stainless steel piping was connected to a GE Electric roughing vacuum pump, used to pump the system down to ~2 mTorr, measured by a Varian® thermocouple. This pressure transducer reported readings ranging from 1-2000 mTorr. Valves 2 and 3 were incorporated to allow for the initial evacuation of the entire system when open, followed by the isolation of the downstream side when closed. In this way, a steady state vacuum could be reached before valve 1 is opened and measurements are taken. (iv) Using the permeability of NR as a basis, equation 2.5 was used to calculate $$\frac{dp}{dt}$$

for this design. In order to achieve a 'reasonable' pressure increase rate of 1 mTorr·s$^{-1}$, (The rate of 1 mTorr·s$^{-1}$ was proposed based on the resolution limitations of the transducer output) a downstream volume of approximately 50 cm$^3$ was calculated. This volume was achieved by incorporating larger ½" tubing on the evacuated side.

Figure 15:
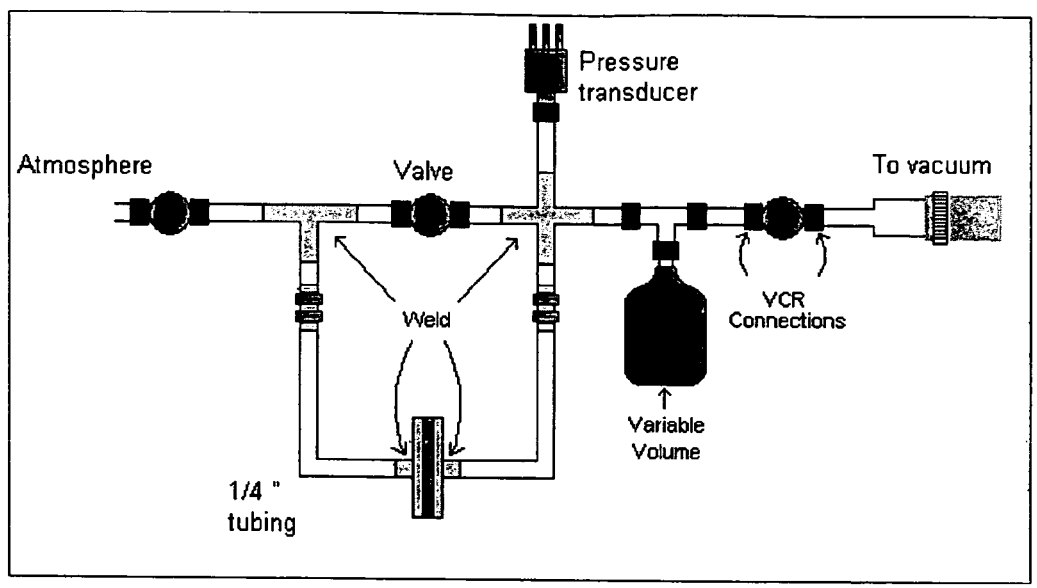
FIG. 15 illustrates the preferred design, incorporating VCR fittings as well as the option for the attachment of additional downstream volume.

In a preferred embodiment, another addition was incorporated. In order to provide the cell with more flexibility in measuring a wide range of barriers, an effort was made to make the downstream volume variable. Since $$\frac{dp}{dt} \propto \frac{1}{V},$$

modulating the volume would thus allow the user to adjust $$\frac{dp}{dt}$$

for a wide range of nanocomposites where permeability coefficients may vary by as much 3-4 orders of magnitude. FIG. 15 below illustrates the preferred embodiment with the attachment for additional volume.

To aid with the assembly of this setup, another leak checking method was implemented: 2-Propanol detection. When applying 2-Propanol to imperfect connections, a small amount of the liquid will vaporize and be sucked into the system, causing an observable pressure jump. This method was superior to the Bubble Test as it could be performed while the system was under vacuum. Accordingly, no system changes needed to be made when leak checking, thus reducing the number of potential leak sources. Using the VCR® fittings and 2-propanol leak checking method, the preferred design was assembled and leaks were reduced to 0.02 mTorr·s$^{-1}$. As this value represents 1% of the calculated $$\frac{dp}{dt}$$

value for NR, one can conclude that the preferred embodiment will produce permeability measurements with only a small degree of uncertainty.

Results and Discussion
Tensile Properties

The effect of FGS filler on both the Young's modulus and tensile strength of two elastomers was investigated. For these tests, both natural rubber and PDMS were evaluated with 0.25-5.0 wt % FGS loading. Subsequently, tensile tests were performed for comparison with carbon black, a common filler used in rubbers.

Young's Modulus and Tensile Strength

Young's Modulus for NR and PDMS

Figure 16:
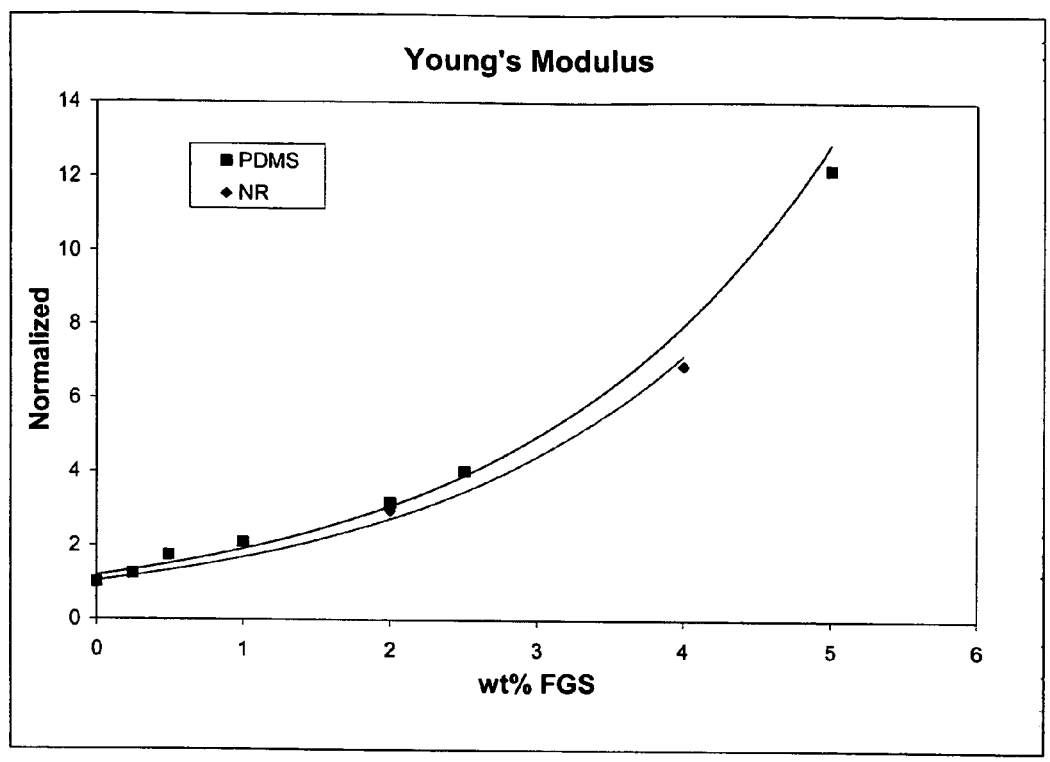
FIG. 16 illustrates increases in Young's modulus as a function of FGS loading for NR and PDMS. At 0% loading the Young's modulus of PDMS and NR were found to be 0.9 and 1.67 MPa respectively.

As presented in FIG. 16, the following results were observed using a constant strain test. In each case, the Young's modulus was determined from measurements taken during the first 2 seconds of elongation.

As can be seen in this figure, the addition of FGS produces substantial stiffening within the rubber as modulus increases of 8 and 12 fold were observed in NR and PDMS respectively.

Figure 17:
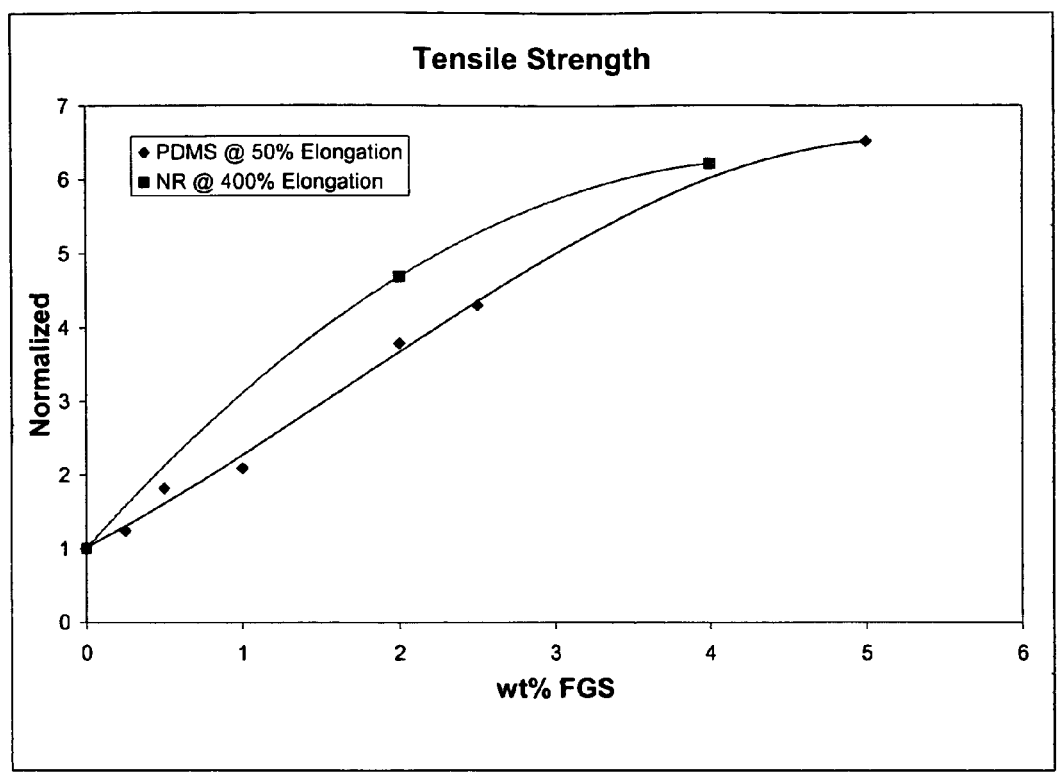
FIG. 17 depicts increases in tensile strength for NR and PDMS/FGS nanocomposites. At 0% loading the Tensile Strength of PDMS and NR were found to be 0.33 and 2.72 MPa respectively.

Similar tests were performed to quantify the tensile strength for both nanocomposites. These results are illustrated in FIG. 17, listing strengths at 50% elongation and 400% elongation for PDMS and NR respectively.

As compared to published data, these results are astounding. Table 2 below provides a comparison for the tensile property increases obtained through clay/rubber nanocomposites. In each case, FGS provides a significant improvement over literature results.

TABLE 2

In this table, results with PDMS and NR samples are compared with recent published results using clay nanoplatelets. In each case, FGS outperforms its counterpart.

| Composite | | Young's Modulus (relative to neat rubber) | | Tensile Strength (relative to neat rubber) | |
|---|---|---|---|---|---|
| Polymer | wt % filler | Clay | FGS | Clay | FGS |
| PDMS | 5.0 | 1.28[1] | 12.18 | 2.38[1] | 6.52 |
| NR | 5.0 | 2.25[2] | 6.89 | 1.26[2] | 6.21 |

[1]LeBaron, P. C.; Pinnavaia, T. J., Clay nanolayer reinforcement of a silicone elastomer. Chemistry of Materials 2001, 13, (10), 3760-3765.
[2]Wang, Y. Q.; Zhang, H. F.; Wu, Y. P.; Yang, J.; Zhang, L. Q., Structure and properties of strain-induced crystallization rubber-clay nanocomposites by co-coagulating the rubber latex and clay aqueous suspension. Journal of Applied Polymer Science 2005, 96, (2), 318-323.

Comparison with Carbon Black

Figure 18:
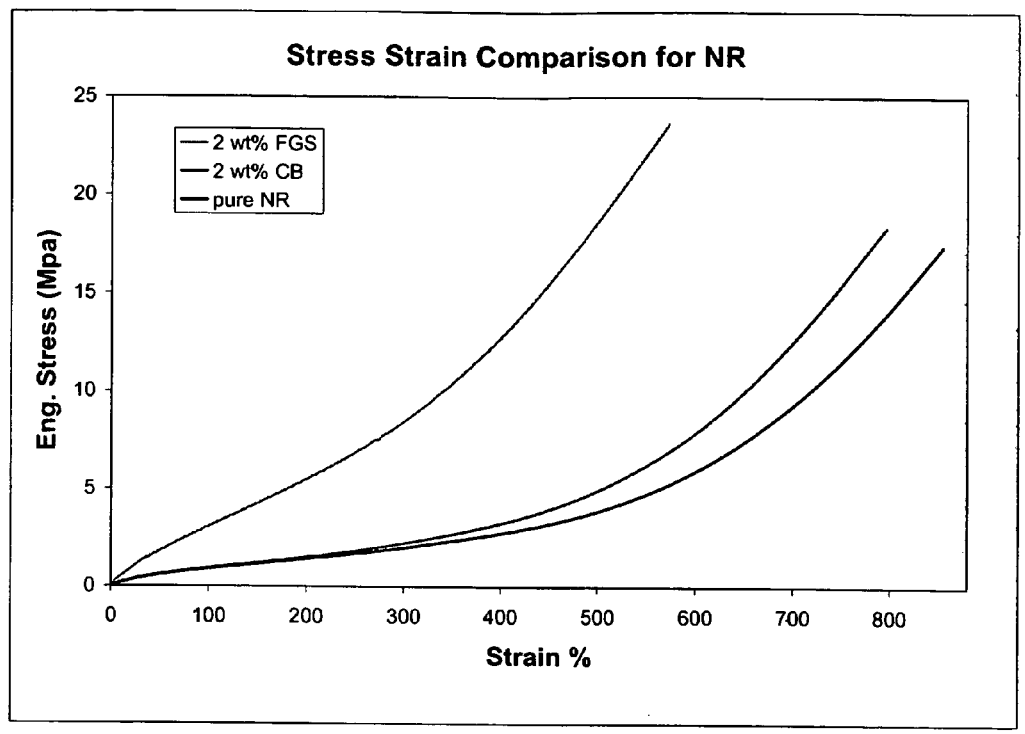
FIG. 18 compares NR loaded with both CB and FGS. One notes that FGS rubbers provide increased tensile strength while sacrificing total elongation. Top graph FGS, middle graph CB, bottom graph NR.
Figure 19:
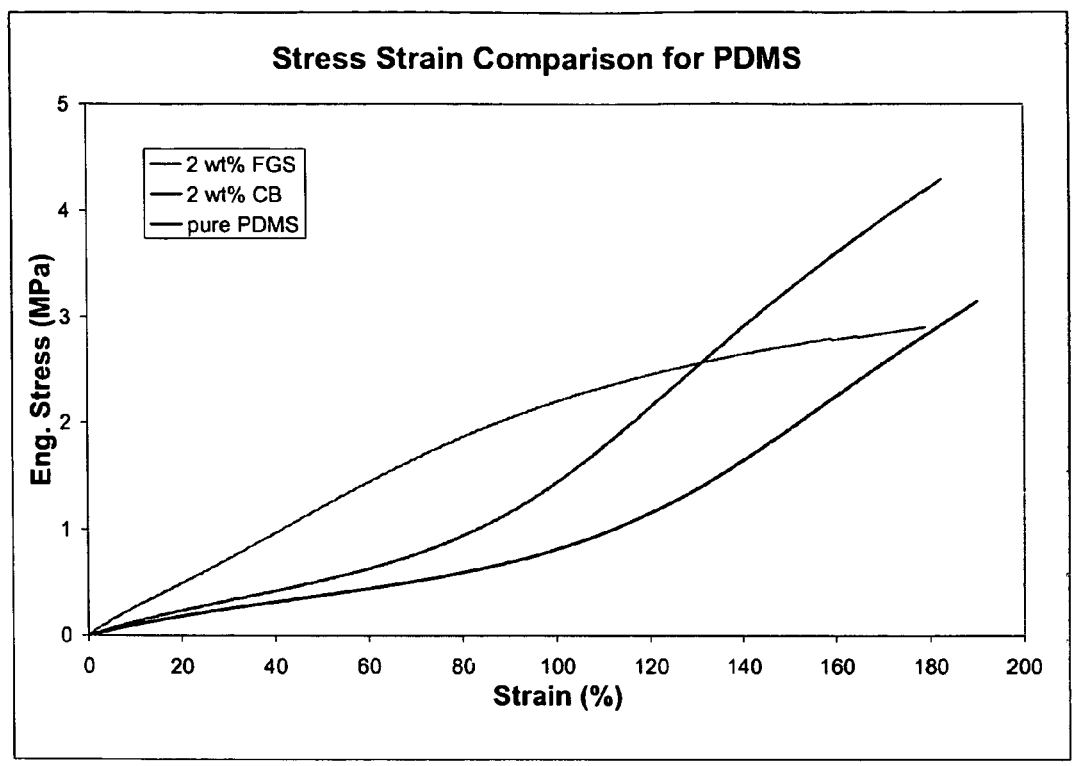
FIG. 19 depicts the differences between PDMS loaded with CB and FGS. Note the yielding behavior seen in FGS samples. Top graph FGS, middle graph CB, bottom graph PDMS.

In order to provide a comparison with fillers used in commercial applications today, tensile tests were completed with CB-filled rubbers as well. As this filler currently dominates the rubber composite industry, it is important to know how FGS composites differ. As such, FIG. 18 provides a comparison between NR composites whereas FIG. 19 illustrates PDMS composites.

From these graphs, one notes immediate differences between CB and FGS fillers. Aided by graphite's large in-plane modulus, FGS demonstrates a greater tensile strength at all strain levels in NR composites. Toughness is also improved from 4,190 MPa with CB to 5,426 MPa with FGS, a 29% increase. This improvement, however, comes at the expense of a reduction in elasticity as in total elongation decreases. In PDMS, FGS provides similar increases in tensile strength below 70% elongation. After this point, however, the sample begins to demonstrate yielding behavior while the CB sample begins to strain harden. Nonetheless, the FGS does afford a small increase in toughness, rising to 324 MPa as compared to CB's 299 MPa, an 8% increase.

Barrier Properties

Permeation through FGS filled elastomers was measured in the above diffusion cell.

Diffusion Cell Evaluation

Before beginning nanocomposite measurements, the performance of the diffusion cell was evaluated. Using the preferred embodiment of the diffusion cell, three neat rubbers were pressed or cast into films and analyzed: PDMS, NR and Vector V4111. NR and Vector were prepared by pressing 3 g of the bulk polymer at 150 and 170° C. respectively from 20 minutes at 3000 psi.

Figure 20:
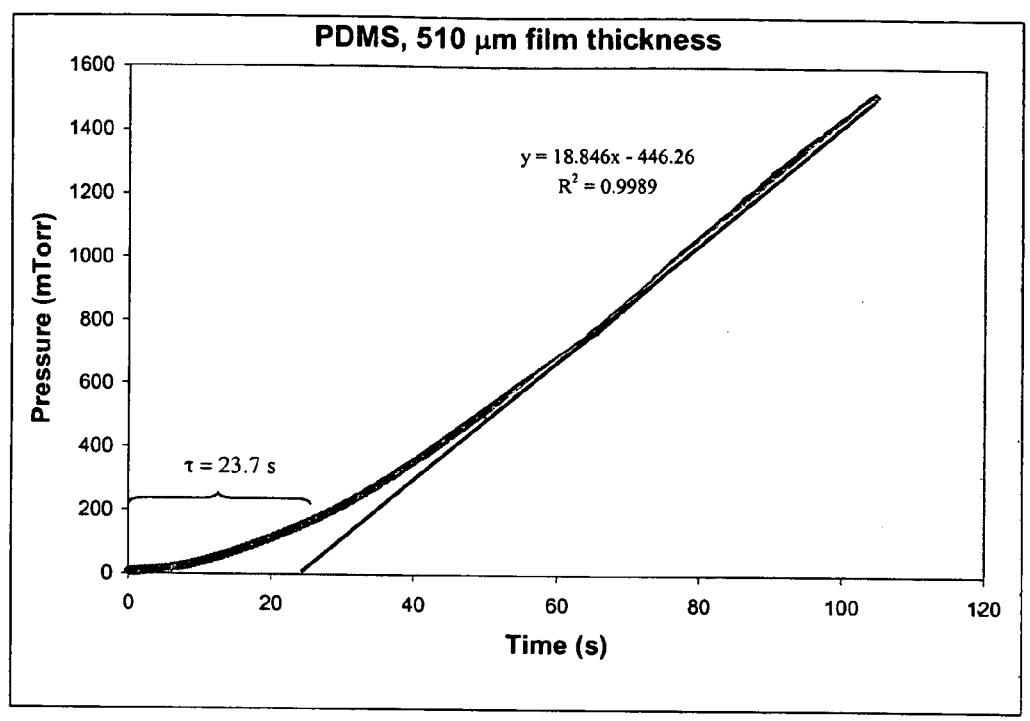
FIG. 20 is a typical Time vs. Pressure plot for a pure PDMS film, 510 μm in thickness.
Figure 21:
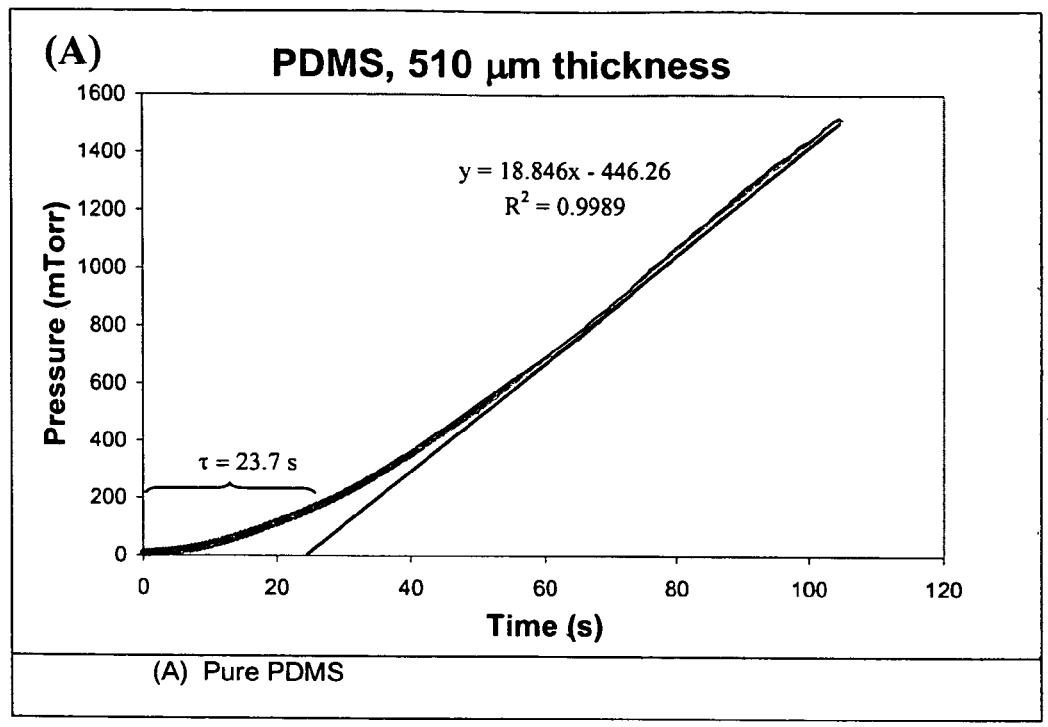
FIG. 21 shows permeation measurements for PDMS (A) and NR (B).
Figure 22:
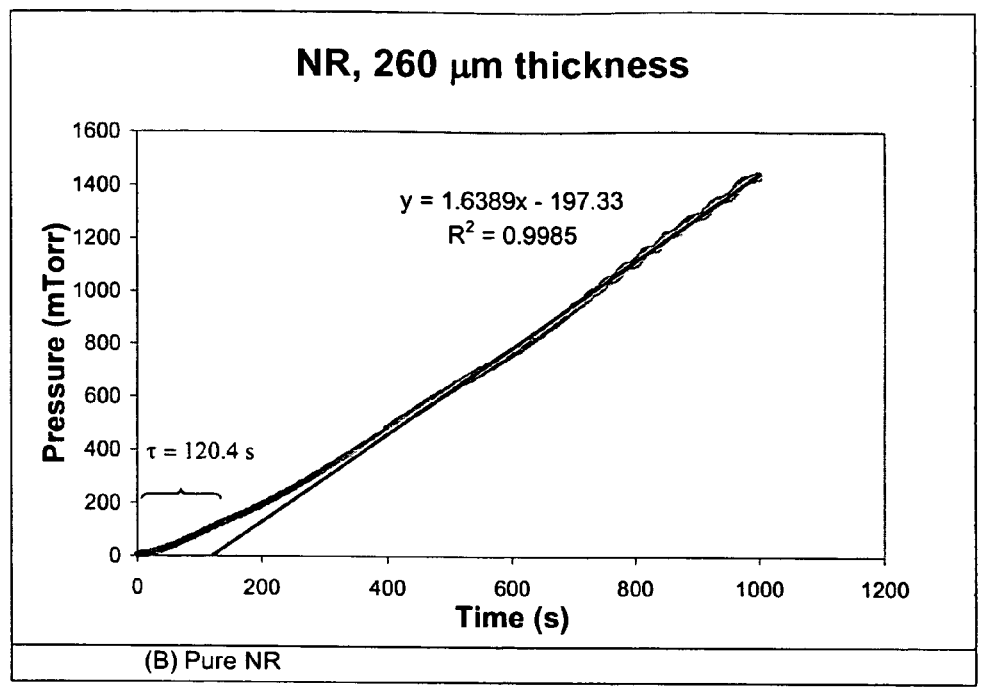
FIG. 22 shows permeation measurements for NR (B).
Figure 23:
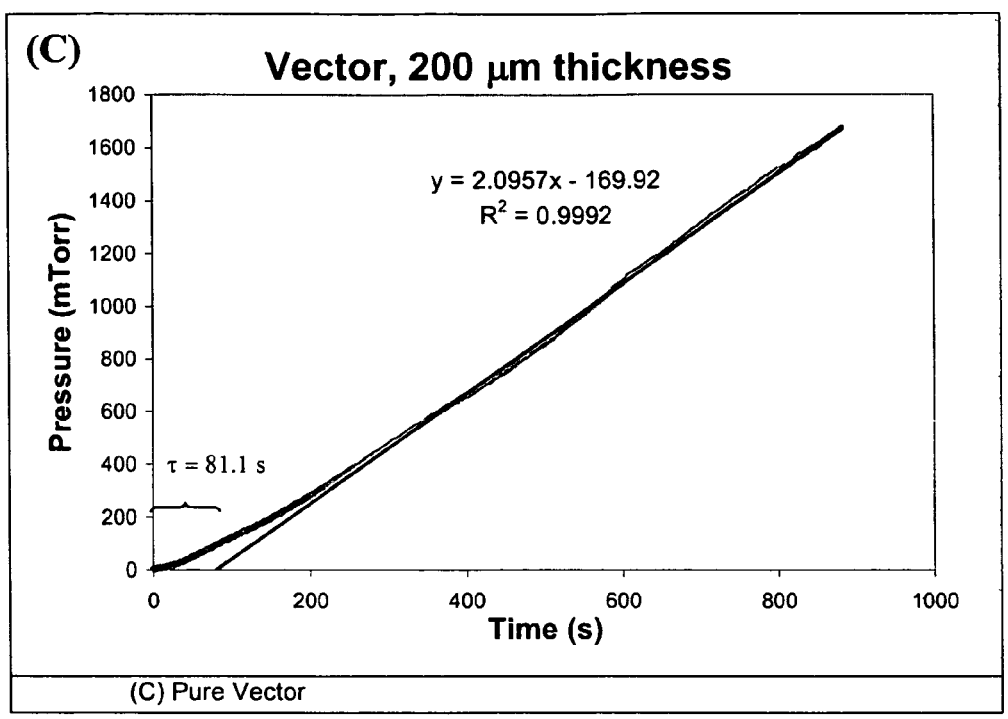
FIG. 23 shows permeation measurements for Vector (C).
Figure 24:
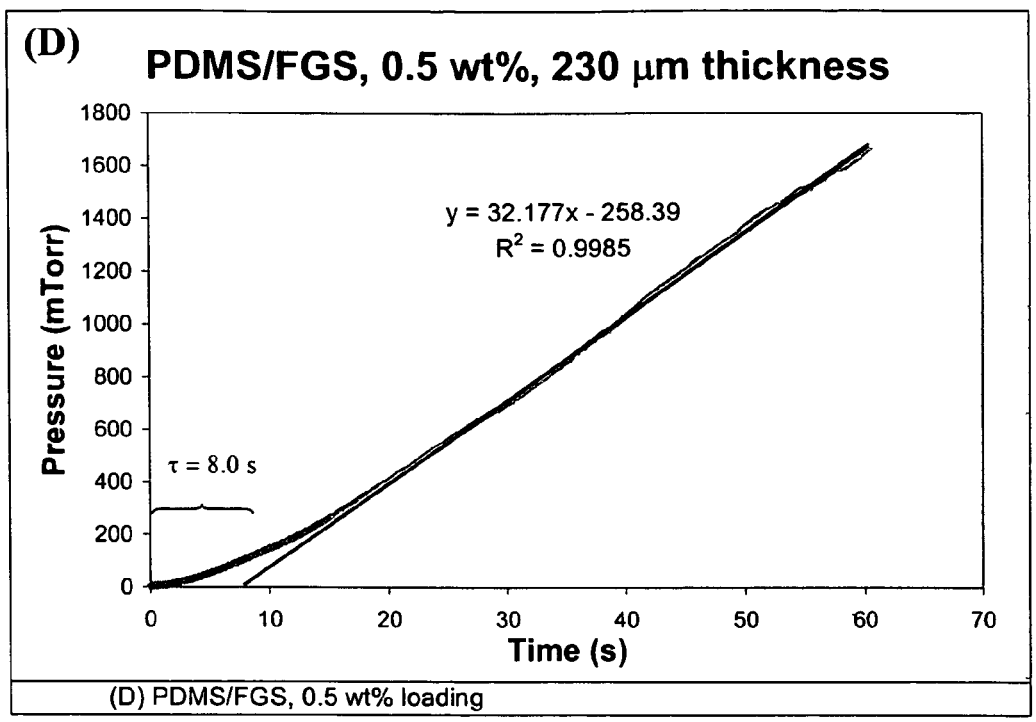
FIG. 24 shows permeation measurements for (D) PDMS/FGS, 0.5 wt % loading.
Figure 25:
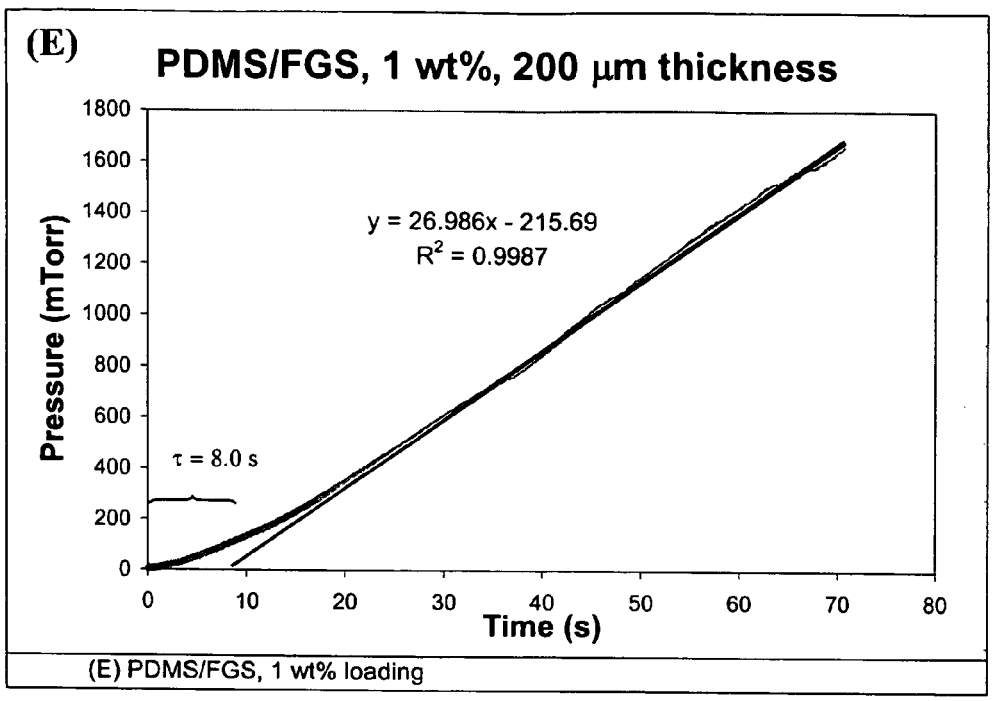
FIG. 25 shows permeation measurements for (E) PDMS/FGS, 1 wt % loading.
Figure 26:
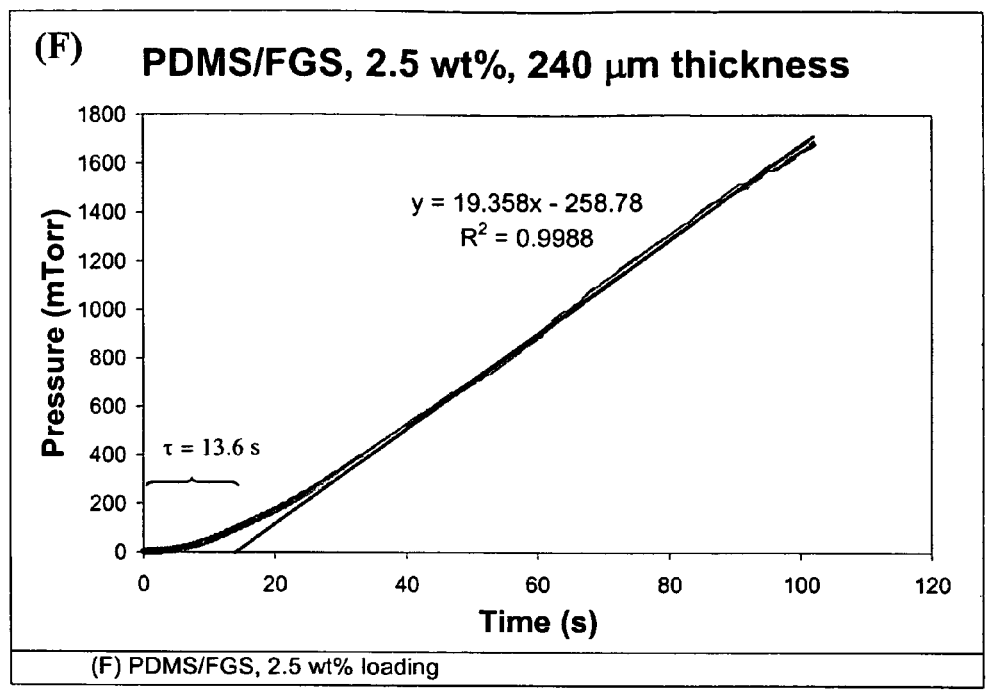
FIG. 26 shows permeation measurements for (F) PDMS/FGS, 2.5 wt % loading.
Figure 27:
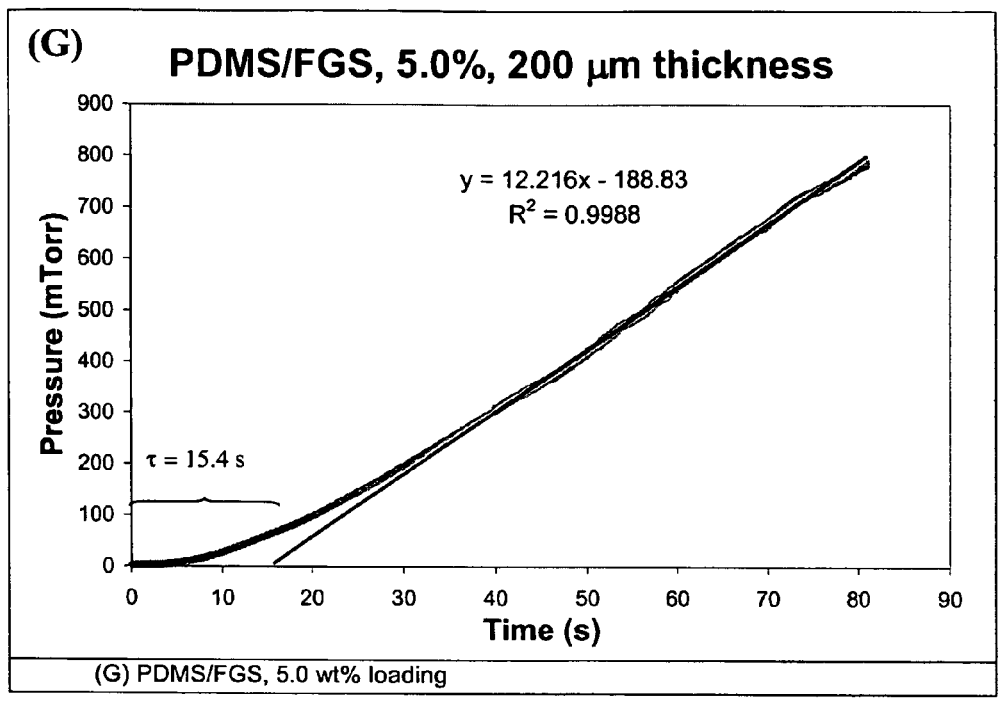
FIG. 27 shows permeation measurements for (G) PDMS/FGS, 5.0 wt % loading.
Figure 28:
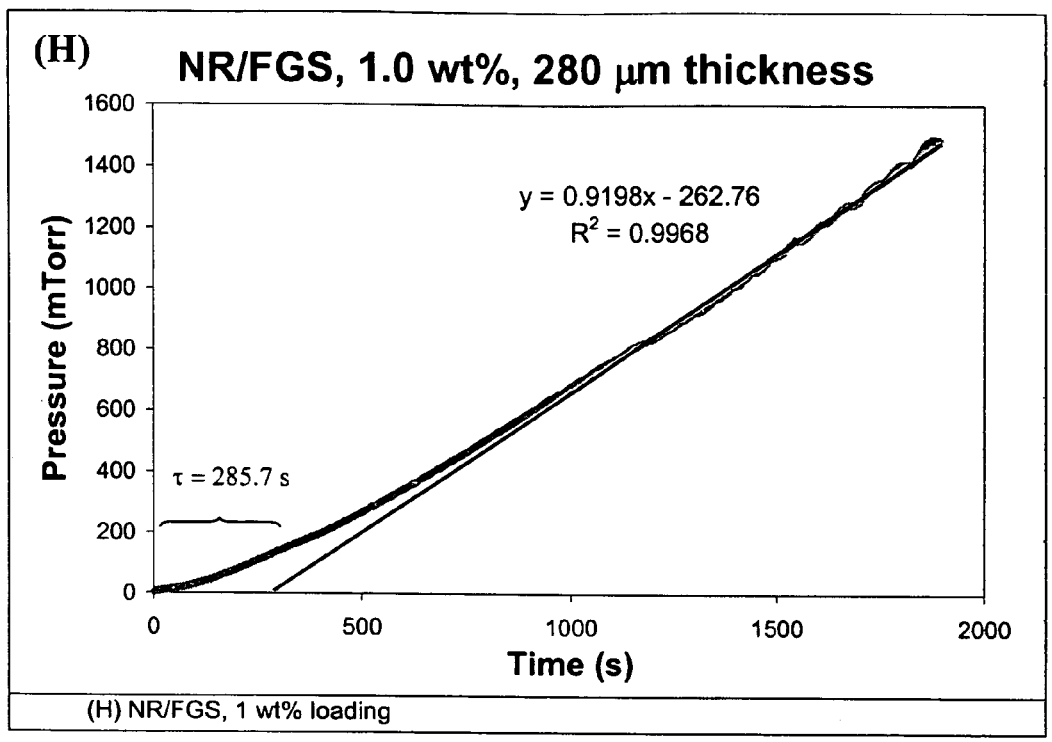
FIG. 28 shows permeation measurements for (H) NR/FGS, 1 wt % loading.
Figure 29:
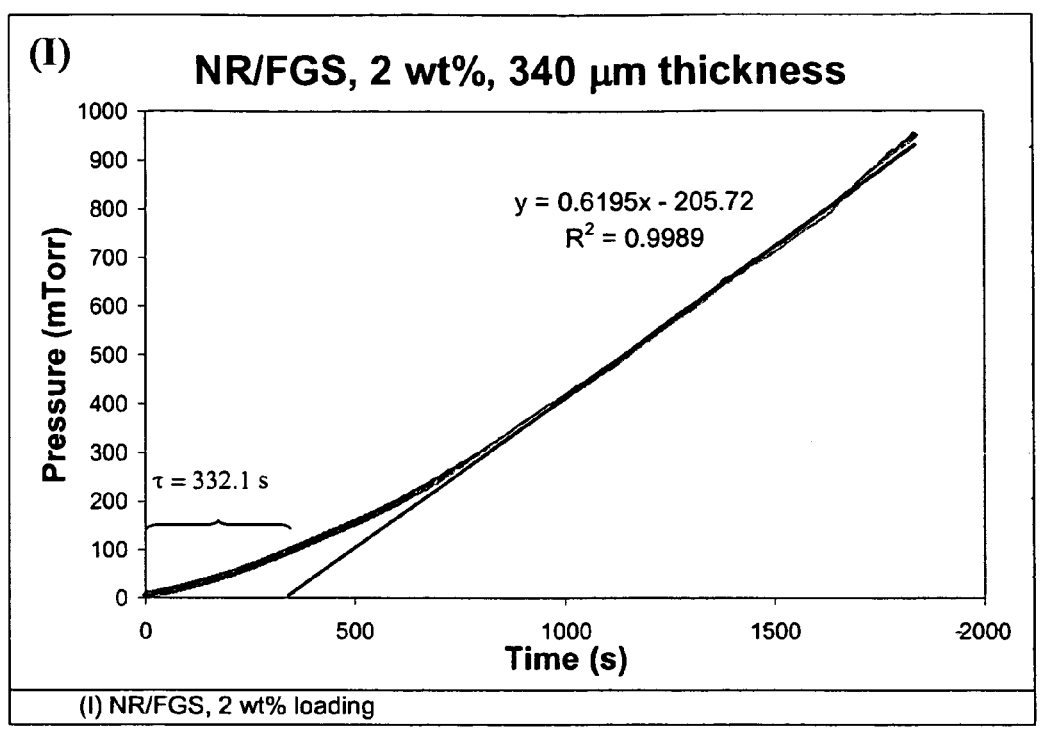
FIG. 29 shows permeation measurements for (I) NR/FGS, 2 wt % loading.
Figure 30:
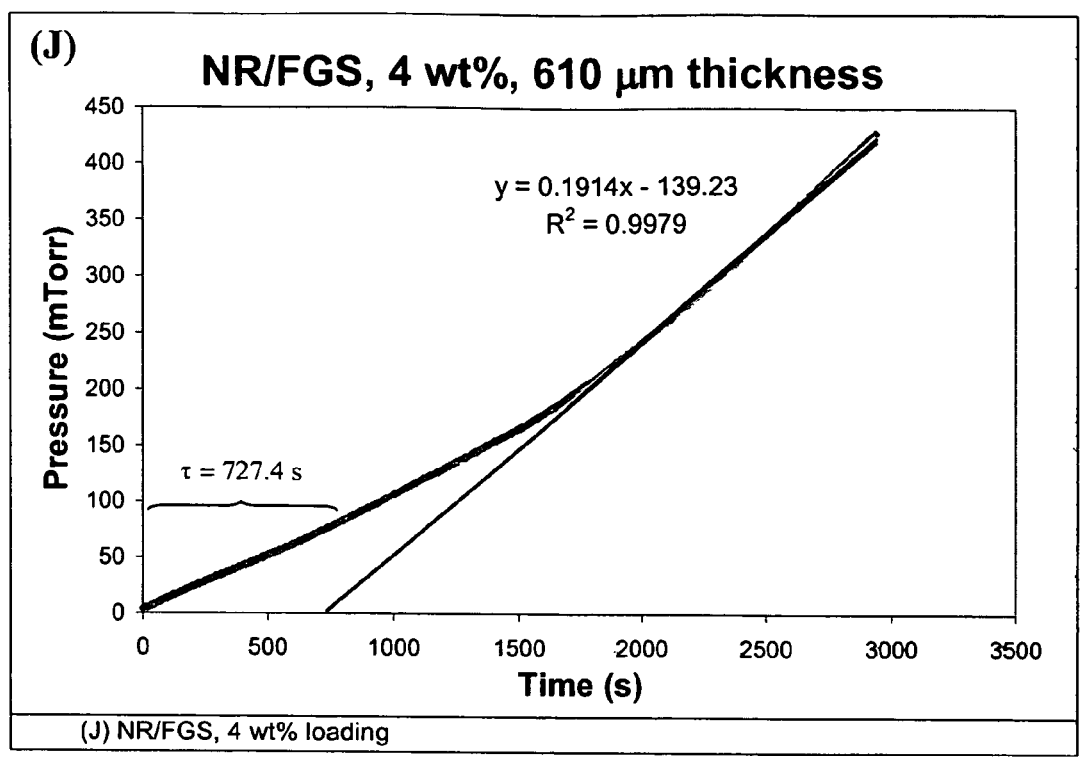
FIG. 30 shows permeation measurements for (J) NR/FGS, 4 wt % loading.
Figure 31:
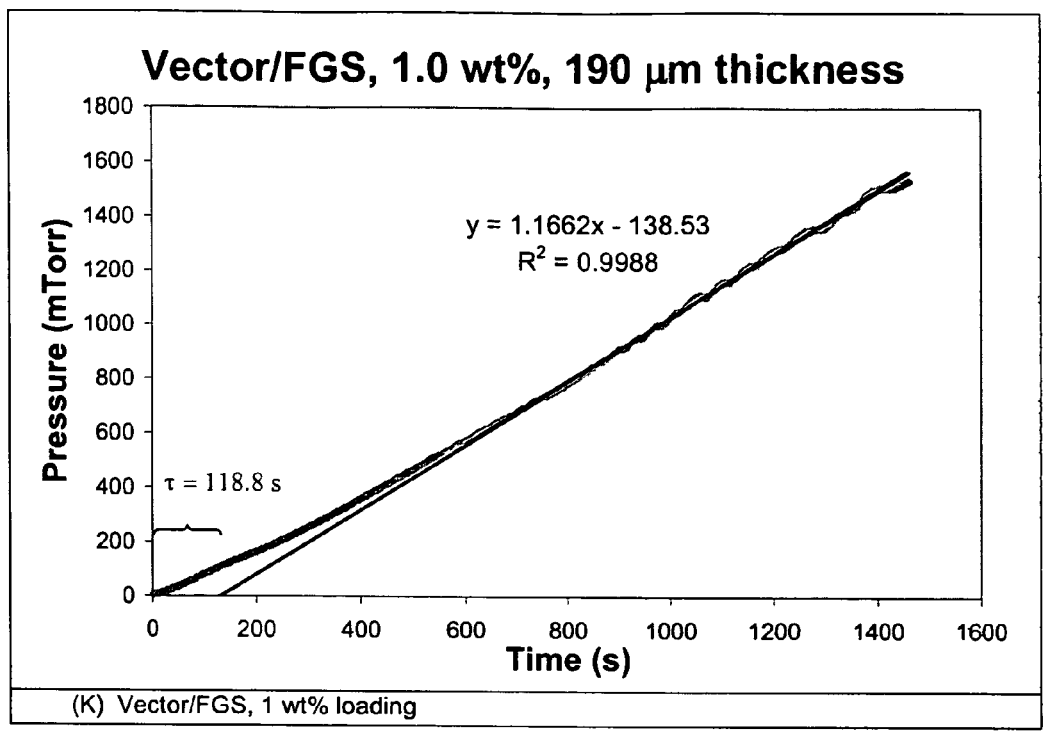
FIG. 31 shows permeation measurements for (K) Vector/FGS, 1 wt % loading.
Figure 32:
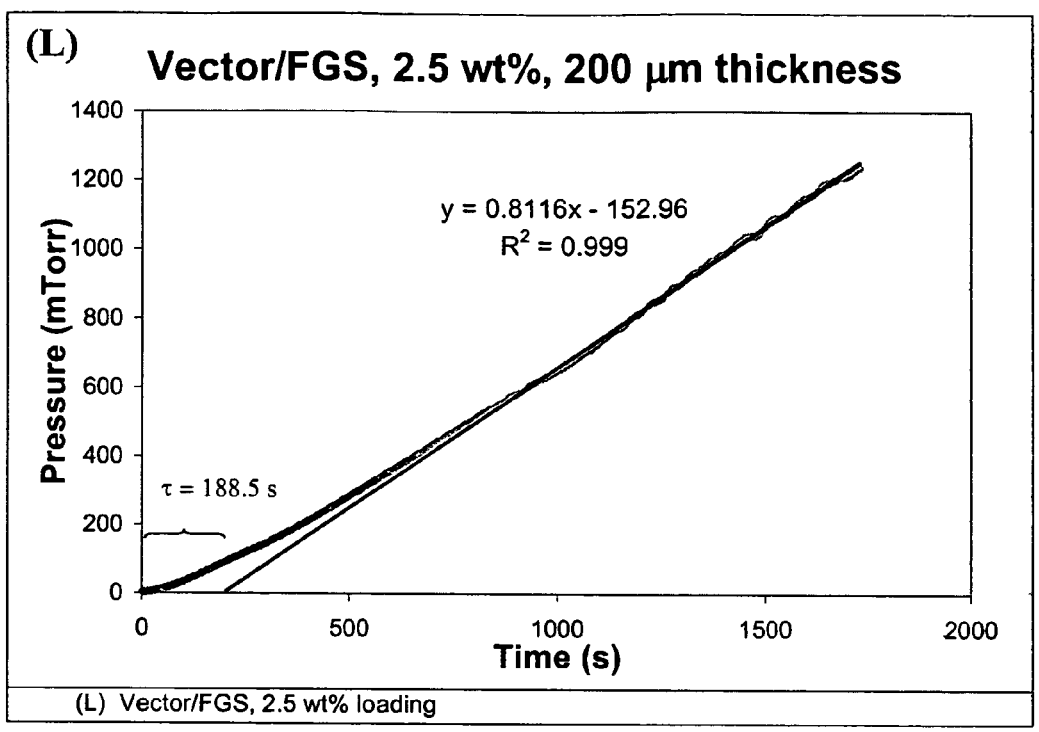
FIG. 32 shows permeation measurements for (L) Vector/FGS, 2.5 wt % loading.
Figure 33:
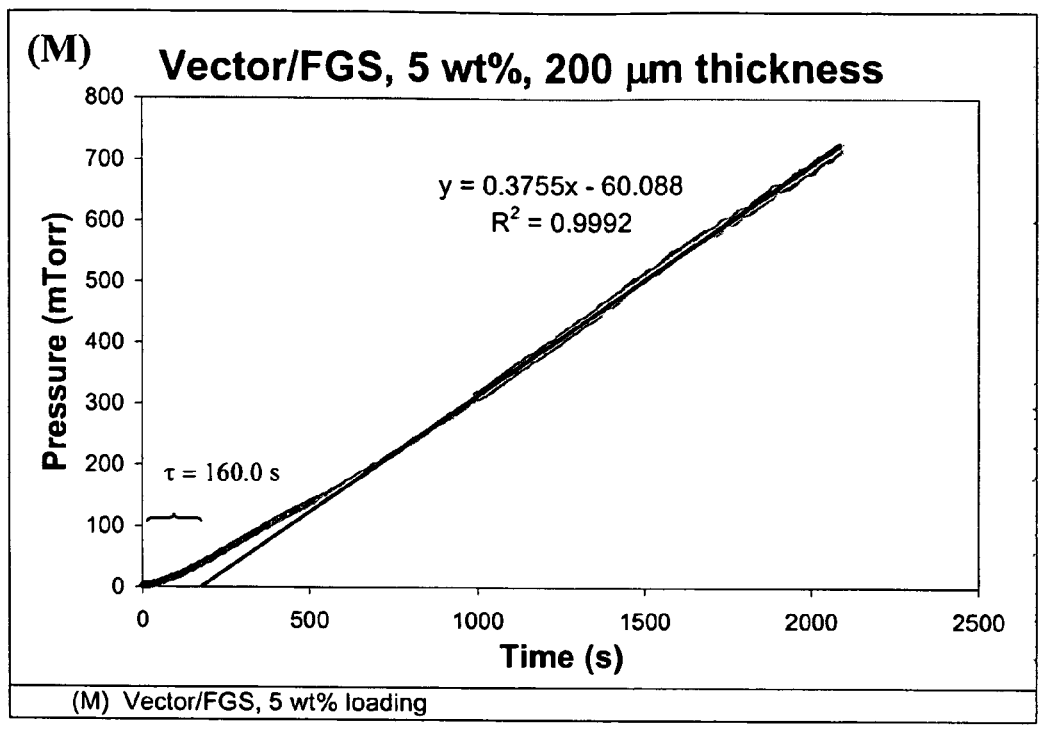
FIG. 33 shows permeation measurements for (M) Vector/FGS, 5 wt % loading.
Figure 34:
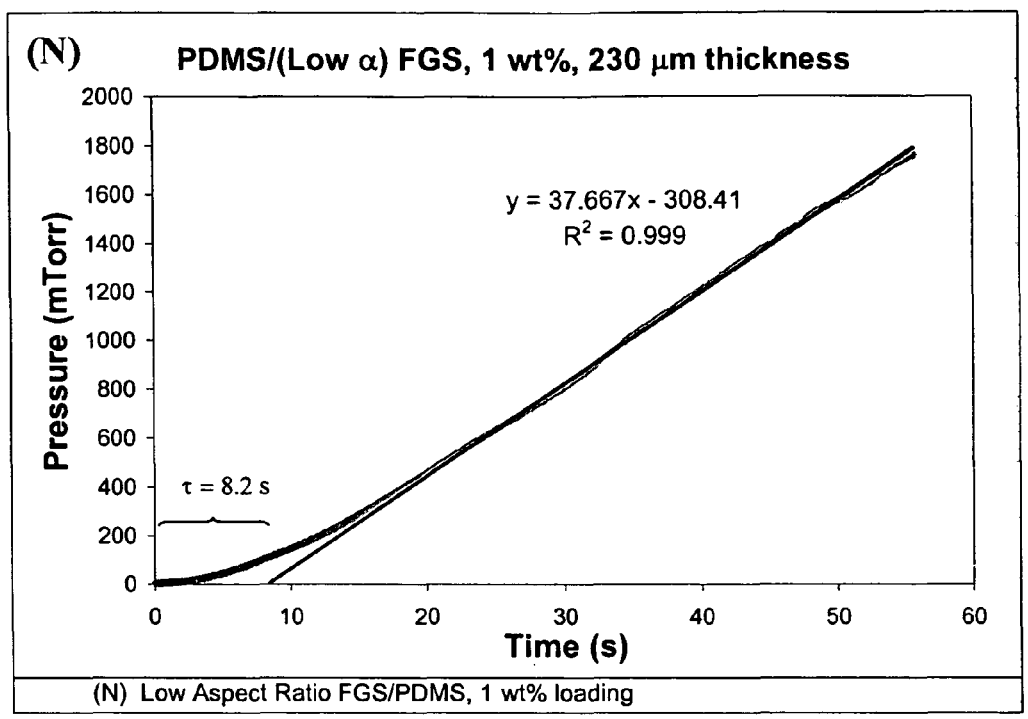
FIG. 34 shows permeation measurements for (N) Low Aspect Ratio FGS/PDMS, 1 wt % loading.
Figure 35:
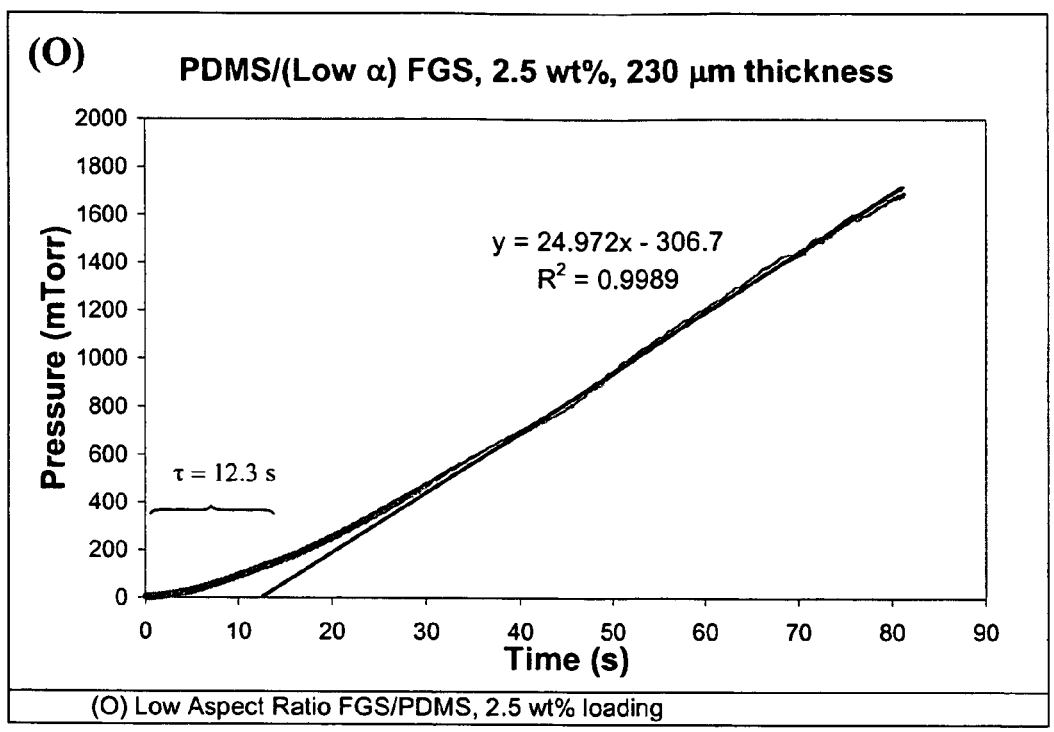
FIG. 35 shows permeation measurements for (O) Low Aspect Ratio FGS/PDMS, 2.5 wt % loading.
Figure 36:
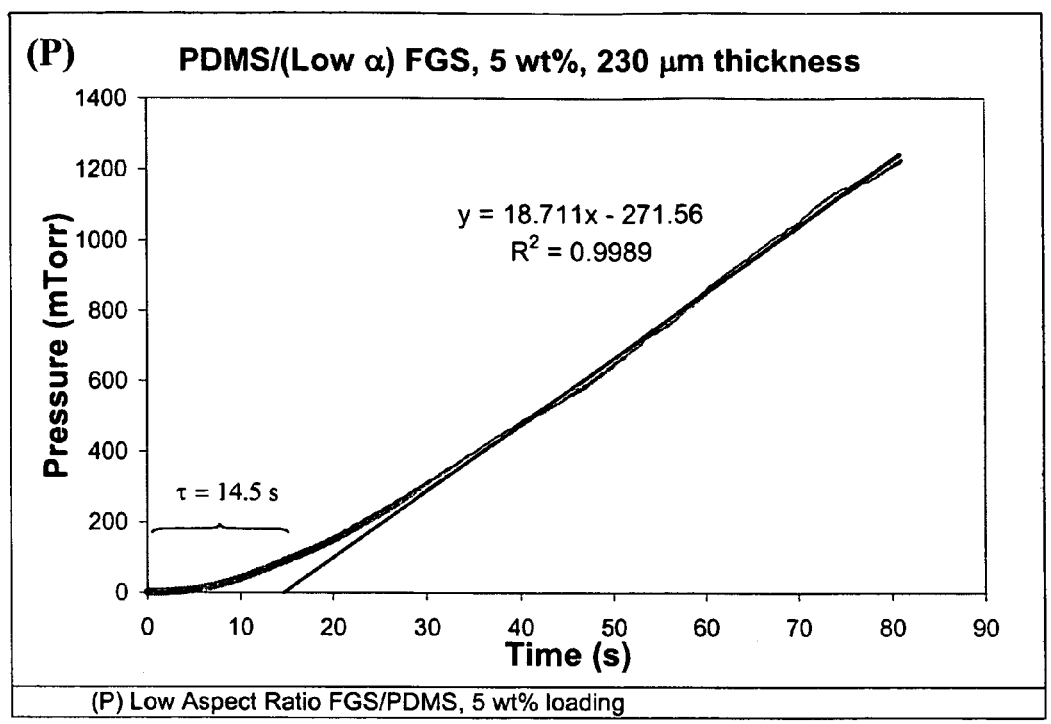
FIG. 36 shows permeation measurements for (P) Low Aspect Ratio FGS/PDMS, 5 wt % loading.
Figure 37:
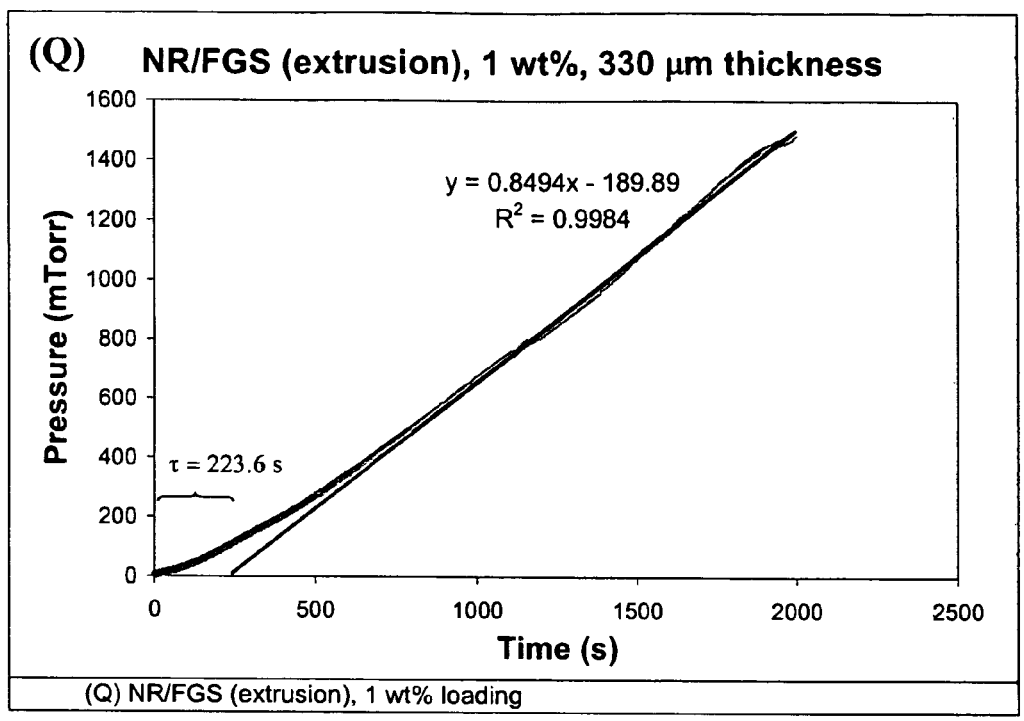
FIG. 37 shows permeation measurements for (Q) NR/FGS (extrusion), 1 wt % loading.
Figure 38:
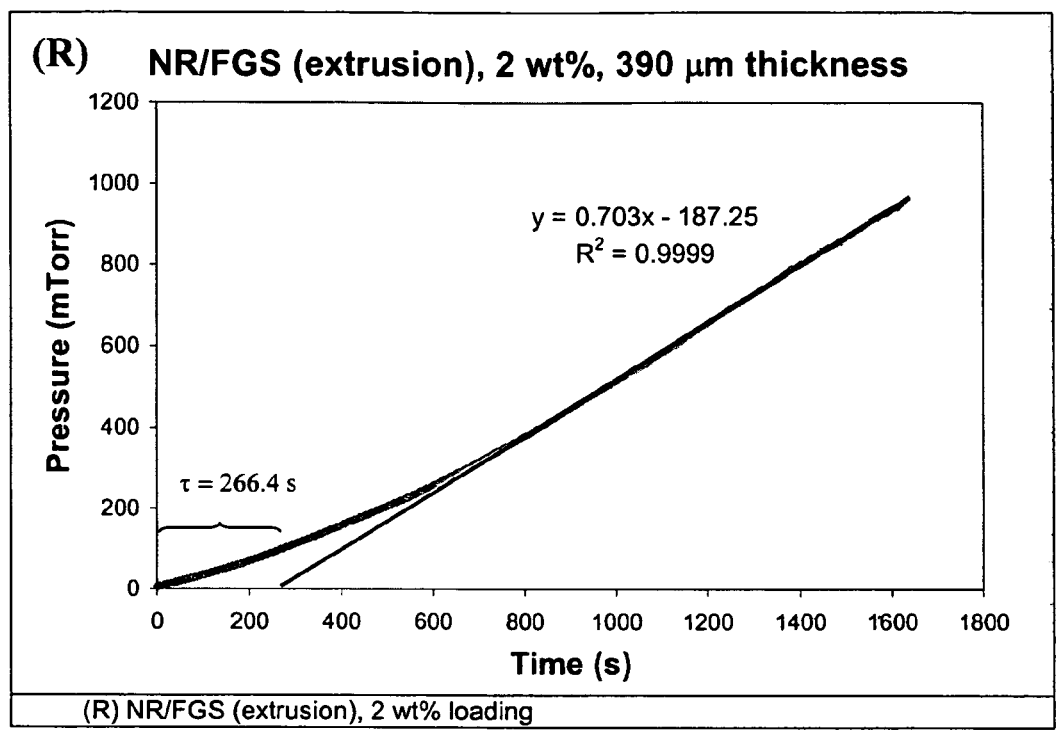
FIG. 38 shows permeation measurements for (R) NR/FGS (extrusion), 2 wt % loading.

PDMS films were produced using the above described casting technique, degassed for 2 h and heated to 100° C. for 2 h. When evaluating each polymer, pressure vs. time plots like the one above (FIG. 20) were generated. Results for all other samples are provided in FIGS. 21-38. The set of figures illustrates representative samples for permeation measurements taken for each of the three elastomers, as well as for three FGS composites.

TABLE 3

Summary of Permeability, Diffusivity and Solubility values for each polymer and composite. Normalized values appear below.

| Polymer | FGS wt % | Permeability ($m^2$/s atm) | Diffusivity ($m^2$/s) | Solubility ($atm^{-1}$) |
|---|---|---|---|---|
| PDMS | 0 | 1.63E−10 | 2.03E−09 | 8.10E−02 |
|  | 0.25 | 1.24E−10 | 1.70E−09 | 8.00E−02 |
|  | 0.5 | 9.38E−11 | 9.80E−10 | 9.60E−02 |
|  | 1.0 | 1.12E−10 | 1.07E−09 | 1.05E−01 |
|  | 2.5 | 9.15E−11 | 1.46E−09 | 6.33E−02 |
|  | 5.0 | 8.11E−11 | 8.46E−10 | 9.62E−02 |
| (Low Aspect) | 1.0 | 1.23E−10 | 9.20E−10 | 1.36E−01 |
|  | 2.5 | 8.60E−11 | 6.99E−10 | 1.26E−01 |
|  | 5.0 | 6.41E−11 | 7.38E−10 | 8.97E−02 |
| Natural Rubber | 0.0 | 5.16E−12 | 9.35E−11 | 5.64E−02 |
| (solution method) | 1.0 | 3.86E−12 | 5.49E−11 | 5.22E−02 |
|  | 2.0 | 3.16E−12 | 6.91E−11 | 4.72E−02 |
|  | 4.0 | 1.96E−12 | 4.58E−11 | 2.55E−02 |
| (extrusion) | 1.0 | 4.25E−12 | 5.80E−11 | 7.33E−02 |
|  | 2.0 | 3.63E−12 | 6.21E−11 | 5.84E−02 |
| Vector | 0.0 | 5.21E−12 | 8.83E−11 | 6.08E−02 |
|  | 1.0 | 3.30E−12 | 5.05E−11 | 6.57E−02 |
|  | 2.5 | 2.40E−12 | 4.80E−11 | 5.00E−02 |
|  | 5.0 | 1.16E−12 | 2.15E−11 | 5.40E−02 |
| PDMS | 0 | 1.00 | 1.00 | 1.00 |
|  | 0.25 | 0.76 | 0.84 | 0.99 |
|  | 0.5 | 0.63 | 0.50 | 1.24 |
|  | 1.0 | 0.53 | 0.57 | 0.98 |
|  | 2.5 | 0.38 | 0.34 | 1.28 |
|  | 5.0 | 0.21 | 0.32 | 0.66 |
| (Low Aspect) | 1.0 | 0.75 | 0.45 | 1.68 |
|  | 2.5 | 0.53 | 0.34 | 1.55 |
|  | 5.0 | 0.39 | 0.36 | 1.11 |
| Natural Rubber | 0.0 | 1.00 | 1.00 | 1.00 |
| (solution method) | 1.0 | 0.75 | 0.59 | 0.93 |
|  | 2.0 | 0.61 | 0.74 | 0.84 |
|  | 4.0 | 0.38 | 0.49 | 0.45 |
| (extrusion) | 1.0 | 0.82 | 0.62 | 1.30 |
|  | 2.0 | 0.70 | 0.66 | 1.04 |
| Vector | 0.0 | 1.00 | 1.00 | 1.00 |
|  | 1.0 | 0.63 | 0.57 | 1.08 |
|  | 2.5 | 0.46 | 0.54 | 0.82 |
|  | 5.0 | 0.22 | 0.24 | 0.89 |

After calculating the steady state slope and x-intercept, equations 2.5 and 2.6 were used to determine the permeability and diffusivity of each polymer. The solubility of each rubber was calculated based on the following principles:

The process of gas transport through a polymer membrane can be described through three steps: sorption, diffusion and desorption. In this way, the gas will absorb at one surface of the polymer film, diffuse through the film and evaporate on the other side. The driving force behind this process lies in the concentration or pressure gradient of gas on either side of the film. If the gradient remains constant, then this mass action can be described by Fick's first law, $$J = -D\frac{\partial c}{\partial x} \quad (2.1)$$

where J is the flux (i.e. amount of gas diffusing per unit film area, per unit time), D is the coefficient of diffusion and $$\frac{\partial c}{\partial x}$$

is the gas concentration gradient across the thickness 'x'. In this equation, "c" can be defined as the gas concentration at any given time. This value can be determined using Henry's law, $$c = Sp \quad (2.2)$$

where 'p' is the gas pressure and 'S' is the solubility of the gas in a given polymer. The solubility, along with the coefficient of diffusion can then be used to characterize the permeability 'P' of a given polymer as such, $$P = DS. \quad (2.3)$$

Assuming steady-state diffusion, eq. 2.1-2.3 can be combined to yield, $$P = \frac{Jl}{p_1 - p_2} \quad (2.4)$$

where 'l' is the thickness of the membrane and $p_1$ and $p_2$ are the up and downstream pressures, respectively.

The following calculator was used to perform such calculations.

The following table illustrates the Coefficient Calculator used to determine permeability, diffusivity and solubility parameters based on equations 2.3, 2.5 and 2.6. One can also see how the leak rate was used to correct the measurements. The data here is presented for at 2.5 wt % FGS/PDMS sample.

TABLE 4

| Coefficient Calculator. | | | | | | | |
|---|---|---|---|---|---|---|---|
|  | Trial 1 | Trial 2 | Trial 3 | Trial 4 | Trial 5 | Average | St Dev |
| volume ($cm^3$) | 17.71 | 17.71 | 17.71 | 17.71 | 17.71 | 17.71 |  |
| thickness (mm) | 0.23 | 0.23 | 0.23 | 0.23 | 0.23 | 0.23 |  |
| pressure diff (torr) | 760 | 760 | 760 | 760 | 760 | 760 |  |
| Temperature (K) | 298 | 298 | 298 | 298 | 298 | 298 |  |
| Dp/dt (mT/s) | 19.69 | 19.35 | 19.15 | 19.23 | 19.16 | 19.32 |  |
| diameter (mm) | 42.4 | 42.4 | 42.4 | 42.4 | 42.4 | 42.4 |  |
| Tau (s) | 14.05 | 11.71 | 12.72 | 16.58 | 16.23 | 14.26 |  |
| PERMEABILITY | | | | | | | |
| ($cm^3$ cm/$cm^2$ torr s) | 9.01E−10 | 8.85E−10 | 8.76E−10 | 8.80E−10 | 8.77E−10 | 8.84E−10 | 1.03E−11 |
| ($m^3$ m/$m^2$ torr s) | 6.85E−11 | 6.73E−11 | 6.66E−11 | 6.69E−11 | 6.66E−11 | 6.72E−11 | 7.80E−13 |
| DIFFUSIVITY | | | | | | | |
| ($cm^2$/s) | 6.28E−06 | 7.53E−06 | 6.93E−06 | 5.32E−06 | 5.43E−06 | 6.30E−06 | 9.52E−07 |
| ($m^2$/s) | 6.28E−10 | 7.53E−10 | 6.93E−10 | 5.32E−10 | 5.43E−10 | 6.30E−10 | 9.52E−11 |

TABLE 4-continued

Coefficient Calculator.

| | Trial 1 | Trial 2 | Trial 3 | Trial 4 | Trial 5 | Average | St Dev |
|---|---|---|---|---|---|---|---|
| SOLUBILITY | | | | | | | |
| atm$^{-1}$ | 1.09E−01 | 8.94E−02 | 9.61E−02 | 1.26E−01 | 1.23E−01 | 1.09E−01 | 1.60E−02 |
| torr$^{-1}$ | 1.44E−04 | 1.18E−04 | 1.26E−04 | 1.66E−04 | 1.61E−04 | 1.43E−04 | 2.10E−05 |
| CORRECTION leak rate: 0.078 mT/s | | | | | | | |
| volume (cm$^3$) | 17.71 | 17.71 | 17.71 | 17.71 | 17.71 | 17.71 | |
| thickness (mm) | 0.23 | 0.23 | 0.23 | 0.23 | 0.23 | 0.23 | |
| pressure diff (torr) | 760 | 760 | 760 | 760 | 760 | 760 | |
| Temperature (K) | 298 | 298 | 298 | 298 | 298 | 298 | |
| Dp/dt (mT/s) | 19.62 | 19.27 | 19.08 | 19.15 | 19.08 | 19.24 | |
| diameter (mm) | 42.4 | 42.4 | 42.4 | 42.4 | 42.4 | 42.4 | |
| Tau (s) | 14.11 | 11.76 | 12.77 | 16.65 | 16.30 | 14.32 | |
| PERMEABILITY | | | | | | | |
| (cm$^3$ cm/cm$^2$ torr s) | 8.98E−10 | 8.82E−10 | 8.73E−10 | 8.77E−10 | 8.73E−10 | 8.80E−10 | 1.03E−11 |
| (m$^3$ m/m$^2$ torr s) | 6.82E−11 | 6.70E−11 | 6.63E−11 | 6.66E−11 | 6.64E−11 | 6.69E−11 | 7.80E−13 |
| DIFFUSIVITY | | | | | | | |
| (cm$^2$/s) | 6.25E−06 | 7.50E−06 | 6.90E−06 | 5.30E−06 | 5.41E−06 | 6.27E−06 | 9.48E−07 |
| (m$^2$/s) | 6.25E−10 | 7.50E−10 | 6.90E−10 | 5.30E−10 | 5.41E−10 | 6.27E−10 | 9.48E−11 |
| SOLUBILITY | | | | | | | |
| atm$^{-1}$ | 1.09E−01 | 8.94E−02 | 9.61E−02 | 1.26E−01 | 1.23E−01 | 1.09E−01 | 1.60E−02 |
| torr$^{-1}$ | 1.44E−04 | 1.18E−04 | 1.26E−04 | 1.66E−04 | 1.61E−04 | 1.43E−04 | 2.10E−05 |

Figure 39:
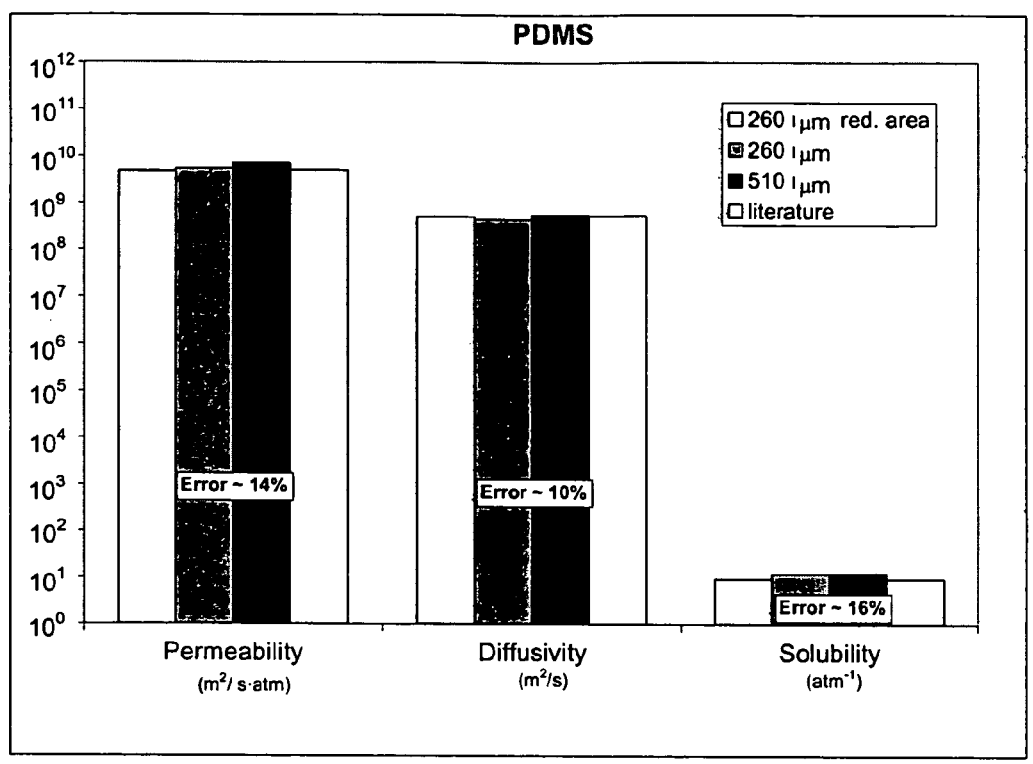
FIG. 39 illustrates permeability, diffusivity and solubility parameters calculated by the diffusion cell for PDMS as compared to literature values. Bars from left to right: 260, 260, 510 μm, literature.
Figure 40:
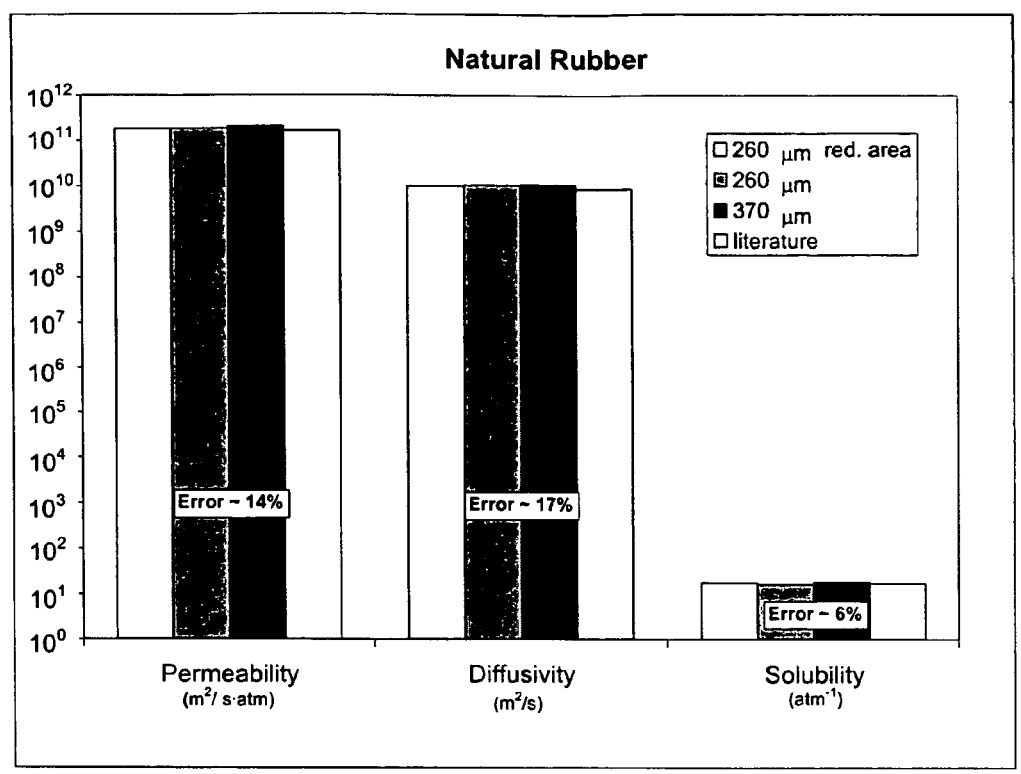
FIG. 40 represents the comparison for Natural Rubber. Bars from left to right: 260, 260, 370 μm, literature.
Figure 41:
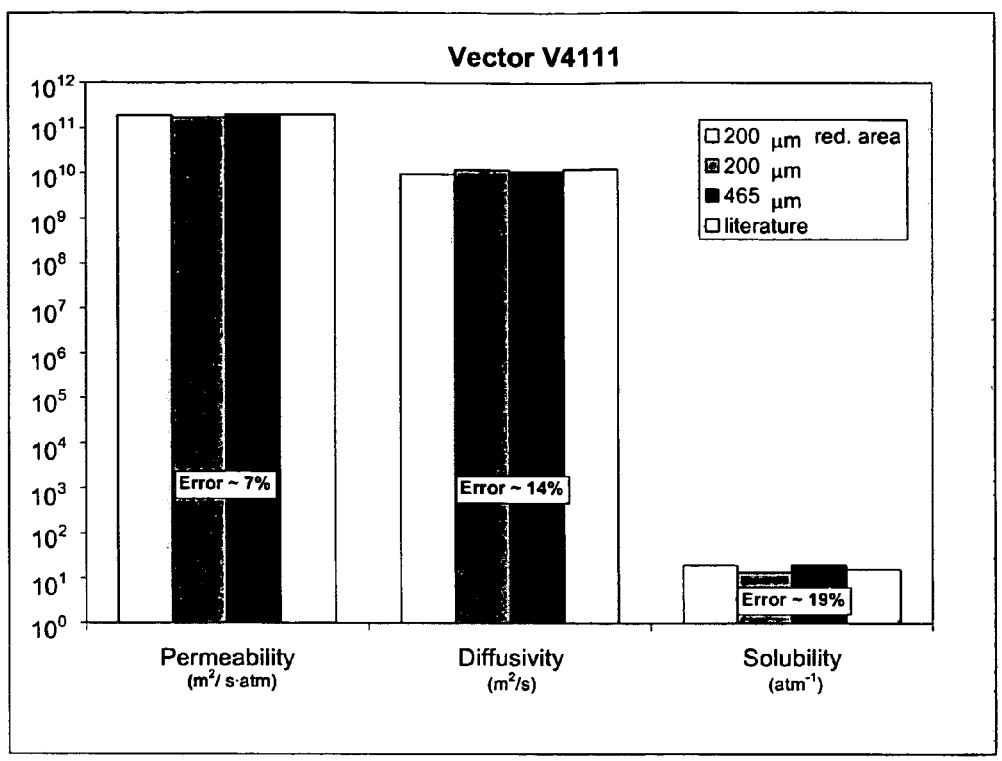
FIG. 41 represents the comparison the copolymer Vector V4111. Bars from left to right: 200, 200, 465 μm, literature.

Subsequently, each of these values was compared to reported literature values. In order to test the cell's consistency, two different film thicknesses as well as two different areas were used; one would expect each test to yield identical results. Reduced area samples were tested by placing an aluminum cover over the sample, reducing the composite's surface area by 48%. FIGS. 39-41 illustrate the results.

For each of the FIGS. 38-41, a number of literature sources were consulted to determine appropriate values for comparison. Van Amerongen, G. J., The Permeability of Different Rubbers to Gases and Its Relation to Diffusivity and Selectivity. *Journal of Applied Physics* 1946, 17, 972-986, Massey, L. K.; Plastics Design Library.; Knovel (Firm) Permeability properties of plastics and elastomers: a guide to packaging and barrier materials. http://www.knovel.com/knovel2/Toc.jsp?BookID=752, Plastics Design Library., *Permeability and other film properties of plastics and elastomers*. Plastics Design Library: Norwich, N.Y., 1995; p x, 706 p., Brandrup, J.; Immergut, E. H.; Grulke, E. A., *Polymer handbook*. 4th ed.; John Wiley & Sons: New York, 1999; p 1 v. (various pagings), Singh, A.; Freeman, B. D.; Pinnau, I., Pure and mixed gas acetone/nitrogen permeation properties of polydimethylsiloxane [PDMS]. *Journal of Polymer Science Part B-Polymer Physics* 1998, 36, (2), 289-301, Suh, K. Y.; Kim, P.; Lee, H. H., Capillary kinetics of thin polymer films in permeable microcavities. *Applied Physics Letters* 2004, 85, (18), 4019-4021, Yang, J. M.; Hsiue, G. H., Modified Styrene-Diene-Styrene Triblock Copolymers for Oxygen Permeation. *Angewandte Makromolekulare Chemie* 1995, 231, 1-14.

However, for both PDMS and NR, permeation data was only found for air at 30 and 35° C. respectively. This elevated temperature introduces a slight disparity between the literature and experimental results as the permeant used in our lab was air at 22° C. Although the differences are not likely to be large, one must consider that true permeation values would be slightly lower than those listed above. As a result, one could expect NR and PDMS errors to be slightly smaller than those reported above. With this considered, one can conclude that the diffusion cell is capable of reporting permeation coefficients to within an accuracy of approximately 10%, diffusion coefficients to within 15% and solubility to within 20%.

The diffusion cell was also evaluated to determine the consistency of its calculations over time and over varying sample preparation conditions. As such, each of the three samples (thin, thick and reduced area) were tested 5 times to determine the statistical variations. The following table lists the standard deviations determined for each of the three elastomers:

TABLE 5

Standard Derivations.
Standard Deviations

| | Permeability | | Diffusivity | | Solubility | |
|---|---|---|---|---|---|---|
| | St. Dev | % of Lit. | St. Dev | % of Lit. | St. Dev | % of Lit. |
| PDMS | 2.18E−12 | 1.1% | 1.35E−10 | 7.2% | 7.05E−03 | 6.6% |
| NR | 2.69E−13 | 4.4% | 1.69E−11 | 14.7% | 6.11E−03 | 10.7% |
| Vector | 3.40E−13 | 6.5% | 1.10E−11 | 13.4% | 6.66E−03 | 10.5% |

The table above lists the average standard deviation for each elastomer across tests with thick, thin and reduced area samples. This figure is also expressed as a percentage of the corresponding literature value. From this table, one can see that the most consistent results were obtained for permeability calculations. This makes sense as this value is determined based purely on the steady state pressure increase $$\frac{dp}{dt},$$

calculated from a large number of data points, over at least 30 seconds. Diffusivity, however, is determined based on the x-intercept. This value can easily be shifted if data collection does not coincide exactly with the moment the cell is pressurized. As this event was controlled manually, it is subject to human error. This error is also carried over to the solubility parameter as it is determined through the quotient of $$\frac{P}{D}.$$

As a result, one can conclude that the diffusion cell provides a much more consistent determination of the permeability coefficient rather than diffusivity or solubility. Variations from one trial to the next are expected to be less than 6% for permeability, 14% for diffusivity and 10% for solubility.

Permeation Variables

There are five important factors for permeation reduction in nanocomposite materials. Before evaluating the permeation of our elastomeric composites, it is helpful to evaluate how well each sample meets these criteria.

a) Volume Fraction

Composites made with each type of rubber contained FGS ranging from 0.25-5.0 wt %. In order to determine the corresponding volume fraction occupied by these platelets, the density of FGS sheets was calculated. Taking into consideration the lattice parameters of graphite as well as the Van der Waals radius of a pi group, the density was found to be very close to that of flake graphite—that is, 2.23 g/cm$^3$ However, given that molecular interactions with the polymer matrix could alter the 'true volume' occupied by the sheets, this value inherently carries with it a small uncertainty. For the purposes of volume fraction calculations, this uncertainty was assumed to be negligible and a density of 2.23 g/cm$^3$ was used. As a result, the volume fraction of FGS used was found to range from $2.2 \times 10^{-2}$-$4.3 \times 10^{-2}$ in each elastomer.

b) Aspect Ratio

In each composite, FGS from Batch 11 produced by David Milius (Princeton University, Princeton, N.J.) was used as filler material. As measured by BET, the surface area for this batch was found to be 525 m$^2$/g. Although graphene flakes from this batch were not measured explicitly, AFM measurements were performed on other FGS samples to characterize the size of individual sheets. As reported by Schniepp et al. individual sheets were found to measure a few hundred nanometers in length and 1.81±0.36 nm in height. Schniepp, H. C.; Li, J.; McAllister, M.; Sai, H.; Herrera-Alonso, M.; Adamson, D. H.; Prud'homme, R. K.; Car, R.; Saville, D. A.; Aksay, I., Functionalized Single Graphene Sheets Derived from Splitting Graphite Oxide. In Princeton University: 2006; p 13. Accordingly, one might expect FGS platelets to have aspect ratios ranging from 50-500. Given that Batch 11 was produced using the same process as the FGS evaluated by Schniepp et al, one can assume that this size and aspect ratio distribution also applies to those platelets used in our nanocomposites.

c) Orientation

However, particle orientation could be estimated indirectly by fitting observed permeation decreases to the model proposed by Baradwaj, 2001. In this way, one could roughly estimate a value for the S(θ) parameter, and deduce an approximation for the angle θ. This calculation will be carried out in section 4.2.3 below.

d) Platelet Dispersion

Platelet dispersion was measured in Vector, NR and PDMS composites through two methods, Scanning Electron Microscopy (SEM) and conductivity measurements. Each of these methods helped provide an estimate as to the dispersion of FGS platelets within the polymer matrices.

Figure 42:
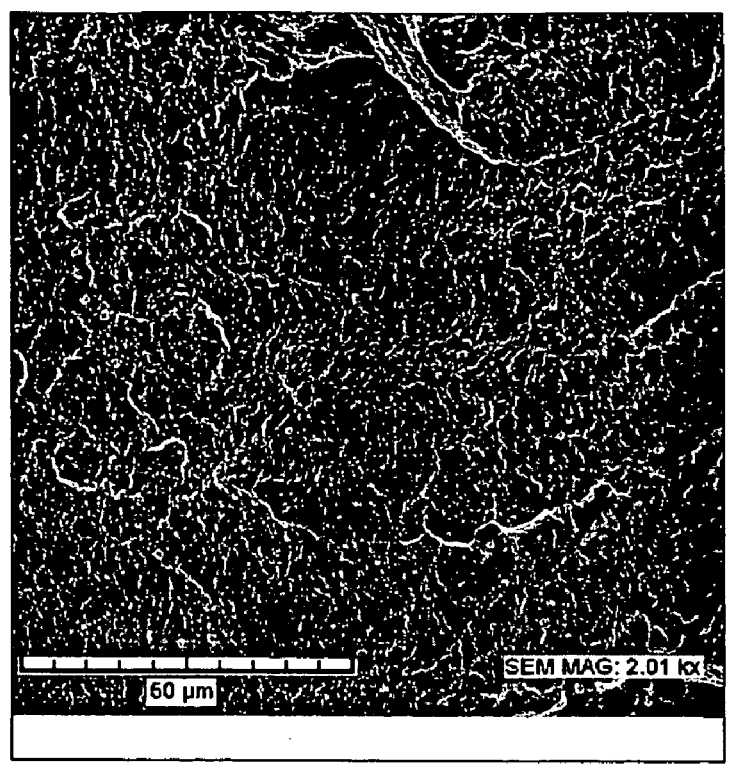
FIG. 42 shows a SEM image that was taken of pure Natural Rubber at 2,010× magnification.

To prepare samples for SEM, fragments of each composite were immersed in liquid nitrogen, fractured and coated with iridium to increase conductivity. These fragments were then observed in a Tescan Vega TS5130 Column SEM (Cranberry Township, Pa.) under 1000-2000× magnification. First, let us look at samples prepared with NR. Composites prepared via both solution mixing as well as extrusion were observed and compared in FIGS. 43(a) and (b). Neat NR is presented in FIG. 42. This SEM image of neat NR is characterized by a generally uniform structure, with small ridges most likely resulting from the earlier sample fracture. No large structures are visible under this magnification.

Figure 43:
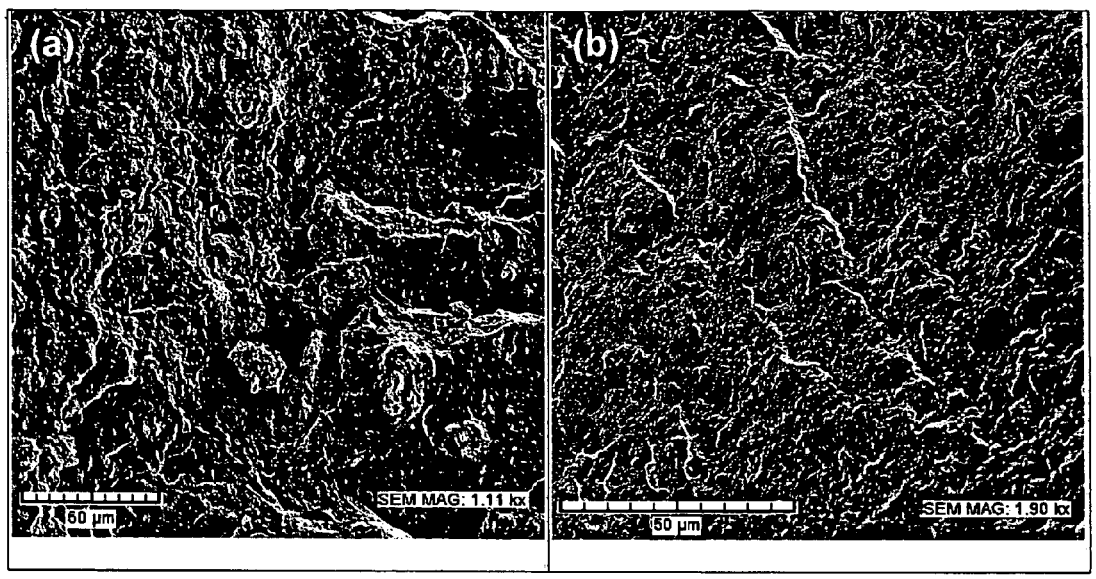
FIG. 43 (a) shows a SEM image that was taken of a 2 wt % NR/FGS composite produced via extrusion mixing. Note the large, clumped FGS granules. (b) shows a SEM image that was taken of a 2 wt % NR/FGS composite mixed through a solution method. The absence of large irregularities suggests a higher degree of nanofiller dispersion.

When comparing FIGS. 43(a) and (b) one distinction becomes immediately clear. Large agglomerations of FGS remain visible in the 2 wt % sample prepared by extrusion mixing, indicative of inadequate filler dispersion. On the other hand, the 2 wt % sample prepared by solution mixing demonstrates much finer structures, evidence of greater FGS distribution. These images suggest that solution mixing provides better route to evenly spreading the FGS filler in a natural rubber matrix.

Figure 44:
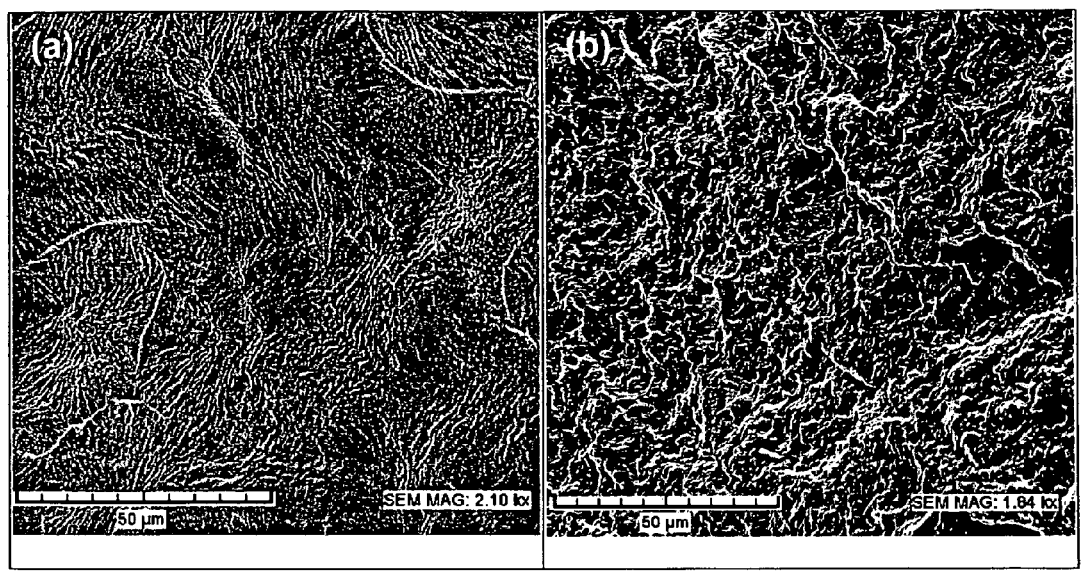
FIG. 44 shows SEM images that represent (a) pure PDMS and (b) 2.5 wt % PDMS/FGS composites. Small structures are visible within the composite, but yet do not show any evidence of aggregation.

Similar images were taken for PDMS/FGS composites. Depicted in FIGS. 44(a) and (b), one can compare the neat PDMS polymer with a 2.5 wt % composite. Looking carefully at this PDMS/FGS image, one notes the presence of small, yet visible structures. Although these platelet-like structures do not appear to be as fine as those found in the NR/FGS images, they do not show much evidence of agglomeration. In this case, it is thus difficult to specify the extent of filler dispersion. As such, secondary conductivity tests help provide more conclusive evidence.

Figure 45:
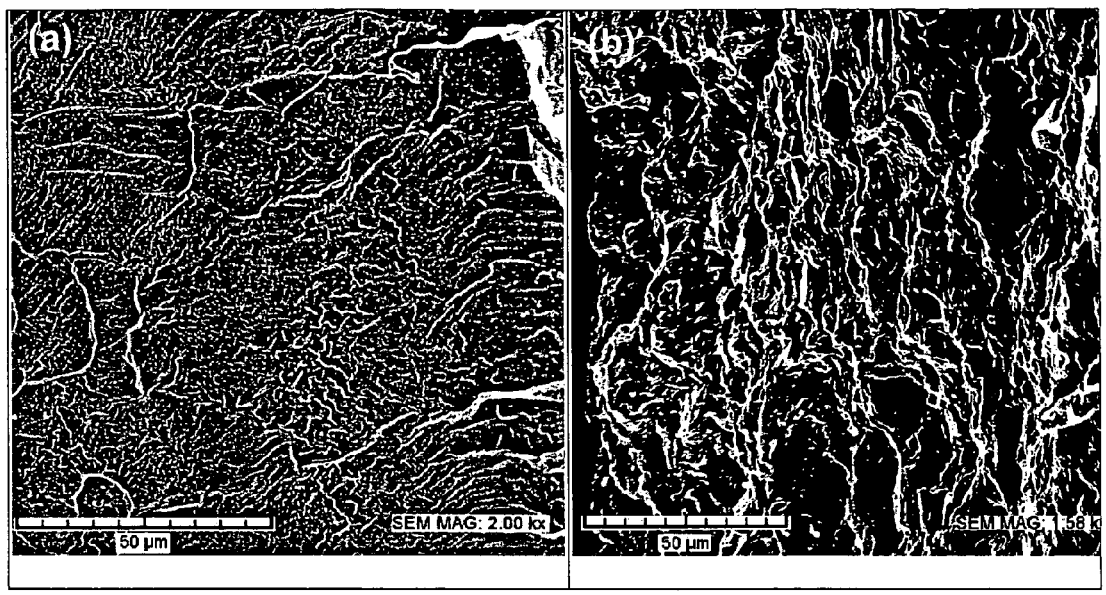
FIG. 45 shows SEM images that compare neat Vector (a) with a 5 wt % FGS/Vector composite (b). The high contrast regions suggest large topographical variations, possibly due to extruding sheets of FGS.

Lastly, SEM images were taken for Vector/FGS composites. These images are presented in FIG. 45 comparing neat Vector with a 5 wt % FGS composite. In (b) one can again see the undulation of small flake-like structures similar to those seen in PDMS/FGS images. These pictures, however, do not show evidence of large areas of agglomeration. One might instead propose that the areas with stark contrast differences seen in (b) come as a result of topographical differences along this fractured surface. With a fairly high (5 wt %) concentration of FGS, one could attribute these ridges to single or small groups of graphene sheets protruding from the Vector. As these ridges seem to be uniformly distributed along the composite's surface, one might then suggest that the FGS were evenly distributed along the sample. This reasoning could thus also be applied to the structures seen in PDMS samples. However, as one cannot be certain that these structures are FGS and not just irregular cracks, further tests are needed to characterize platelet dispersion.

Accordingly, a second means of evaluating platelet dispersion was undertaken. In this method, the conductivity of each composite was measured as a function of filler loading through a four-point technique. Since conduction would only be measurable in well dispersed composites (at low loading levels <5%), these measurements provide an estimation for the degree of FGS dispersion in each nanocomposite.

Figure 46:
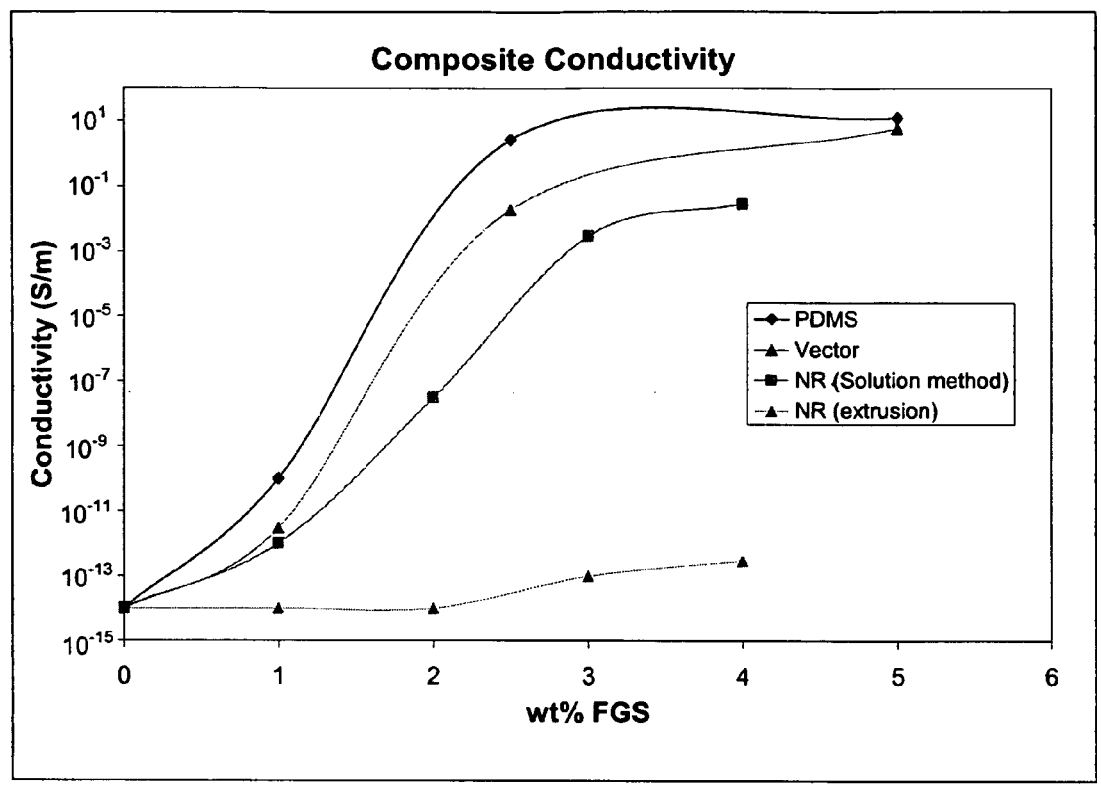
FIG. 46 illustrates the relationship between conductivity and FGS loading. Note that percolation is seen in three samples at 2.5% loading. Almost no conductivity was observed in NR (extrusion) samples.

As shown through trials with PMMA/FGS composites, percolation was achieved at 2 wt % loading in well dispersed samples. Prud'homme, R. K.; Brinson, L. C.; Ramanathan, T.; Abdala, A.; Stankovich, S.; Dikin, D.; Herrera-Alonso, M.; Piner, R.; Adamson, D. H.; Liu, J.; Ruoff, R. S.; Nguyen, S. T.; Aksay, I., Beyond Carbon Nanotubes: FGS Nanoplates for Polymer Nanocomposites. In Princeton University: 2006; p 23. Comparative studies were performed with each of the elastomeric samples, as shown in FIG. 46. As can be seen, percolation was achieved in NR (solution method), PDMS and Vector composites at ~2.5% loading. In fact, the conductivity measured for both the Vector and PDMS samples was substantially higher than the PMMA results published by Prud'homme et al; PDMS and Vector/FGS samples were measured at 13.2 and 5.1 S/m respectively, compared to $10^{-2}$ S/m seen in PMMA/FGS. When combined with the evidence seen through SEM analysis, the trends in FIG. 46 suggest that FGS is very well dispersed in PDMS, well dispersed in Vector samples, and moderately well mixed in NR (solution method). On the other hand, the extrusion method for producing NR composites clearly shows poor mixing qualities as FGS is found to aggregate and conducts very little.

e) Molecular Interactions

The final important factor influencing permeation reduction in nanocomposites is molecular interactions between the polymer matrix and the filler material. Large glass transition ($T_g$) shifts of 35° C. at 0.05 wt % FGS loading in PMMA observed by Prud'homme et al. suggest that these interactions are very much a reality for FGS composites. Prud'homme, R. K.; Brinson, L. C.; Ramanathan, T.; Abdala, A.; Stankovich, S.; Dikin, D.; Herrera-Alonso, M.; Piner, R.; Adamson, D. H.; Liu, J.; Ruoff, R. S.; Nguyen, S. T.; Aksay, I., Beyond Carbon Nanotubes: FGS Nanoplates for Polymer Nanocomposites. In Princeton University: 2006; p 23. Although the impact of local molecular interactions on barrier properties will not be included in this report, one might consider how they could be quantified. Two methods can be suggested. First, permeation tests could be done over a range of temperatures close to the elastomer's $T_g$, thus providing a means of measuring the magnitude such interactions. As the $T_g$ of many elastomers is quite low and impractical for diffusion tests, this may become somewhat difficult. Alternatively, permeation measurements could be taken in different axial directions. If the orientation of the platelets is known, such a test would allow the user to separate influence of tortuosity from that of molecular interactions. These measurements would again be difficult, as they are very susceptible to any irregularities in platelet orientation. This underscores the conclusions found by Lusti et al.— these interactions remain very difficult to quantify and are still not fully understood. Lusti, H. R.; Gusev, A. A.; Guseva, O., The influence of platelet disorientation on the barrier properties of composites: a numerical study. *Modelling and Simulation in Materials Science and Engineering* 2004, 12, (6), 1201-1207. As of yet, very few attempts have been made in the literature to quantify the role of these interactions.

Nanocomposite Permeation Properties a) FGS Performance

Figure 47:
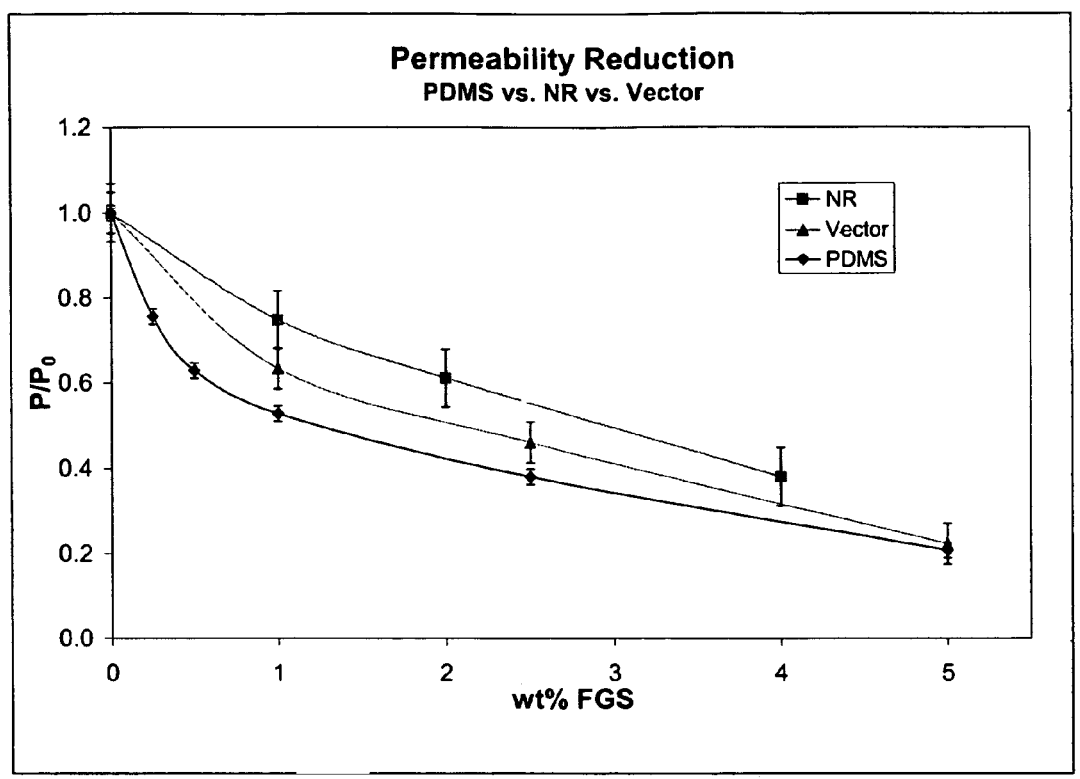
FIG. 47 illustrates the relative permeability drop measured for low levels of FGS loading. For PDMS and Vector, 5 fold reductions were seen at 5% loading. Error bars of 1 standard deviation are shown for each sample.

With FGS loading ranging from 0.25 wt % to 5%, composites made with NR (solution method), Vector and PDMS were evaluated using the diffusion cell. The results are illustrated in FIG. 47. This figure illustrates the proof of principle that FGS platelets will reduce the relative permeability ($P/P_0$) of a given polymeric sample. From the graph, one can infer that this is achieved most effectively in PDMS and least in NR composites. Remarkably, a 50% reduction is achieved with only a 1 wt % addition of FGS in PDMS composites. Furthermore, 80% reductions were attained at 5 wt % loading levels for PDMS and Vector samples. One can then compare these results to publications which used the same polymer matrices as those in our trials. Each publication used clay nanoplatelets as fillers and, to my knowledge, represented the greatest reported permeation decrease for each type of elastomer. In looking at these results presented in Table 6 below, one can see that FGS outperforms each previous work. Thus, although larger decreases have been found using thermoplastic polymers (10 fold in polyimide), one can conclude that FGS demonstrates superior performance in elastomers based on these results.

TABLE 6

In this table, results with PDMS, NR and Vector samples are compared with recent published results using clay nanoplatelets. In each case, FGS outperforms its counterpart.

| Composite | | Relative Permeation: $P/P_0$ | |
|---|---|---|---|
| Polymer | wt % filler | Clay | FGS |
| PDMS | 1.5 | 0.94[1] | 0.48 |
| Vector | 2.25 | 0.77[2] | 0.48 |
| NR | 5.0 | 0.75[3] | 0.24 |

[1]LeBaron, P. C.; Pinnavaia, T. J., Clay nanolayer reinforcement of a silicone elastomer. Chemistry of Materials 2001, 13, (10), 3760-3765.
[2]Wang, Z. F.; Wang, B.; Qi, N.; Zhang, H. F.; Zhang, L. Q., Influence of fillers on free volume and gas barrier properties in styrene-butadiene rubber studied by positrons. Polymer 2005, 46, (3), 719-724.
[3]Wang, Y. Q.; Zhang, H. F.; Wu, Y. P.; Yang, J.; Zhang, L. Q., Structure and properties of strain-induced crystallization rubber-clay nanocomposites by co-coagulating the rubber latex and clay aqueous suspension. Journal of Applied Polymer Science 2005, 96, (2), 318-323.

b) Role of Platelet Aspect Ratio and Dispersion

Figure 48:
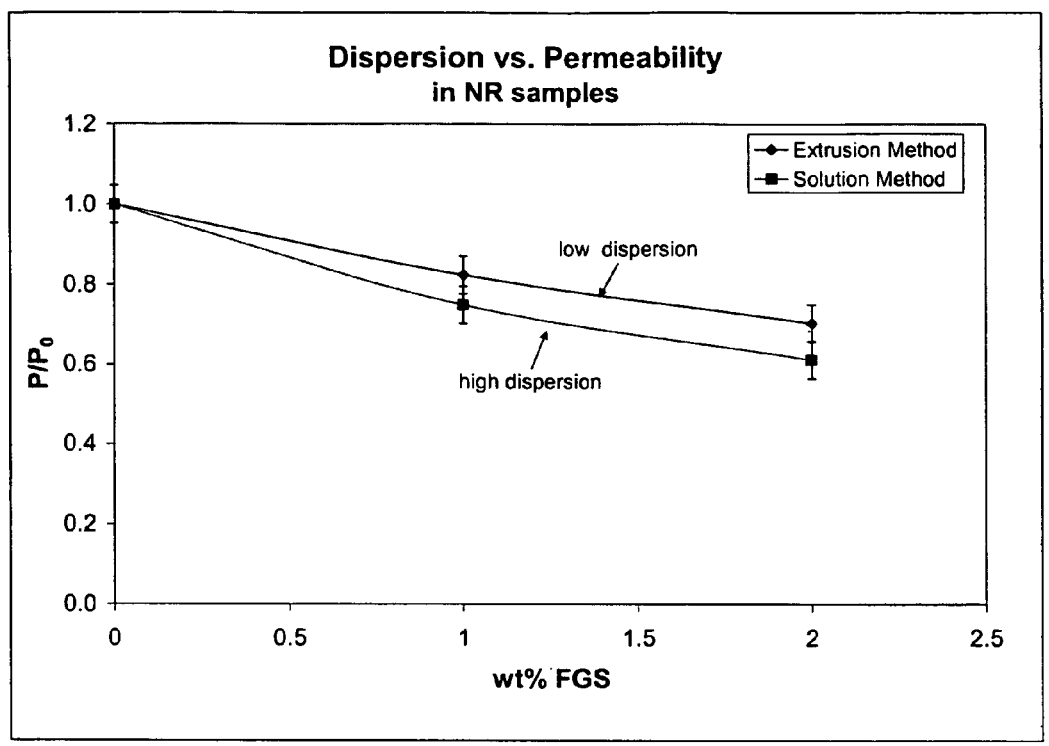
FIG. 48 illustrates permeation decrease as nanofiller dispersion is increased.

Through the permeation tests performed, one can also evaluate how variations in dispersion and platelet aspect ratio impact the barrier properties of a composite. First, let us examine the role of dispersion in permeation decrease. To do so, a simple test was performed to compare the barrier properties of NR composites prepared through extrusion with NR prepared through the solution method. As shown through the SEM and conductivity results from section 4.2.2., these two samples demonstrate considerable difference in levels of dispersion. The results are seen in FIG. 48.

These results provide visual confirmation that barrier properties are heavily influenced by differences in filler dispersability. This evidence can in turn be used to explain the observed differences in FIG. 48. SEM images and conductivity tests suggested that the FGS filler was better distributed in PDMS samples and less so in NR (solution method) and Vector samples. Accordingly, one notices that those samples with better filler dispersion also exhibit superior barrier properties.

Figure 49:
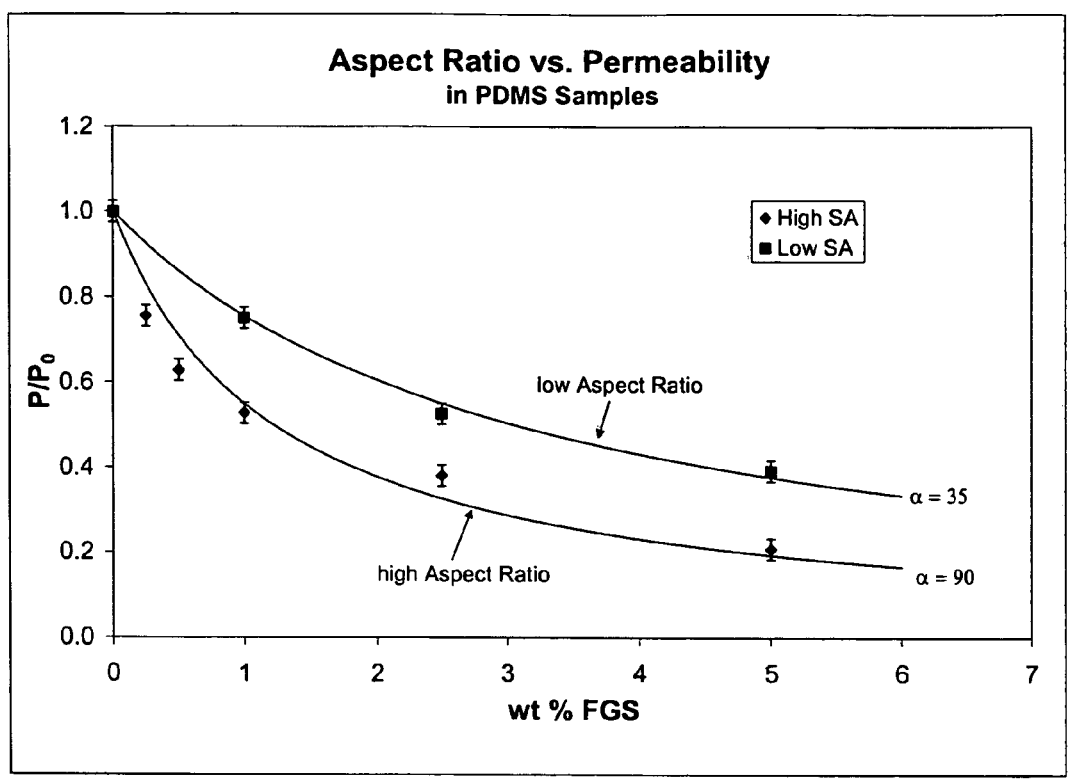
FIG. 49 illustrates how an increase in filler aspect ratio provides greater permeability reduction in PDMS/FGS samples.

One can qualify the role of platelet aspect ratio in a similar manner. In a second test, PDMS/FGS samples were prepared using two different FGS batches. The first was made using Batch 11 with a surface area of 525 $m^2/g$ whereas the second used a partially exfoliated batch with a surface area of ~320 $m^2/g$. This smaller surface area provides an indication that this batch contains larger FGS particles, with very few individual sheets. Accordingly, one would expect FGS platelets from this batch to have smaller aspect ratios on average. The results from this test are presented in FIG. 49. Each data set fit to Nielsen's model with an appropriate value for aspect ratio ($a$).

From this graph one can see how an increase in aspect ratio leads to improved barrier properties as a 3 fold increase in a results in a 20% reduction in permeation. Assuming a spacing of 0.71 nm between sheets, the predicted aspect ratio of $\alpha=90$ for Batch 11 corresponds to stacks on the order of 10 individual FGS sheets, whereas $\alpha=35$ corresponds to stacks of ~25 sheets for the low surface area FGS. This again provides confirmation as to the importance of one of the five factors influencing barrier properties.

Enhancing Platelet Orientation

As a result of the preceding conclusions, an effort was made to produce an oriented FGS composite. To accomplish this, two methods were used, (i) strain induced reorientation through sample stretching and (ii) shear induced reorientation through spin coating.

U.S. patent application Ser. No. 11/249,404, filed Oct. 14, 2005, and all patents and literature mentioned above are incorporated herein by reference.

Obviously, numerous modifications and variations of the present invention are possible in light of the above teachings. It is therefore to be understood that within the scope of the appended claims, the invention may be practiced otherwise than as specifically described herein.

The invention claimed is:

1. A gas diffusion barrier, comprising:
a polymer matrix; and
a functional graphene having a surface area of from about 300 m$^2$/g to 2600 m$^2$/g, wherein said functional graphene is made by thermally exfoliating graphite oxide at a temperature of from 300 to 2000° C.

2. The gas diffusion barrier as claimed in claim 1, wherein said functional graphene has a bulk density of from about 40 kg/m3 to 0.1 kg/m3.

3. The gas diffusion barrier as claimed in claim 1, wherein said functional graphene has a C/O oxygen ratio of from about 60/40 to 95/5.

4. The gas diffusion barrier as claimed in claim 1, comprising 0.1 to 90% by weight of said functional graphene, based on the total weight of said composition.

5. The gas diffusion barrier as claimed in claim 1, wherein said functional graphene is produced by a process, comprising:
(a) intercalating and oxidizing graphite to obtain graphite oxide; and
(b) heating the graphite oxide to obtain said functional graphene at a temperature of from 300 to 2000° C.

6. The gas diffusion barrier as claimed in claim 1, wherein said polymer matrix comprises an elastomer.

7. The gas diffusion barrier as claimed in claim 1, wherein said polymer matrix comprises at least one member selected from the group consisting of polyethylenes, polypropylenes, copolymers ethylene and propylene, polyesters, nylons, polystyrenes, polyvinyl acetates, polycarbonates, polyvinyl chlorides, polymethylmethacrylates, polymethylacrylates, polycaprolactones, polycaprolactams, fluorinated ethylenes, polystyrenes, styrene acrylonitriles, polyimides, epoxys, polyurethanes and mixtures thereof.

8. The gas diffusion barrier as claimed in claim 1, wherein said polymer matrix comprises an elastomer selected from the group consisting of vulcanized natural rubber, styrene-butadiene rubber, polystyrene-polyisoprene-polystyrene, a polysiloxane and mixtures thereof.

9. The gas diffusion barrier as claimed in claim 1, which is electrically conductive.

10. The gas diffusion barrier as claimed in claim 1, wherein said functional graphene is the form of nano platelets.

11. The gas diffusion barrier as claimed in claim 10, wherein said functional graphene has an aspect ratio of more than 100.

12. A process for manufacturing a gas diffusion barrier, comprising:
adding a functional graphene having a surface area of from about 300 m$^2$/g to 2600 m$^2$/g, to a polymer matrix,
wherein said functional graphene is made by thermally exfoliating graphite oxide at a temperature of from 300 to 2000° C.

13. The process according to claim 12, further comprising orienting said functional graphene in said polymer matrix.

14. The process as claimed in claim 12, wherein said functional graphene has a bulk density of from about 40 kg/m3 to 0.1 kg/m3.

15. The process as claimed in claim 12, wherein said functional graphene has a C/O oxygen ratio of from about 60/40 to 95/5.

16. The process as claimed in claim 12, comprising adding 0.1 to 90% by weight of said functional graphene.

17. The gas diffusion barrier as claimed in claim 1, wherein said functional graphene has a surface area of from about 400 m$^2$/g to 2600 m$^2$/g.

18. The gas diffusion barrier as claimed in claim 1, wherein said functional graphene has a surface area of from about 500 m$^2$/g to 2600 m$^2$/g.

19. The process as claimed in claim 12, wherein said functional graphene has a surface area of from about 400 m$^2$/g to 2600 m$^2$/g.

20. The process as claimed in claim 12, wherein said functional graphene has a surface area of from about 500 m$^2$/g to 2600 m$^2$/g.

* * * * *

UNITED STATES PATENT AND TRADEMARK OFFICE
CERTIFICATE OF CORRECTION

| | | |
|---|---|---|
| PATENT NO. | : 8,110,026 B2 | Page 1 of 1 |
| APPLICATION NO. | : 11/543871 | |
| DATED | : February 7, 2012 | |
| INVENTOR(S) | : Robert Prud'Homme et al. | |

It is certified that error appears in the above-identified patent and that said Letters Patent is hereby corrected as shown below:

In the Specifications:
Column 1, line 3, should read--STATEMENT REGARDING FEDERALLY SPONSORED RESEARCH/DEVELOPMENT > This invention was made with government support under Grant# NCC1-02037 awarded by NASA and Grant# DMR-0213706 awarded by the National Science Foundation. The government has certain rights in this invention.--

Signed and Sealed this
First Day of May, 2012

David J. Kappos
*Director of the United States Patent and Trademark Office*